US010785519B2

(12) United States Patent
Wright et al.

(10) Patent No.: US 10,785,519 B2
(45) Date of Patent: Sep. 22, 2020

(54) METHODS AND SYSTEMS TO METER MEDIA CONTENT PRESENTED ON A WIRELESS COMMUNICATION DEVICE

(71) Applicant: The Nielsen Company (US), LLC, New York, NY (US)

(72) Inventors: David H. Wright, Safety Harbor, FL (US); Kamal Nasser, Palm Harbor, FL (US); Jeff L. Herrmann, Chicago, IL (US); Arun Ramaswamy, Tampa, FL (US); Brian Scott Mello, Oldsmar, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 15/943,482

(22) Filed: Apr. 2, 2018

(65) Prior Publication Data

US 2018/0227612 A1    Aug. 9, 2018

Related U.S. Application Data

(63) Continuation of application No. 15/224,039, filed on Jul. 29, 2016, now Pat. No. 9,942,584, which is a
(Continued)

(51) Int. Cl.
*H04B 1/00* (2006.01)
*H04N 21/24* (2011.01)
(Continued)

(52) U.S. Cl.
CPC ............ *H04N 21/24* (2013.01); *H04H 60/64* (2013.01); *H04H 60/66* (2013.01); *H04L 67/22* (2013.01);
(Continued)

(58) Field of Classification Search
None
See application file for complete search history.

(56) References Cited

U.S. PATENT DOCUMENTS

| 2,662,168 A | 12/1953 | Scherbatskoy |
| 2,757,226 A | 7/1956 | Zworykin |

(Continued)

FOREIGN PATENT DOCUMENTS

| AU | 2005251196 | 12/2005 |
| AU | 2008347051 | 7/2009 |

(Continued)

OTHER PUBLICATIONS

European Patent Office, "Extended European Search Report," issued in connection with application No. EP 15003366.0, dated Mar. 18, 2016, 5 pages.
(Continued)

*Primary Examiner* — Adolf Dsouza
(74) *Attorney, Agent, or Firm* — Hanley, Flight & Zimmerman, LLC

(57) ABSTRACT

An example apparatus to monitor media that is presented via a mobile device includes: an application monitor to determine when media presentation software is being executed by the mobile device; and a metering information collector to collect at least one of a signature or a code of the media presented by the media presentation software based on the media presentation software being executed by the mobile device.

15 Claims, 27 Drawing Sheets

Related U.S. Application Data continuation of application No. 13/930,799, filed on Jun. 28, 2013, now Pat. No. 9,438,939, which is a continuation of application No. 11/877,413, filed on Oct. 23, 2007, now Pat. No. 8,514,907, which is a continuation of application No. PCT/US2007/007819, filed on Mar. 27, 2007.

(60) Provisional application No. 60/786,190, filed on Mar. 27, 2006.

(51) Int. Cl.

| | | |
|---|---|---|
| *H04H 60/64* | (2008.01) | |
| *H04H 60/66* | (2008.01) | |
| *H04N 7/173* | (2011.01) | |
| *H04N 21/258* | (2011.01) | |
| *H04N 21/414* | (2011.01) | |
| *H04N 21/426* | (2011.01) | |
| *H04N 21/442* | (2011.01) | |
| *H04L 29/08* | (2006.01) | |
| *H04N 21/845* | (2011.01) | |
| *H04W 4/06* | (2009.01) | |
| *H04H 60/32* | (2008.01) | |
| *H04H 60/37* | (2008.01) | |
| *H04H 60/40* | (2008.01) | |
| *H04H 60/43* | (2008.01) | |
| *H04H 60/44* | (2008.01) | |
| *H04H 60/50* | (2008.01) | |
| *H04H 60/51* | (2008.01) | |
| *H04H 60/58* | (2008.01) | |
| *H04H 60/59* | (2008.01) | |

(52) U.S. Cl.
CPC ..... *H04N 7/17318* (2013.01); *H04N 21/2407* (2013.01); *H04N 21/25841* (2013.01); *H04N 21/25883* (2013.01); *H04N 21/41407* (2013.01); *H04N 21/42684* (2013.01); *H04N 21/4424* (2013.01); *H04N 21/44209* (2013.01); *H04N 21/44222* (2013.01); *H04N 21/845* (2013.01); *H04H 60/32* (2013.01); *H04H 60/37* (2013.01); *H04H 60/40* (2013.01); *H04H 60/43* (2013.01); *H04H 60/44* (2013.01); *H04H 60/50* (2013.01); *H04H 60/51* (2013.01); *H04H 60/58* (2013.01); *H04H 60/59* (2013.01); *H04H 2201/90* (2013.01); *H04W 4/06* (2013.01)

(56) References Cited

U.S. PATENT DOCUMENTS

| | | |
|---|---|---|
| 3,919,479 A | 11/1975 | Moon et al. |
| 4,230,990 A | 10/1980 | Lert, Jr. et al. |
| 4,361,851 A | 11/1982 | Asip et al. |
| 4,450,551 A | 5/1984 | Kudo et al. |
| 4,558,302 A | 12/1985 | Welch |
| 4,658,290 A | 4/1987 | McKenna et al. |
| 4,677,466 A | 6/1987 | Lert, Jr. et al. |
| 4,697,209 A | 9/1987 | Kiewit et al. |
| 4,739,398 A | 4/1988 | Thomas et al. |
| 4,843,562 A | 6/1989 | Kenyon et al. |
| 4,918,730 A | 4/1990 | Schulze |
| 4,955,070 A | 9/1990 | Welsh et al. |
| 5,016,269 A | 5/1991 | Rogers |
| 5,031,204 A | 7/1991 | McKernan |
| 5,119,104 A | 6/1992 | Heller |
| 5,214,687 A | 5/1993 | Kansakoski et al. |
| 5,241,534 A | 8/1993 | Omuro et al. |
| 5,289,526 A | 2/1994 | Chymyck et al. |
| 5,319,638 A | 6/1994 | Lin |
| 5,319,735 A | 6/1994 | Preuss et al. |
| 5,345,392 A | 9/1994 | Mito et al. |
| 5,390,232 A | 2/1995 | Freeman et al. |
| 5,436,653 A | 7/1995 | Ellis et al. |
| 5,444,745 A | 8/1995 | Ali-Vehmas |
| 5,450,490 A | 9/1995 | Jensen et al. |
| 5,451,839 A | 9/1995 | Rappaport et al. |
| 5,460,901 A | 10/1995 | Syrjala |
| 5,481,294 A | 1/1996 | Thomas et al. |
| 5,490,204 A | 2/1996 | Gulledge |
| 5,512,933 A | 4/1996 | Wheatley et al. |
| 5,526,427 A | 6/1996 | Thomas et al. |
| 5,546,444 A | 8/1996 | Roach, Jr. et al. |
| 5,572,246 A | 11/1996 | Ellis et al. |
| 5,574,962 A | 11/1996 | Fardeau et al. |
| 5,579,124 A | 11/1996 | Aijala et al. |
| 5,581,800 A | 12/1996 | Fardeau et al. |
| 5,594,934 A | 1/1997 | Lu et al. |
| 5,603,095 A | 2/1997 | Uola |
| 5,612,729 A | 3/1997 | Ellis et al. |
| 5,621,454 A | 4/1997 | Ellis et al. |
| 5,642,353 A | 6/1997 | Roy, III et al. |
| 5,644,776 A | 7/1997 | DeRose et al. |
| 5,673,306 A | 9/1997 | Amadon et al. |
| 5,675,510 A | 10/1997 | Coffey et al. |
| 5,687,191 A | 11/1997 | Lee et al. |
| 5,699,244 A | 12/1997 | Clark, Jr. et al. |
| 5,737,025 A | 4/1998 | Dougherty et al. |
| 5,764,763 A | 6/1998 | Jensen et al. |
| 5,778,182 A | 7/1998 | Cathey et al. |
| 5,787,334 A | 7/1998 | Fardeau et al. |
| 5,796,952 A | 8/1998 | Davis et al. |
| 5,799,154 A | 8/1998 | Kuriyan |
| 5,828,325 A | 10/1998 | Wolosewicz et al. |
| 5,859,838 A | 1/1999 | Soliman |
| 5,872,588 A | 2/1999 | Aras et al. |
| 5,938,721 A | 8/1999 | Dussell et al. |
| 5,945,932 A | 8/1999 | Smith et al. |
| 5,963,909 A | 10/1999 | Warren et al. |
| 5,978,657 A | 11/1999 | Suzuki |
| 5,987,306 A | 11/1999 | Nilsen et al. |
| 5,991,735 A | 11/1999 | Gerace |
| 6,006,260 A | 12/1999 | Barrick, Jr. et al. |
| 6,012,096 A | 1/2000 | Link et al. |
| 6,087,952 A | 7/2000 | Prabhakaran |
| 6,097,441 A | 8/2000 | Allport |
| 6,108,637 A | 8/2000 | Blumenau |
| 6,115,680 A | 9/2000 | Coffee et al. |
| 6,138,147 A | 10/2000 | Weaver et al. |
| 6,154,484 A | 11/2000 | Lee et al. |
| 6,175,627 B1 | 1/2001 | Petrovic et al. |
| 6,212,386 B1 | 4/2001 | Briere et al. |
| 6,229,840 B1 | 5/2001 | Ichihara |
| 6,247,128 B1 | 6/2001 | Fisher et al. |
| 6,256,498 B1 | 7/2001 | Ludwig |
| 6,286,104 B1 | 9/2001 | Buhle et al. |
| 6,353,929 B1 | 3/2002 | Houston |
| 6,385,766 B1 | 5/2002 | Doran, Jr. et al. |
| 6,397,256 B1 | 5/2002 | Chan et al. |
| 6,405,245 B1 | 6/2002 | Burson et al. |
| 6,405,251 B1 | 6/2002 | Bullard et al. |
| 6,411,725 B1 | 6/2002 | Rhoads |
| 6,418,424 B1 | 7/2002 | Hoffberg et al. |
| 6,466,765 B1 | 10/2002 | Tanaka et al. |
| 6,467,089 B1 | 10/2002 | Aust et al. |
| 6,470,386 B1 | 10/2002 | Combar et al. |
| 6,480,497 B1 | 11/2002 | Flammer, III et al. |
| 6,516,189 B1 | 2/2003 | Frangione et al. |
| 6,519,241 B1 | 2/2003 | Theimer |
| 6,523,175 B1 | 2/2003 | Chan |
| 6,539,358 B1 | 3/2003 | Coon et al. |
| 6,577,346 B1 | 6/2003 | Perlman |
| 6,581,025 B2 | 6/2003 | Lehman |
| 6,591,312 B1 | 7/2003 | Greaves et al. |
| 6,604,100 B1 | 8/2003 | Fernandez et al. |
| 6,609,102 B2 | 8/2003 | Kolls |
| 6,621,881 B2 | 9/2003 | Srinivasan |
| 6,647,548 B1 | 11/2003 | Lu et al. |
| 6,675,383 B1 | 1/2004 | Wheeler et al. |

(56) References Cited

U.S. PATENT DOCUMENTS

| | | |
|---|---|---|
| 6,741,684 B2 | 5/2004 | Kaars |
| 6,745,011 B1 | 6/2004 | Hendrickson et al. |
| 6,754,470 B2 | 6/2004 | Hendrickson et al. |
| 6,755,346 B2 | 6/2004 | Epstein |
| 6,788,926 B1 | 9/2004 | Frangione et al. |
| 6,791,472 B1 | 9/2004 | Hoffberg |
| 6,807,515 B2 | 10/2004 | Vogel et al. |
| 6,810,413 B1 | 10/2004 | Rajakarunanayake et al. |
| 6,834,308 B1 | 12/2004 | Ikezoye et al. |
| 6,845,360 B2 | 1/2005 | Jensen et al. |
| 6,862,355 B2 | 3/2005 | Kolessar et al. |
| 6,871,180 B1 | 3/2005 | Neuhauser et al. |
| 6,928,280 B1 | 8/2005 | Xanthos et al. |
| 6,934,508 B2 | 8/2005 | Ceresoli et al. |
| 7,013,136 B2 | 3/2006 | Frangione et al. |
| 7,130,616 B2 | 10/2006 | Janik |
| 7,174,293 B2 | 2/2007 | Kenyon et al. |
| 7,185,352 B2 | 2/2007 | Hallford et al. |
| 7,194,752 B1 | 3/2007 | Kenyon et al. |
| 7,194,758 B1 | 3/2007 | Waki et al. |
| 7,206,647 B2 | 4/2007 | Kumar |
| 7,220,910 B2 | 5/2007 | Plastina et al. |
| 7,222,071 B2 | 5/2007 | Neuhauser et al. |
| 7,289,643 B2 | 10/2007 | Brunk et al. |
| 7,302,573 B2 | 11/2007 | Kogure et al. |
| 7,302,574 B2 | 11/2007 | Conwell et al. |
| 7,324,824 B2 | 1/2008 | Smith et al. |
| 7,340,677 B2 | 3/2008 | Cowperthwaite |
| 7,362,091 B2 | 4/2008 | Heisler et al. |
| 7,386,473 B2 | 6/2008 | Blumenau |
| 7,549,052 B2 | 6/2009 | Haitsma et al. |
| 7,555,306 B2 | 6/2009 | Liu |
| 7,587,732 B2 | 9/2009 | Wright et al. |
| 7,590,568 B2 | 9/2009 | Blumenau |
| 7,613,635 B2 | 11/2009 | Blumenau |
| 7,630,888 B2 | 12/2009 | Bichsel |
| 7,644,156 B2 | 1/2010 | Blumenau |
| 7,650,407 B2 | 1/2010 | Blumenau |
| 7,653,724 B2 | 1/2010 | Blumenau |
| 7,716,326 B2 | 5/2010 | Blumenau |
| 7,720,963 B2 | 5/2010 | Blumenau |
| 7,720,964 B2 | 5/2010 | Blumenau |
| 7,756,974 B2 | 7/2010 | Blumenau |
| 7,783,489 B2 | 8/2010 | Kenyon et al. |
| 7,899,691 B1 | 3/2011 | Lee et al. |
| RE42,627 E | 8/2011 | Neuhauser et al. |
| 8,019,449 B2 | 9/2011 | Barzegar et al. |
| 8,116,401 B2 | 2/2012 | Ibrahim et al. |
| 8,121,591 B2 | 2/2012 | Topaltzas |
| 8,145,966 B2 | 3/2012 | Roblett et al. |
| 8,185,100 B2 | 5/2012 | Jones et al. |
| 8,185,351 B2 | 5/2012 | Crystal et al. |
| 8,225,342 B2 | 7/2012 | Mears et al. |
| 8,296,791 B2 | 10/2012 | Steuer et al. |
| 8,315,554 B2 | 11/2012 | Levy et al. |
| 8,335,576 B1 | 12/2012 | Bradshaw et al. |
| 8,514,907 B2 | 8/2013 | Wright et al. |
| 8,539,527 B2 | 9/2013 | Wright et al. |
| 8,763,022 B2 | 6/2014 | Ramaswamy |
| 8,869,187 B2 | 10/2014 | Wright et al. |
| 8,914,819 B2 | 12/2014 | Mears et al. |
| 8,930,003 B2 | 1/2015 | Krug et al. |
| 9,191,581 B2 | 11/2015 | Srinivasan et al. |
| 9,325,381 B2 | 4/2016 | Gutierrez |
| 9,438,939 B2 | 9/2016 | Wright et al. |
| 9,491,518 B2 | 11/2016 | Wright et al. |
| 9,514,135 B2 | 12/2016 | Fisch et al. |
| 9,614,881 B2 | 4/2017 | Krug et al. |
| 9,942,584 B2 | 4/2018 | Wright et al. |
| 10,356,471 B2 | 7/2019 | Fisch et al. |
| 2001/0003166 A1 | 6/2001 | Gulick |
| 2001/0053190 A1 | 12/2001 | Srinivasan |
| 2002/0025795 A1 | 2/2002 | Sharon et al. |
| 2002/0026635 A1 | 2/2002 | Wheeler et al. |
| 2002/0032904 A1 | 3/2002 | Lerner |
| 2002/0042730 A1 | 4/2002 | Homer |
| 2002/0056089 A1 | 5/2002 | Houston |
| 2002/0059218 A1 | 5/2002 | August et al. |
| 2002/0059577 A1 | 5/2002 | Lu et al. |
| 2002/0066083 A1 | 5/2002 | Patel et al. |
| 2002/0068600 A1 | 6/2002 | Chihara et al. |
| 2002/0069037 A1 | 6/2002 | Hendrickson et al. |
| 2002/0107701 A1 | 8/2002 | Batty et al. |
| 2002/0107726 A1 | 8/2002 | Torrance et al. |
| 2002/0111912 A1 | 8/2002 | Hunter et al. |
| 2002/0112048 A1 | 8/2002 | Gruyer et al. |
| 2002/0133393 A1 | 9/2002 | Tatsumi et al. |
| 2002/0178410 A1 | 11/2002 | Haitsma et al. |
| 2002/0178441 A1 | 11/2002 | Hashimoto |
| 2002/0188696 A1 | 12/2002 | Ullmann et al. |
| 2003/0005430 A1 | 1/2003 | Kolessar |
| 2003/0028872 A1 | 2/2003 | Milovanovic et al. |
| 2003/0053792 A1 | 3/2003 | Janevski |
| 2003/0054757 A1 | 3/2003 | Kolessar et al. |
| 2003/0061490 A1 | 3/2003 | Abajian |
| 2003/0066074 A1 | 4/2003 | Zimmerman et al. |
| 2003/0073402 A1 | 4/2003 | Herring et al. |
| 2003/0105769 A1 | 6/2003 | Harris |
| 2003/0110485 A1 | 6/2003 | Lu et al. |
| 2003/0115586 A1 | 6/2003 | Lejouan et al. |
| 2003/0131350 A1 | 7/2003 | Peiffer et al. |
| 2003/0167173 A1 | 9/2003 | Levy et al. |
| 2003/0170001 A1 | 9/2003 | Breen |
| 2003/0177488 A1 | 9/2003 | Smith et al. |
| 2003/0229534 A1 | 12/2003 | Frangione et al. |
| 2003/0229900 A1 | 12/2003 | Reisman |
| 2003/0232649 A1 | 12/2003 | Gizis et al. |
| 2004/0019463 A1 | 1/2004 | Kolessar et al. |
| 2004/0019675 A1 | 1/2004 | Hebeler, Jr. et al. |
| 2004/0051812 A1 | 3/2004 | Hayward |
| 2004/0064319 A1 | 4/2004 | Neuhauser et al. |
| 2004/0078292 A1 | 4/2004 | Blumenau |
| 2004/0116067 A1 | 6/2004 | Karaoguz et al. |
| 2004/0117224 A1 | 6/2004 | Agarwal et al. |
| 2004/0122679 A1 | 6/2004 | Neuhauser et al. |
| 2004/0132407 A1 | 7/2004 | Hein-Magnussen et al. |
| 2004/0177253 A1 | 9/2004 | Wu et al. |
| 2004/0230332 A1 | 11/2004 | Cheng |
| 2004/0254887 A1 | 12/2004 | Jacoby |
| 2005/0009465 A1 | 1/2005 | Ross et al. |
| 2005/0052578 A1 | 3/2005 | Phillips et al. |
| 2005/0054285 A1 | 3/2005 | Mears et al. |
| 2005/0060542 A1 | 3/2005 | Risan et al. |
| 2005/0086334 A1 | 4/2005 | Aaltonen et al. |
| 2005/0096986 A1 | 5/2005 | Taylor et al. |
| 2005/0119967 A1 | 6/2005 | Ishiguro et al. |
| 2005/0138672 A1 | 6/2005 | Stone |
| 2005/0144632 A1 | 6/2005 | Mears et al. |
| 2005/0176424 A1 | 8/2005 | Kumar et al. |
| 2005/0181722 A1 | 8/2005 | Kopra et al. |
| 2005/0203798 A1 | 9/2005 | Jensen et al. |
| 2005/0204379 A1 | 9/2005 | Yamamori |
| 2005/0216509 A1 | 9/2005 | Kolessar et al. |
| 2005/0225665 A1 | 10/2005 | Chen |
| 2005/0227614 A1* | 10/2005 | Hosking ............... H04N 7/165 455/3.06 |
| 2005/0228665 A1 | 10/2005 | Kobayashi et al. |
| 2005/0232411 A1 | 10/2005 | Srinivasan et al. |
| 2005/0262251 A1 | 11/2005 | Klemets et al. |
| 2005/0267750 A1 | 12/2005 | Steuer et al. |
| 2005/0289622 A1 | 12/2005 | Vanlerberghe et al. |
| 2006/0022048 A1 | 2/2006 | Johnson |
| 2006/0026162 A1* | 2/2006 | Salmonsen ........... G06F 16/437 |
| 2006/0085812 A1 | 4/2006 | Shishegar et al. |
| 2006/0105702 A1 | 5/2006 | Muth et al. |
| 2006/0129496 A1 | 6/2006 | Chow et al. |
| 2006/0195861 A1 | 8/2006 | Lee |
| 2006/0218651 A1 | 9/2006 | Ginter et al. |
| 2006/0269004 A1 | 11/2006 | Ibrahim et al. |
| 2006/0294225 A1 | 12/2006 | Grecco et al. |
| 2007/0006250 A1 | 1/2007 | Croy et al. |
| 2007/0006275 A1 | 1/2007 | Wright et al. |
| 2007/0011040 A1 | 1/2007 | Wright et al. |
| 2007/0038516 A1 | 2/2007 | Apple et al. |

(56) References Cited

U.S. PATENT DOCUMENTS

| | | |
|---|---|---|
| 2007/0050832 A1 | 3/2007 | Wright et al. |
| 2007/0106787 A1 | 5/2007 | Blumenau |
| 2007/0106792 A1 | 5/2007 | Blumenau |
| 2007/0115827 A1 | 5/2007 | Boehnke et al. |
| 2007/0129952 A1 | 6/2007 | Kenyon et al. |
| 2007/0142024 A1 | 6/2007 | Clayton et al. |
| 2007/0174877 A1 | 7/2007 | Papillon et al. |
| 2007/0254695 A1 | 11/2007 | Langberg et al. |
| 2007/0259621 A1 | 11/2007 | Lin et al. |
| 2007/0274537 A1 | 11/2007 | Srinivasan |
| 2007/0288277 A1 | 12/2007 | Neuhauser et al. |
| 2007/0288476 A1 | 12/2007 | Flanagan, III et al. |
| 2007/0294057 A1 | 12/2007 | Crystal et al. |
| 2007/0294132 A1 | 12/2007 | Zhang et al. |
| 2007/0294705 A1 | 12/2007 | Gopalakrishnan et al. |
| 2007/0294706 A1 | 12/2007 | Neuhauser et al. |
| 2008/0022294 A1 | 1/2008 | Perrin et al. |
| 2008/0049704 A1 | 2/2008 | Witteman et al. |
| 2008/0081608 A1 | 4/2008 | Findikli et al. |
| 2008/0091489 A1 | 4/2008 | LaRock et al. |
| 2008/0098432 A1 | 4/2008 | Hardacker et al. |
| 2008/0109295 A1 | 5/2008 | McConochie et al. |
| 2008/0126420 A1 | 5/2008 | Wright et al. |
| 2009/0034750 A1 | 2/2009 | Ayoub et al. |
| 2009/0061769 A1 | 3/2009 | Zimbric et al. |
| 2009/0068949 A1 | 3/2009 | Lin |
| 2009/0077578 A1 | 3/2009 | Steuer et al. |
| 2009/0169024 A1 | 7/2009 | Krug et al. |
| 2009/0171767 A1 | 7/2009 | Kolessar |
| 2009/0203368 A1 | 8/2009 | Marsyla et al. |
| 2009/0222848 A1 | 9/2009 | Ramaswamy |
| 2010/0299604 A1 | 11/2010 | Blumenau |
| 2011/0115827 A1 | 5/2011 | Tanaka |
| 2011/0140961 A1 | 6/2011 | Yeh et al. |
| 2012/0308064 A1 | 12/2012 | Matthews |
| 2015/0058299 A1 | 2/2015 | Fisch et al. |
| 2015/0112466 A1 | 4/2015 | Krug et al. |
| 2016/0212250 A1 | 7/2016 | Gutierrez |
| 2019/0342612 A1 | 11/2019 | Fisch et al. |

FOREIGN PATENT DOCUMENTS

| | | |
|---|---|---|
| CN | 1557093 | 12/2004 |
| CN | 1663249 | 8/2005 |
| CN | 1685735 | 10/2005 |
| CN | 101371472 | 2/2009 |
| EP | 0849909 | 6/1998 |
| EP | 0887958 | 12/1998 |
| EP | 1026847 | 8/2000 |
| EP | 1213860 | 6/2002 |
| EP | 1763163 | 3/2007 |
| EP | 2227865 | 9/2010 |
| JP | H06292197 | 10/1994 |
| JP | 2000222314 | 8/2000 |
| JP | 2000307530 | 11/2000 |
| JP | 2002051274 | 2/2002 |
| JP | 2002344933 | 11/2002 |
| JP | 2004272810 | 9/2004 |
| KR | 20000009559 | 2/2000 |
| KR | 20010081835 | 8/2001 |
| KR | 20030052030 | 6/2003 |
| KR | 20050029937 | 3/2005 |
| WO | 9111062 | 7/1991 |
| WO | 9810349 | 3/1998 |
| WO | 9810539 | 3/1998 |
| WO | 9826541 | 6/1998 |
| WO | 9843455 | 10/1998 |
| WO | 0004476 | 1/2000 |
| WO | 0058962 | 10/2000 |
| WO | 0172058 | 9/2001 |
| WO | 0217612 | 2/2002 |
| WO | 0219625 | 3/2002 |
| WO | 0245273 | 6/2002 |
| WO | 03095945 | 11/2003 |
| WO | 2005038625 | 4/2005 |
| WO | 2005039179 | 4/2005 |
| WO | 2005046201 | 5/2005 |
| WO | 2005065159 | 7/2005 |
| WO | 2005079457 | 9/2005 |
| WO | 2005079941 | 9/2005 |
| WO | 2005119651 | 12/2005 |
| WO | 2006014362 | 2/2006 |
| WO | 2007070789 | 6/2007 |
| WO | 2009088485 | 7/2009 |

OTHER PUBLICATIONS

Korean Intellectual Property Office, "Notice of Allowance," issued in connection with application No. KR 10-2015-7016736, dated Mar. 23, 2016, 3 pages.

Canadian Intellectual Property Office, "Notice of Allowance," issued in connection with Canadian Patent Application No. 2,666,199, dated Sep. 8, 2014, 1 page.

European Patent Office, "Exam Report," issued in connection with European Patent Application No. 07 754 351.0, dated Jun. 30, 2014, 5 pages.

European Patent Office, "Intent to Grant," issued in connection with European Patent Application No. 07 754 351.0, dated Feb. 17, 2015, 8 pages.

Korean Intellectual Property Office, "Notice of Final Rejection," issued in connection with Korean Patent Application No. 10-2008-7026243, dated Oct. 28, 2014, 6 pages.

Korean Intellectual Property Office, "Notice of Final Rejection," issued in connection with Korean Patent Application No. 10-2008-7026243, dated Jan. 13, 2015, 9 pages.

United States Patent and Trademark Office, "Non-Final Office Action," issued in connection with U.S. Appl. No. 11/877,413, dated Jul. 8, 2009, 17 pages.

United States Patent and Trademark Office, "Final Rejection," issued in connection with U.S. Appl. No. 11/877,413, dated Dec. 30, 2009, 20 pages.

United States Patent and Trademark Office, "Non-Final Office Action," issued in connection with U.S. Appl. No. 11/877,413, dated Aug. 6, 2010, 18 pages.

United States Patent and Trademark Office, "Final Rejection," issued in connection with U.S. Appl. No. 11/877,413, dated Mar. 4, 2011, 21 pages.

United States Patent and Trademark Office, "Non-Final Office Action," issued in connection with U.S. Appl. No. 11/877,413, dated Apr. 12, 2012, 19 pages.

United States Patent and Trademark Office, "Notice of Allowance," issued in connection with U.S. Appl. No. 11/877,413, dated Oct. 30, 2012, 8 pages.

United States Patent and Trademark Office, "Notice of Allowance," issued in connection with U.S. Appl. No. 11/877,413, dated Mar. 13, 2013, 9 pages.

European Patent Office, "Extended European Search Report," in connection with Application No. 07754351.0, dated Oct. 28, 2013, 7 pages.

Vucetic et al. "Network Management Applications for Wireless Local Loop," Electrotechnical Conference, 1998, Melecon 98, 9th Mediterranean, vol. 2, May 18-20, 1998, pp. 787-791.

Hilbert et al., "An Approach to Large-Scale Collection of Application Usage Data Over the Internet," IEEE, 1998, 10 pages.

Canadian Intellectual Property Office, "Examination Report," dated Jun. 11, 2012, in Canadian Patent Application No. 2,666,199, 3 pages.

Jain et al. "Congestion Avoidance in Computer Networks With a Connectionless Network Layer," Digital Equipment Corporation, Copyright 1988, Version: Jun. 1, 1997, 21 pages.

Qualcomm Incorporated, "Flo Technology Overview," Media Flo, http://www.qualcomm.com/common/documents/brochures/tech overview.pdf, issued in 2007, 24 pages.

Real, "Helix Universal Server Administration Guide," Helix Universal Server Version 9.0, Chapter 10: Simulated Live Broadcasts, accessed via http://service.real.com/help/library/guides/helixuniversalserver/htmfiles/iqslta.htm (Retrieved from Internet on Mar. 9, 2007), 2002, 22 pages.

(56) References Cited

OTHER PUBLICATIONS

Real, "Helix Universal Server Administration Guide," Helix Universal Server Version 9.0, Chapter 13: Multicasting, accessed via http://service.real.com/help/library/guides/helixproxyconfig/htmfiles/multicas.htm (Retrieved from Internet on Mar. 9, 2007), 2002, 6 pages.
Real, "Helix Universal Server Administration Guide," Helix Universal Server Version 9.0, Chapter 8: Multicasts, accessed via http://service.real.com/help/library/guides/helixuniversalserver/htmfiles/multicst.htm (Retrieved from Internet on Mar. 9, 2007), 2002, 14 pages.
Patent Cooperation Treaty, "International Search Report," issued by the International Searching Authority in connection with counterpart PCT application No. PCT/US2007/007819, dated May 6, 2008, 5 pages.
Patent Cooperation Treaty, "International Preliminary Report on Patentability," issued by the International Searching Authority in connection with counterpart PCT application No. PCT/US2007/007819, dated Sep. 30, 2008, 12 pages.
Korean Intellectual Property Office, "Notice of Preliminary Rejection," issued in connection with Korean Patent Application No. 10-2008-7026243, dated Sep. 25, 2013, 5 pages.
Korean Intellectual Property Office, "Notice of Preliminary Rejection," issued in connection with Korean Patent Application No. 10-2008-7026243, dated Mar. 14, 2014, 5 pages.
Canadian Intellectual Property Office, "Office Action," issued in connection with Canadian Patent Application No. 2,666,199, dated Jul. 23, 2013, 2 pages.
Korean Intellectual Property Office, "Notice of Preliminary Rejection," issued in connection with Korean Patent Application No. 10-2015-7016736, dated Sep. 8, 2015, 7 pages.
European Patent Office, "Intent to Grant," issued in connection with European Patent Application No. 07 754 351.0, on Jul. 28, 2015, 7 pages.
Korean Intellectual Property Office, "Notice of Preliminary Rejection," issued in connection with Korean Patent Application No. 10-2016-7016989, dated Sep. 1, 2016, 30 pages.
Patent Cooperation Treaty, "Written Opinion," issued by the International Searching Authority in connection with counterpart PCT Application No. PCT/US2007/007819, dated May 6, 2008, 11 pages.
Canadian Intellectual Property Office, "Office Action," issued in connection with Canadian Patent Application No. 2,947,649, dated Sep. 22, 2017, 5 pages.
Korean Intellectual Property Office, "Notice of Final Rejection," issued in connection with Korean Patent Application No. 10-2016-7016989, dated Mar. 13, 2017, 6 pages.
Canadian Intellectual Property Office, "Notice of Allowance," issued in connection with Canadian patent application No. 2,841,017, dated May 9, 2016, 1 page.
Korean Intellectual Property Office, "Notice of Allowance," issued in connection with Korean patent application No. 10-2014-7036820, dated Oct. 27, 2015, 3 pages.
United States Patent and Trademark Office, "Notice of Allowance," issued in connection with U.S. Appl. No. 13/930,799, dated May 12, 2016, 8 pages.
United States Patent and Trademark Office, "Non-final Office Action," issued in connection with U.S. Appl. No. 13/930,799, dated Feb. 2, 2016, 6 pages.
United States Patent and Trademark Office, "Notice of Allowance," issued in connection with U.S. Appl. No. 15/224,039, dated Dec. 6, 2017, 8 pages.
United States Patent and Trademark Office, "Non-final Office Action," issued in connection with U.S. Appl. No. 15/224,039, dated Aug. 10, 2017, 8 pages.
United States Patent and Trademark Office, "Non-final Office Action," issued in connection with U.S. Appl. No. 15/943,479, dated Jun. 29, 2018, 17 pages.
United States Patent and Trademark Office, "Final Office Action," issued in connection with U.S. Appl. No. 15/943,479, dated Jan. 24, 2019, 9 pages.
Canadian Intellectual Property Office, "Examiner Report," issued in connection with Canadian Patent Application No. 2,947,649, dated Aug. 20, 2018, 4 pages.
Bender et al., "Techniques for Data Hiding," IBM Systems Journal, vol. 35, Nos. 3 & 4, 1996, 24 pages.
Walker, "Audio Watermarking," British Broadcasting Corporation Research and Development, Aug. 2004, 18 pages.
Apple Inc., "AirPort Express—Setup Guide," 2007, retrieved from <www.apple.com/airport>, 56 pages.
Arbitron, "The Manchester 300—Out of the Lab and into the Field: A Report on the Extended Field Test of Arbitron's Portable People Meter in Manchester, England," Jan. 1, 2000, 24 pages.
Friess, "Nielsen, TiVo Try Ratings Game," Sep. 13, 2002, retrieved from http://www.wired.com/print/entertainment/music/news/2002/09/55091>, retrieved on Mar. 5, 2009, 2 pages.
Think CP Technologies, "Think Headtrip," retrieved from http://www.thinkcp.com/products/ thinkheadtrip.asp., retrieved on Jan. 18, 2006, 2 pages.

* cited by examiner

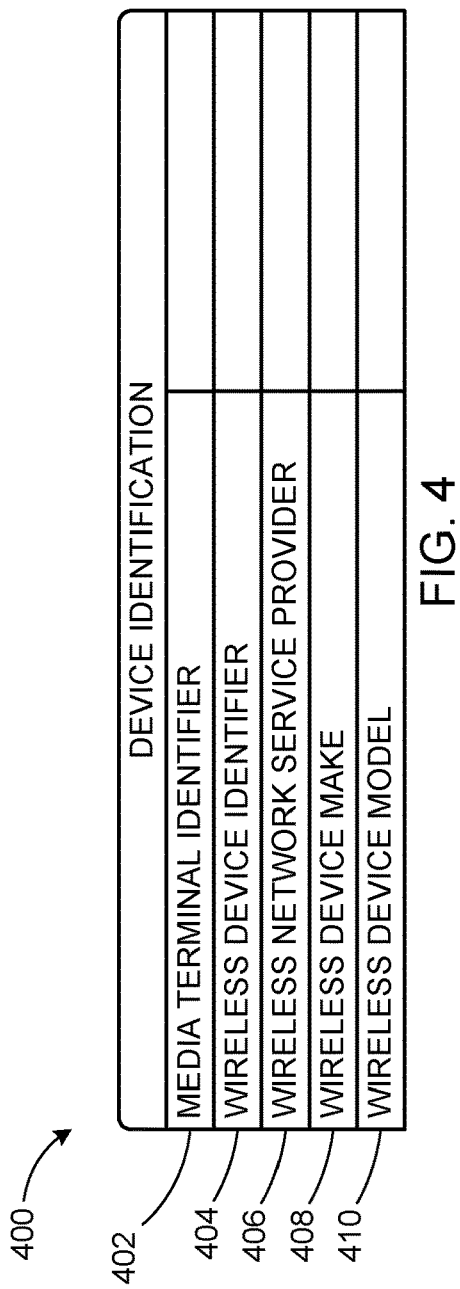

| VIEWING SESSION INFORMATION <WIRELESS DEVICE IDENTIFIER> | | | | |
|---|---|---|---|---|
| START TIME (UTC) 802 | END TIME (UTC) 804 | PREVIOUS VIEWING SESSION END TIME (UTC) 806 | PRESENTATION SOFTWARE 810 | |
| | | | NAME | VERSION |
| 808a | | | | |
| 808b | | | | |
| 808c | | | | |

FIG. 8

| CONTENT SESSION INFORMATION <WIRELESS DEVICE IDENTIFIER> | | |
|---|---|---|
| START TIME (UTC) | | |
| END TIME (UTC) | | |
| SERVICE PROVIDER | | |
| DELIVERY TYPE | | |
| CONTENT TYPE | | |
| PROGRAM ASSET ID | | |
| PROGRAM NAME/TITLE | | |
| EPISODE NAME | | |
| CONTENT DISTRIBUTOR | | |
| CONTENT PROVIDER | | |
| CHANNEL NUMBER | | |
| CHANNEL NAME | | |
| IP TIME OFFSET | | |
| TRANSMITTING TOWER ID | | |
| LOCATION INFORMATION | | |
| CONTENT SPECIFICATIONS | //////// | //////// |
| FRAMES PER SECOND | | |
| VIDEO RESOLUTION | | |
| AUDIO QUALITY | | |
| USAGE DATA | //////// | //////// |
| EVENT COUNT | | |
| TIMESTAMP (UTC) | | |
| DURATION | | |
| OPERATION MODE | | |
| TIME OFFSET | | |
| PRESENTATION INFORMATION | //////// | //////// |
| VOLUME LEVEL | | |
| HEADSET/SPEAKER | | |
| SCREEN CONTRAST RATIO | | |

FIG. 9

CHANNEL LINEUP AND CONTENT PROGRAMMING

| CHANNEL NUMBER | CHANNEL NAME | PROGRAMMING <DATE> ||||
|---|---|---|---|---|---|
| | | 12:00 AM | 12:30 AM | 1:00 AM | 11:30 PM |
| 2 | WBBM | | | | ... |
| 3 | ACCESS | | | | ... |
| 4 | WGBO | | | | ... |
| 5 | WMAQ | | | | ... |
| 6 | ACCESS | | | | ... |
| 7 | WLS | | | | ... |
| ... | ... | ... | ... | ... | ... |
| 50 | TBS | | | | |
| 51 | ABC FAMILY | | | | |

FIG. 10

| EVENT LOG | |
|---|---|
| TIMESTAMP | EVENT |
| 1111890052 | DEVICE TURNED ON |
| 1111891028 | DEVICE CHARGING |
| 1111891188 | DEVICE IDLE |
| 1111895458 | MEDIA PRESENTATION APP IN USE |
| 1111895656 | MEDIA PRESENTATION APP EXITED |
| 1111951025 | DEVICE TURNED OFF |

FIG. 24

| SIGNATURE LOG | |
|---|---|
| TIMESTAMP | SIGNATURE |
| 1111895460 | 1010101 |
| 1111895490 | 0101010 |
| 1111895520 | 1010100 |
| 1111895550 | 0101010 |
| 1111895580 | 1010101 |
| 1111895610 | 1010001 |

FIG. 25

METHODS AND SYSTEMS TO METER MEDIA CONTENT PRESENTED ON A WIRELESS COMMUNICATION DEVICE

RELATED APPLICATIONS

This patent arises from a continuation of U.S. patent application Ser. No. 15/224,039, filed on Jul. 29, 2016, which is a continuation of U.S. patent application Ser. No. 13/930,799, filed on Jun. 28, 2013, now U.S. Pat. No. 9,438,939, which is a continuation of U.S. patent application Ser. No. 11/877,413, filed on Oct. 23, 2007, now U.S. Pat. No. 8,514,907, which is a continuation of International Patent Application Serial No. PCT/US2007/007819, filed on Mar. 27, 2007, which claims the benefit of U.S. Provisional Patent Application No. 60/786,190, filed Mar. 27, 2006, all of which are hereby incorporated herein by reference in their entireties.

FIELD OF THE DISCLOSURE

This disclosure relates generally to audience measurement and, more particularly, to methods and systems to meter media content presented on a wireless communication device.

BACKGROUND

Consuming media presentations (i.e., audio and/or video presentations) generally involves listening to audio information and/or viewing video information. Media presentations may include, for example, radio programs, music, television programs, movies, still images, web pages, video games, etc. Media-centric companies such as, for example, advertising companies, broadcast networks, etc. are often interested in the viewing and listening interests or habits of their audience to better market their products and/or to improve their media program offerings. Companies are often also interested in measuring media exposure that indicates when audience members were exposed to media presentations, regardless of whether the audience members actually consumed the media presentations. A well-known technique often used to measure media consumption, exposure to media, and/or the number of audience members that consumed or were exposed to media involves awarding media consumption or exposure credit to a media presentation for each audience member that consumed or was exposed to the media presentation.

Known techniques used to meter consumption of media or exposure to media involve monitoring audio and/or video presented by televisions and/or stereos. For example, a home may be provided with a stationary home metering unit that receives and/or detects audio and/or video media presented by televisions and/or stereos in the home. The home metering unit then generates metering information indicative of the presented audio and/or video media. Other known techniques involve providing audience members with respective portable metering devices equipped with audio and/or video detectors to detect the audio and/or video presented by the televisions and/or stereos in the home or otherwise in proximity to the portable metering devices. The portable metering devices then generate metering information based on the detected audio and/or video media.

BRIEF DESCRIPTION OF THE DRAWINGS

FIG. 4 depicts an example device identification data structure that may be used to store identification information associated with a panel member's wireless communication device.

FIG. 5 depicts an example device status information data structure that may be used to store device status information associated with a panel member's wireless communication device.

FIG. 8 depicts an example viewing session information data structure that may be used to store viewing session information associated with a panel member's wireless communication device.

FIG. 9 depicts an example content session information data structure that may be used to store content session information associated with a panel member's wireless communication device.

FIG. 10 depicts an example channel lineup and content programming data structure that may be used by the media measurement entity of FIGS. 1-3 to analyze and/or validate the metering information generated by panel member wireless communication devices.

FIG. 24 depicts an example event data structure that a meter of FIGS. 2 and 3 may use to store operation or event information indicative of the operating status of the wireless communication device of FIGS. 1-3, 22A, 22B, and 23.

FIG. 25 depicts an example signature data structure that the meter of FIGS. 2 and 3 may use to store generated signatures.

DETAILED DESCRIPTION

The example methods and apparatus described herein may be used to meter media content presented on a wireless communication device. An example method of monitoring media presented by a wireless communication device involves monitoring media content presented by the wireless communication device, collecting media metering information associated with the presented media content, and communicating the media metering information to a metering entity to analyze media consumption or media exposure of audience members.

Figure 1:
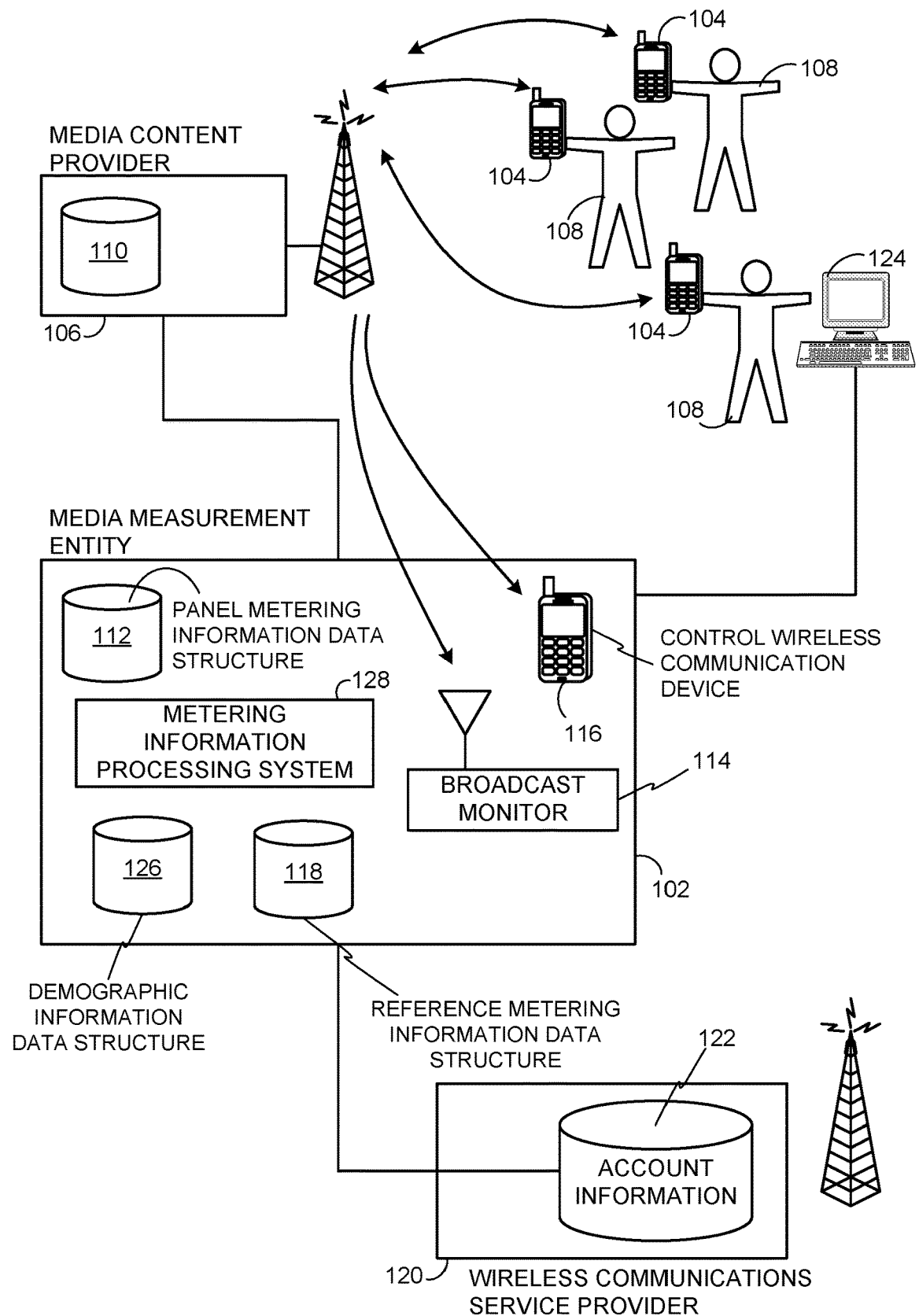
FIG. 1 is a block diagram illustrating an example media measurement entity that is configured to monitor metering information generated by a plurality of wireless communication devices configured to receive media content from a media content provider.

FIG. 1 is a block diagram illustrating an example media measurement entity 102 that is configured to analyze panel metering information generated by a plurality of wireless communication devices 104 configured to receive media content from a media content provider 106. The wireless communication devices 104 may be, for example, cellular telephones, pagers, any cellular communication device (e.g., handheld cellular communication devices), personal digital assistants ("PDA's"), handheld wireless computers, wireless gaming devices, or any other wireless communication device that may be used to receive media content from the media content provider and present the received media content. In some example implementations, a wireless communication device 104 may be implemented using a cellular mobile telephone having a display, a speaker, and/or a headset jack for presenting media content to a user. As used herein, a cellular communication device is a device that communicates with one or more transceiver towers having respective wireless telecommunication base stations connected thereto to exchange information (e.g., voice information, data, control information, etc.) with a telecommunications system. The transceiver towers are located in respective cell areas or cell sites throughout a geographic area. The cellular communication device can be configured to work in connection with any wireless telecommunication standard including any analog and/or digital communication standards such as, for example, Advanced Mobile Phone System (AMPS), Code Division Multiple Access (CDMA), Time Division Multiple Access (TDMA), Global System for Mobile communications (GSM), Enhanced Data rates for Global Evolution (EDGE), General Packet Radio Service (GPRS), Personal Digital Communications (PDC), Personal Communication Services (PCS), Personal Handy-phone System (PHS), etc.

The media content may include, for example, video content (e.g., television programming, movies, animations, MPEG-2, MPEG-4, Windows Media Video ("WMV"), QuickTime® Movie, Real Video, etc.), audio content (e.g., radio programming, Internet radio, satellite radio, MPEG-3, Windows Media Audio ("WMA"), Real Audio, etc.), video game content, graphics content (e.g., electronic art, photos, pictures, etc.), Internet information (e.g., web pages, rich site summary ("RSS"), text notifications, etc.), interactive media content, or any other content that may be delivered by the media content provider 106. The media content may include, for example, entertainment content, educational content, news, advertising, demographics-based targeted advertising, geographic-based targeted advertising, interest-based targeted advertising, etc. The media content provider 106 may deliver the media content in compressed and/or uncompressed formats and in encrypted and/or unencrypted formats. Although one media content provider (e.g., the media content provider 106) is shown, any quantity of media content providers may deliver media content to the wireless communication devices 104, and the wireless communication devices 104 are configured to generate panel metering information associated with media content delivered by any of the media content providers.

Panel metering information may be generated based on information embedded in, for example, header fields or any other fields of transmitted network data packets used to deliver media content. Additionally or alternatively, some of the panel metering information may be embedded in the media content information and may be collected while decoding (e.g., decompressing, reconstructing, rendering, etc.) the media content. Example information that may be embedded in data transmitted by the media content provider 106 to generate panel metering information is described below in connection with FIG. 9. In some example implementations, ancillary codes (e.g., audio codes, video codes, etc.) may be embedded in media content (by, for example, the media content provider 106, media producers, media networks, etc.) and extracted therefrom by the wireless communication devices 104 to generate the panel metering information. Additionally or alternatively, the wireless communication devices 104 may generate video and/or audio signatures based on the presented media content. Another example method that may be used to generate panel metering information involves presenting surveys or individual questions to the panel members 108 via their respective wireless communication devices 104. The surveys or questions may be configured to obtain subjective feedback from the panel members 108 pertaining to their likes, dislikes, or preferences associated with media content presented by the wireless communication devices 104.

In some example implementations, panel metering information may also include information indicative of web browser usage (e.g., web sites visited) and interactive application usage (e.g., products investigated, purchases made, etc.). Example interactive usage that can be metered includes detecting advertisements clicked on or selected by a user to further investigate or obtain more information about the advertised product. For example, a metering process may be configured to trap, intercept, or otherwise detect user selections to detect when a person selects (e.g., clicks) on an advertisement or a menu option to retrieve further information on the advertised product. In addition, the panel metering information may include location information indicative of the geographic location of the wireless communication devices 104 while presenting media content. The location information may be generated using location detection devices (e.g., global position system ("GPS") devices, dead reckoning devices, electronic compasses, accelerometers, location code detectors, etc.) in the wireless communication devices 104 or using triangulation techniques involving detecting distances from various cellular and/or media broadcast transmission towers. Additionally or alternatively, the location information may be indicative of the location of a cell tower or any wireless network access point (e.g., an IEEE 802.11 access point, a Wi-FI® access point, a Bluetooth® access point, etc.) transmitting the media content to the wireless communication devices 104. For example, the panel metering information may include cellular tower identifiers and/or broadcast tower identifiers identifying one or more cellular towers and/or one or more broadcast towers from which the wireless communication devices 104 receive media content.

The media measurement entity 102 may generate reports that include media consumption information, media exposure information, media ratings, perceived preferences of the panel members 108, wireless communication device usage information, etc. The media measurement entity 102 may deliver the reports to the media content provider 106 and/or any other entity (e.g., a wireless communications service provider 120, media content producers, advertising companies, etc.) requesting such information.

As indicated in FIG. 1, the media content provider 106 delivers media content to the wireless communication devices 104 and the wireless communication devices 104, in turn, communicate panel metering information to the media content provider 106 and/or directly to the media measurement entity 102. When an audience member or a panel member 108 selects particular media content via a respective wireless communication device 104, the wireless communication device 104 requests the selected media content from the media content provider 106. The media content provider 106, in turn, delivers the requested media content to the requesting wireless communication device 104 using a unicast communication. Additionally or alternatively, the media content provider 106 may continuously deliver a plurality of media content using media broadcast or multicast technologies. The wireless communication devices 104 may then select a particular media program (e.g., a broadcasted or multicasted media program) to decode in response to a media selection made by the panel member 108.

A broadcast communication delivers the same data to all of the wireless communication devices 104 that are within range to receive communication signals from a cell tower or a plurality of cell towers used to transmit the broadcast communication. A multicast communication delivers the same data to selected ones of the wireless communication devices 104 or a selected subset of the wireless communication devices 104 that are within range to receive communication signals from a cell tower or a plurality of cell towers used to transmit the multicast communication. For example, where two of the wireless communication devices 104 are within range of receiving communications from a cell tower used to transmit multicast data and only one of the wireless communication devices 104 is selected (e.g., based on pay-per-view, subscription based selection, etc.) to receive the multicast data, the selected wireless communication device 104 will be able to receive and present the media content in the multicast data while the non-selected wireless communication device 104 will not be able to receive and present the media content. The wireless communication devices 104 selected to receive the multicast communication may be specified in the multicast data stream using one or more types of identification information including, for example, internet protocol (IP) addresses, electronic serial numbers (ESN's), subscriber identity module (SIM) card identifiers, phone numbers, media terminal identifiers, etc.

In some example implementations, each of the wireless communication devices 104 or some of the wireless communication devices 104 may be configured to establish a back channel link (e.g., a return channel, a reverse channel, a return path, etc.) with the media content provider 106 or any other entity associated with transmitting media content or metering. A back channel link may be used to exchange information between a wireless communication device 104 and another entity. The information may include control commands communicated by the media content provider 106 or any other entity to the wireless communication device 104 to control (e.g., start, stop, pause, skip, fast forward, rewind, etc.) a presentation of media content. The information may also include interactive commands or other interactive data exchanged between the wireless communication device 104 and the media content provider 106. The information may also include targeted advertising delivered by the media content provider 106 or another entity to a wireless communication device 104 based on, for example, demographic information associated with a user of the wireless communication device 104 or a geographic location of the wireless communication device 104. The information may include any other information described below. The example apparatus and methods described herein may be configured to monitor information communicated via the back channels associated with the wireless communication devices 104 to generate panel metering information. In this manner, metering information may be collected in connection with, for example, targeted advertising, quality of service, media content segmented by geographic locations, time shifting of media content presentations, etc. In some example implementations, the information described above as being communicated via the back channel can alternatively or additionally be communicated via a forward link of a broadcast, a multicast, or a unicast communication and can be monitored on the forward link to generate metering information.

The media content provider 106 may use one or more communication standards or protocols to deliver media content. For example, the media content provider 106 may deliver the media content using a plurality of frequency bands, sender IP addresses, etc. to which the wireless communication devices 104 may tune. An example media delivery technology that the media content provider 106 may use to deliver media includes a forward link only ("FLO") technology that is defined by the Telecommunications Industry Association ("TIA®") in standard TIA-TR47.1—"Terrestrial Mobile Multimedia Multicast based on Forward Link Only Technology." Example media content delivery technologies and services based on FLO technology are developed and sold by MediaFLO USA, Inc. of San Diego, Calif. Another example media delivery technology that the media content provider 106 may use to deliver media includes Digital Video Broadcasting for Handheld devices technology ("DVB-H"), which is defined in standard TIA-TR-47.2—"Terrestrial Mobile Multimedia Multicast based on DVB-H Technology." In other example implementations, the media content provider 106 may deliver the plurality of media content using other communication standards including, for example, a time division multiple access ("TDMA") communication protocol, the global system for mobile ("GSM®") communication protocol, a code division multiple access ("CDMA") communication protocol, a wideband CDMA communication protocol, etc.

The media content provider 106 may store the panel metering information received from the wireless communication devices 104 in a panel metering information data structure 110. The media content provider 106 may periodically or aperiodically communicate the panel member metering information to the media measurement entity 102. In the illustrated example, the media measurement entity 102 stores the panel metering information in another panel metering information data structure 112 and subsequently validates and/or analyzes the panel member metering information as described below. Although not shown, in alternative example implementations, the wireless communication devices 104 may communicate the panel metering information to a wireless communications service provider 120 and the wireless communications service provider 120 may, in turn, communicate the panel metering information to the media measurement entity 102. In yet another alternative example implementation, the wireless communication devices 104 may communicate the panel metering information directly to the media measurement entity 102 and/or any combination of the media measurement entity 102, the media content provider 106 and/or the wireless communications service provider 120. In any case, any one or more of the media measurement entity 102, the media content provider 106, and the wireless communications service provider 120 can be used to implement a central collection facility for the panel metering information from the wireless communication devices 104.

The media measurement entity 102 may use reference metering information to analyze the panel member metering information. Reference metering information includes metering information of all or a subset of all the media content delivered by the media content provider 106. For example, for a given time period (e.g., a 24-hour period, a week period, etc.), the media measurement entity 102 may meter a different (or same) subset of media content than that metered during other previous or subsequent timer periods. To generate reference metering information, the media measurement entity 102 includes a broadcast monitor 114 and a control wireless communication device 116. In the illustrated example, the broadcast monitor 114 includes a media content meter (e.g., a media content meter 302 of FIG. 3) that is configured to monitor and meter all of the media content delivered by the media content provider 106. For instance, if the media content provider 106 broadcasts or multicasts a plurality of media programs simultaneously via a plurality of channels (e.g., frequency channels, time slot channels, code division channels, etc.), the broadcast monitor 114 monitors all of the channels and generates and/or collects the reference metering information associated with each of the media programs. In the illustrated example, the broadcast monitor 114 is configured to store the reference metering information in a reference metering information data structure 118 for subsequent use by the media measurement entity 102 to validate and/or analyze the panel metering information generated by the wireless communication devices 104.

In alternative example implementations, the broadcast monitor 114 may be configured to monitor only a subset of the media content delivered by the media content provider 106. For example, the media measurement entity 102 or any other entity (e.g., customers that purchase services to obtain the metered information or metering analysis reports) may specify a subset of the media content to be metered, and the broadcast monitor 114 may be configured to monitor the identified subset of media content typically consumed by persons associated with a particular age range and generate and/or collect reference metering information for only the identified subset of media content.

In the illustrated example, the control wireless communication device 116 includes a media content meter (e.g., a media content meter 202 of FIG. 2) that is configured to monitor and meter only a subset of the media content delivered by the media content provider 106. The media measurement entity 102 may associate the control wireless communication device 116 with a subset of audience members categorized according to a particular demographic characteristic (e.g., age, income level, family status, geographic location, etc.). Example demographic information is described below in connection with FIG. 6. The control wireless communication device 116 may monitor an identified subset of media content typically consumed by the subset of audience members and generate and/or collect reference metering information for only the identified subset of media content. Although only one control wireless communication device (e.g., the control wireless communication device 116) is depicted, the media measurement entity 102 may include a plurality of control wireless communication devices substantially similar or identical to the control wireless communication device 116. The media measurement entity 102 may configure each of the control wireless communication devices to monitor respective subsets of media programs identified as typically consumed by respective groups of audience members categorized by, for example, demographic characteristics. In the illustrated example, the control wireless communication device 116 and any other control wireless communication devices store the reference metering information in the reference metering information data structure 118.

In some example implementations, the reference metering information collected by the control wireless communication device 116 can be compared with known media content information (e.g., channel lineup and program scheduling information obtained from the media content provider 106) to confirm whether the metering software or hardware (e.g., the meter 202 of FIG. 2) in the control wireless communication device 116 is producing accurate metering information. Different modes of operation of control wireless communication devices (e.g., the control wireless communication device 116) can be tested based on known media content information. For example, a first control wireless communication device may be configured to collect reference metering information based on only a particular media content channel. A second control wireless communication device may be configured to collect reference metering information from all channels while spending a predetermined amount of time (e.g., five seconds, five minutes, etc.) on each channel and cycling through all the channels repeatedly. The media measurement entity 102 can then analyze the reference metering information to ensure that it is accurate based on known information (e.g., channel lineup and program scheduling information obtained from the media content provider 106). In some example implementations, whether the metering software and/or hardware in the control wireless communication device 116 is producing accurate metering information may be indicative of whether the metering software and/or hardware in the wireless communication devices 104 in the field are producing accurate metering information when, for example, the metering software and/or hardware in the control wireless communication device 116 is identical or substantially similar to the metering software and/or hardware in the wireless communication devices 104 in the field.

The wireless communications service provider 120 may provide wireless communication services to the wireless communication devices 104. The wireless communication services may include voice services and/or data services. The wireless communications service provider 120 includes an account information data structure 122 to store account information (e.g., name, postal address, wireless communication device identification, wireless communication device make/model, voice/data plan type, etc.) for the subscribers of the wireless communications service provider 120 including at least some of the panel members 108.

Although the media content provider 106 is depicted in FIG. 1 as delivering media content directly to the wireless communication devices 104, in alternative example implementations, the media content provider 106 may deliver media content to the wireless communications service provider 120 and the wireless communications service provider 120 may, in turn, deliver the media content to the wireless communication devices 104 using, for example, any one or more of the media content delivery technologies described above or any other delivery technology.

The media measurement entity 102 may use various methods to select the panel members 108 to participate in a market research program. In some example implementations, all wireless communication devices used by subscribers of the media content provider 106 and/or the wireless communications service provider 120 may generate and/or collect panel metering information. In another example implementation, the media measurement entity 102, the media content provider 106, and/or the wireless communications service provider 120 may randomly select a subset of the wireless communication devices 104 to continuously or at predefined times generate panel metering information. Randomly selected subsets of the wireless communication devices 104 may be reselected at predefined intervals (e.g., every day, every 90 days, etc.). Additionally or alternatively, the media measurement entity 102 may advertise opportunities for participation in a market research metering program via the media content provider 106 and/or the wireless communications service provider 120. In some example implementations, agents or representatives of the media measurement entity 102 may personally visit homes of potential panel members to offer opportunities to participate in the metering program. Alternatively or additionally, the media measurement entity 102 may advertise the metering program directly to users of the wireless communication devices 104, which may include subscribers of the media content provider 106 and/or subscribers of the wireless communications service provider 120. For example, the media measurement entity 102 may advertise the metering program by sending messages (e.g., via e-mail, via a web page, via wireless application protocol ("WAP"), etc.) to the wireless communication devices 104 and/or a personal computer 124 including a selectable option indicating a person's consent to participate in the metering program.

When a person provides their approval to participate in the metering program, the person becomes one of the panel members 108 and the panel member's corresponding wireless communication device 104 is then configured to generate and/or collect panel metering information whenever the panel member 108 consumes media or is exposed to media presented via the wireless communication device 104. For example, the media measurement entity 102, the media content provider 106, and/or the wireless communications service provider 120 may transmit metering software (e.g., a media content meter 202 of FIG. 2) to the wireless communication device 104 to enable metering. Alternatively, the metering software and/or hardware may be pre-installed on the wireless communication device 104 so that the media measurement entity 102, the media content provider 106, and/or the wireless communications service provider 120 need only communicate to the wireless communication device 104 a message instructing the wireless communication device 104 to enable the metering software and/or hardware. The metering software and/or hardware may be configured to monitor all of the media content presented by the wireless communication device 104 or only a subset of media content. For instance, the metering software may be configured to monitor media content during particular times, media content delivered via particular channels, and/or only particular media content programming.

The media measurement entity 102 may analyze the panel metering information using different anonymity levels selected by the panel members 108. For example, the media measurement entity 102 may analyze the panel metering information by maintaining anonymity of the panel members 108 (e.g., using no demographic information associated with the panel members 108) or in connection with different amounts or levels of demographic and/or personal information pertaining to the panel members 108. The media measurement entity 102 may collect demographic and/or personal information from randomly selected panel members 108 and/or from specifically selected panel members 108. For example, random surveys may be administered to determine typical demographics of wireless communication device users.

To obtain demographic and/or personal information, the media measurement entity 102 may provide a web page that the panel members 108 may access via the wireless communication devices 104 and/or the personal computer 124 to provide their demographic and/or personal information. For example, in response to a panel member 108 electing to participate in a metering program, software on the member's wireless communication device 104 may display a user interface screen via which the panel member 108 can provide demographic and/or personal information. Alternatively, the software on the wireless communication device 104 may prompt the panel member 108 to access a web site via, for example, the wireless communication device 104, the personal computer 124, and/or any other web-enabled device to provide demographic and/or personal information.

Alternatively or additionally, the media measurement entity 102 may provide a telephone-accessible voice interface (e.g., a voice interactive response system, an agent, etc.) that the panel members 108 can access using the wireless communication devices 104 and/or a wired or landline telephone to provide their demographic and/or personal information. The voice interface may be called by the panel members 108 or an agent of the media measurement entity 102 may call the panel members 108.

In other example implementations, the media measurement entity 102 may obtain account information associated with the panel members 108 from the account information data structure 122 of the wireless communications service provider 120. The account information data structure 122 may store encrypted information so that the media measurement entity 102 can retrieve only select information per the discretion of the wireless communications service provider 120 and/or the panel members 108. For example, the media measurement entity 102 may provide a panel member phone number to the account information data structure 122 to retrieve only the zip code associated with that phone number. The media measurement entity 102 may then use zip codes of the panel members 108 to determine typical demographics (e.g., income, employment, etc.) associated with the geographic areas in which the panel members 108 live. Other account information that may be available to the media measurement entity 102 includes, for example, postal address, birth date, etc.

In some example implementations, the demographic information may be stored in the wireless communication devices 104 and the metering software may be configured to tag the panel metering information with the demographic information. In this manner, the wireless communication devices 104 can transmit the panel metering information along with the demographic information to the media content provider 106. In an alternative example implementation, the demographic information is stored in a demographic information data structure 126 at the media measurement entity 102. The demographic information in the demographic information data structure 126 for each panel member 108 may be tagged with a unique identifier (e.g., a wireless device identifier) associated with that panel member 108. In addition, each of the wireless communication devices 104 may tag panel metering information with a respective unique identifier. In this manner, the media measurement entity 102 can associate demographic information stored in the demographic information data structure 126 with the panel metering information from the wireless communication devices 104 based on the unique identifiers used to tag the demographic information and the panel metering information.

To process the metering information (e.g., the panel metering information, the reference metering information, etc.), the media measurement entity 102 is provided with an example metering information processing system 128. The example metering information processing system 128 is configured to retrieve metering information from the metering information data structures 112 and 118 and demographic information from the demographic information data structure 126. In the illustrated example, the example metering information processing system 128 is configured to perform analysis on any one or more types of metering information and/or the demographic information to generate analysis results indicative of media consumption and/or media exposure. In addition, the example metering information processing system 128 may be configured to generate reports based on the analysis results.

Figure 2:
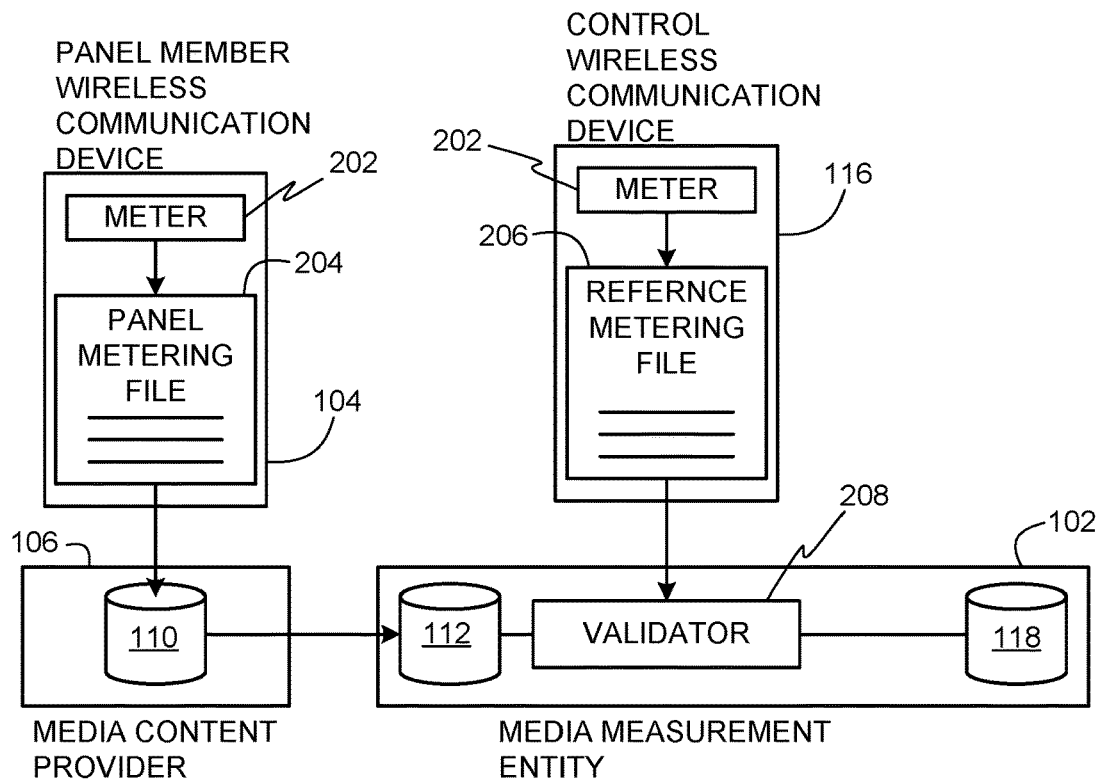
FIG. 2 illustrates a detailed depiction of a panel member wireless communication device that generates panel metering information and a control wireless communication device that generates reference metering information used to validate and/or analyze the panel metering information.

FIG. 2 illustrates a detailed depiction of a panel member wireless communication device 104 that generates panel metering information and a control wireless communication device 116 that generates reference metering information used to validate the panel metering information. As shown in FIG. 2, each of the panel member wireless communication device 104 and the control wireless communication device 116 includes a media content meter ("meter") 202. In the illustrated example, the meters 202 are configured to monitor and meter media content presented by the wireless communication devices 104 and 116 to generate and/or collect metering information. In particular, the meter 202 associated with the panel member wireless communication device 104 generates panel metering information and stores the panel metering information in a panel metering file 204. In the illustrated example, the panel metering file 204 can be used to store any type of metering information described below in connection with FIGS. 4, 5, 7-9, and 11 and/or any other types of metering information. The meter 202 associated with the control wireless communication device 116 generates reference metering information and stores the reference metering information in a reference metering file 206.

The media measurement entity 102 periodically or aperiodically receives metering information (e.g., panel metering information and reference metering information) to perform subsequent analyses. In particular, the panel member wireless communication device 104 may periodically or aperiodically communicate the panel metering information stored in the panel metering file 204 to the media content provider 106. The media content provider 106 stores the received panel metering information in the panel metering information data structure 110 and periodically or aperiodically communicates the panel metering information to the media measurement entity 102, which stores the panel metering information in the panel metering information data structure 112. The control wireless communication device 116 communicates the reference metering information stored in the control metering file 206 to the media measurement entity 102, which stores the reference metering information in the reference metering information data structure 118.

The media measurement entity 102 initially validates the panel metering information based on the reference metering information to ensure that the panel metering information is valid (e.g., accurate, trustworthy, indicative of media consumed by the panel members 108 of FIG. 1, etc.). To validate the panel metering information, the media measurement entity 102 is provided with a validator 208, which may be implemented using, for example, a comparator. In the illustrated example, the validator 208 is configured to retrieve panel metering information from the panel metering information data structure 112 and reference metering information from the reference metering information data structure 118. For each validation operation, the validator 208 retrieves and compares corresponding panel and reference metering information records or entries associated with the same time of day, date, and media channel or station. If the panel metering information does not substantially match the corresponding reference metering information or if the reference metering information data structure 118 does not have reference metering information corresponding to the panel metering information, then the validator 208 indicates the panel metering information invalid. For example, if the reference metering information indicates that no media content was provided over a particular channel at a particular time on a particular day, then any panel metering information indicating that a wireless communication device 104 was tuned to that channel at that time on that day is regarded as invalid or discarded.

Figure 3:
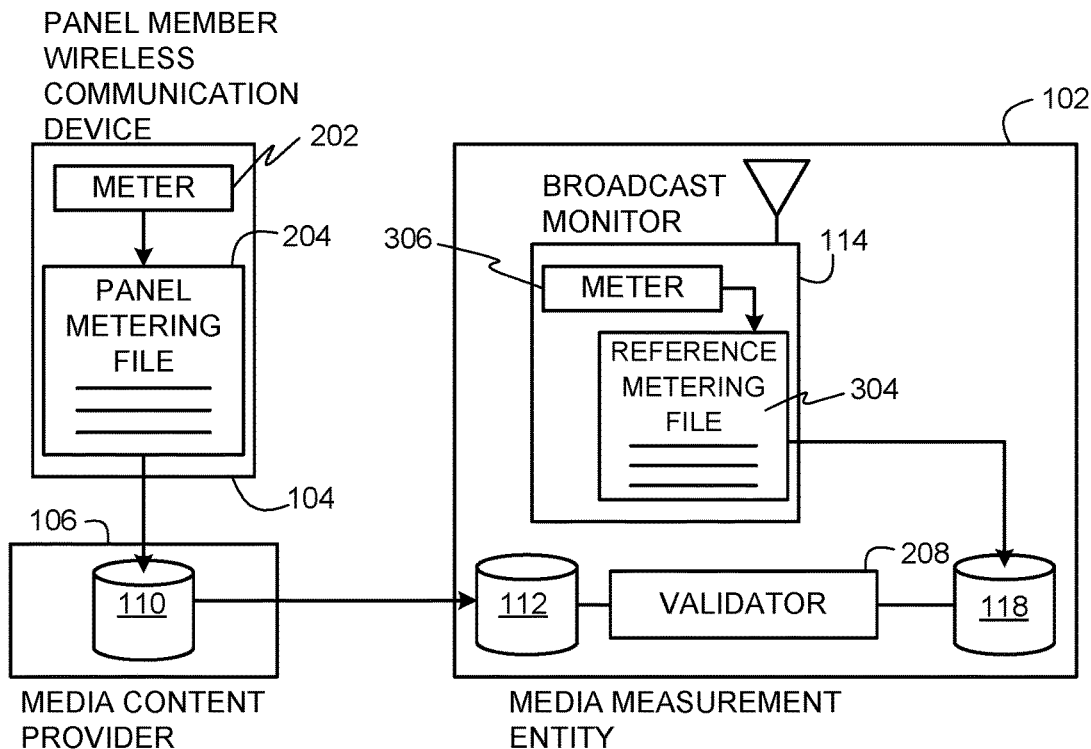
FIG. 3 illustrates a detailed depiction of a panel member wireless communication device that generates panel metering information and a broadcast monitor that generates reference metering information used to validate and/or analyze the panel metering information.

FIG. 3 illustrates a detailed depiction of the panel member wireless communication device 104 that generates panel metering information and the broadcast monitor 114 that generates reference metering information used to validate the panel metering information. As described above, in the illustrated example, the broadcast monitor 114 is configured to monitor and meter all of the media content delivered by the media content provider 106. To meter the media content, the broadcast monitor 114 is provided with a media content meter ("meter") 302. The meter 302 stores the reference metering information in a reference metering file 304. The broadcast monitor 114 then communicates the reference metering information from the reference metering file 304 to the reference metering information data structure 118. In this manner, the validator 208 can subsequently validate the panel metering information generated by the panel member wireless communication device 104 as described above in connection with FIG. 2.

In the illustrated examples of FIGS. 2 and 3, the validator 208 also validates the panel metering information using other validation techniques. For example, the validator 208 may check the panel metering information for consistency to ensure that the panel metering information does not include any erratic (senseless media consumption or exposure patterns) or corrupted information. The validator 208 may discard (or tag as invalid) any panel metering information indicative of impossible or unlikely media consumption or exposure events (e.g., presenting two or more media programs broadcast at the same time over different channels). The validator 208 may also discard (or tag as invalid) any panel metering information indicating that the respective wireless communication device and/or media decode/presentation hardware and/or software thereof was/were turned off (e.g., based on on/off status information 502 of FIG. 5). The validator 208 may also discard (or tag as invalid) panel metering information indicative of short media consumption or exposure events or impossibly long media consumption or exposure events (e.g., based on viewing session start and end times 802 and 804 of FIG. 8 and/or content session start and end times 902 and 904 of FIG. 9). In some example implementations, the validator 208 may also discard (or tag as invalid) any panel metering information indicating that the respective wireless communication device 104 was in use for a call while presenting media content (e.g., based on call information 506 of FIG. 5). The validator 208 may also discard (or tag as invalid) panel metering information collected while the wireless communication device 104 was receiving a signal strength that was relatively low, inadequate, or below a threshold limit (e.g., based on signal strength information 510 of FIG. 5) causing, for example, a video presentation to be distorted or not clearly visible. The validator 208 may also discard (or tag as invalid) any panel metering information collected while the wireless communication device 104 was not being carried by the panel member 108 (e.g., based on carrying device information 702 of FIG. 7). Of course, the validator 208 may additionally or alternatively discard (or tag as invalid) panel metering information based on other criteria such as, for example, roaming status, time of day, technical issues affecting the wireless communication device 104, etc.

FIGS. 4 through 9 depict example data structures that may be used to store information associated with metering media content presented by the wireless communication devices 104. The information described in connection with FIGS. 4-9 may be used as panel metering information in addition to other panel metering information generated based on or extracted from media content or data packets associated with the delivery of the media content. The information depicted in the example data structures of FIGS. 4 through 9 does not comprise an exhaustive list. In some example implementations, additional or alternative information may be provided and fewer or more information than that depicted in FIGS. 4 through 9 may be provided. For purposes of discussion, the example data structures of FIGS. 4 through 9 are depicted as tables having a plurality of information fields. In example implementations, the information indicated in each of the example data structures of FIGS. 4 through 9 may be stored using any other configuration or format. For example, the information may be stored using look-up tables, text files, databases, etc. In addition, although the example data structures of FIGS. 4 through 9 are depicted as separate data structures, in some example implementations one or more or portions of the data structures may be combined or any one data structure may be divided into two or more data structures.

The data structures of FIGS. 4 through 9 may be stored in the wireless communication devices 104 and/or at one or more of the media measurement entity 102, the media content provider 106, and/or the wireless communications service provider 120. The wireless communication devices 104 may communicate the information stored therein associated with one or more of the data structures of FIGS. 4 though 9 to the media measurement entity 102. The media measurement entity 102 may use the information from the data structures of FIGS. 4 through 9 to perform panel metering information analyses.

Now turning to FIG. 4, an example device identification data structure 400 may be used to store identification information associated with a panel member's wireless communication device 104 (FIGS. 1-3). In the illustrated example, to enable the media content provider 106 (FIG. 1) to identify the wireless communication devices 104, the example device identification data structure 400 includes a media terminal identifier 402 (e.g., a telephone number, an electronic serial number ("ESN"), etc.). The media content provider 106 may use the media terminal identifier 402 to communicate requested media content or subscribed to media content to respective wireless communication devices 104.

To enable the wireless communications service provider 120 to identify the wireless communication devices 104, the example device identification data structure 400 includes a wireless device identifier 404 (e.g., a telephone number, an electronic serial number ("ESN"), a unique hardware identifier, a media access control ("MAC") address, etc.). The wireless communications service provider 120 may use the wireless device identifier 404 to enable the wireless communication device 104 to communicate voice and/or data. In addition, the account information (e.g., demographic and/or personal information) stored in the account information data structure 122 may be tagged with the wireless device identifier 404. In this case, the media measurement entity 102 may obtain the wireless device identifier 404 of each of the wireless communication devices 104 and use the wireless device identifier 404 to retrieve demographic and/or personal information from the account information data structure 122.

To identify the wireless communications service provider 120, the example device identification data structure 400 includes a wireless network service provider identifier 406. The example device identification data structure 400 also includes a wireless device make and model 408 and 410. The media measurement entity 102 may use the wireless network service provider identifier 406, the wireless device make 408, and/or the wireless device model 410 as demographic information to generate media consumption and/or media exposure reports.

FIG. 5 depicts an example device status information data structure 500 that may be used to store device status information associated with a panel member's wireless communication device 104. In the illustrated example, the example device status information data structure 500 includes on/off status information 502. The wireless communication devices 104 may store time and status information indicative of when the wireless communication devices 104 are turned on and/or turned off. The example device status information data structure 500 also includes battery status information 504. The wireless communication devices 104 may store time and status information indicative of when the batteries of the wireless communication devices 104 have particular energy charge levels. The example device status information data structure 500 also includes call information 506. The wireless communication devices 104 may store time and duration information indicative of when the wireless communication devices 104 were used for making telephone calls. The example device status information data structure 500 also includes application usage information 508. The wireless communication devices 104 may store time and duration information indicative of when software applications on the wireless communication devices 104 were used. In some example implementations, the application usage information 508 can also include software application identification information indicative of the software applications that were used. The example device status information data structure 500 also includes signal strength information 510. The wireless communication devices 104 may store time, signal strength, and duration information indicative of received signal strengths at particular times for particular durations. For example, if the wireless communication device 104 is very distant from a nearest transceiver tower, the signal strength may be relatively low causing the wireless communication device 104 to receive only partial or distorted media content (e.g., a video presentation would be distorted or not clearly visible). In some example implementations, the media measurement entity 102 may use the signal strength information 510 to determine the location of the wireless communication device 104 and, in turn, determine the type of media content that was delivered to the wireless communication device 104. Also, the media measurement entity 102 may use the signal strength information 510 to generate quality of service ("QoS") information to analyze the panel metering information in connection with signal strength to, for example, determine how strong or weak signal strengths affected media consumption by users of the wireless communication devices 104 or the users' media exposure.

Although not shown, the example device status information data structure 500 may also be provided with hardware and/or software configurations of the wireless communication device 104. For example, the example device status information data structure 500 may include total memory, memory used, presence of subscriber identity module ("SIM") card, headset connected, etc.

Figure 6:
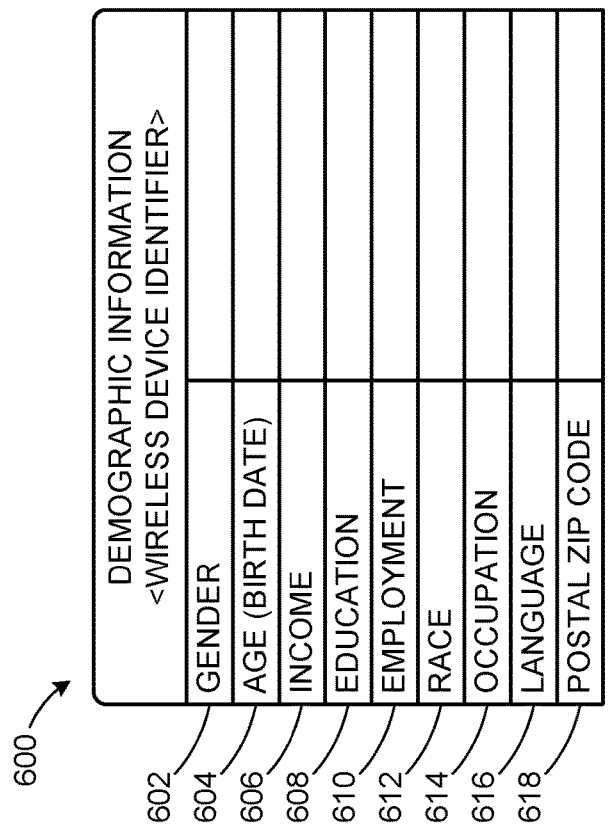
FIG. 6 depicts an example demographic information data structure that may be used to store demographic information associated with a panel member.

FIG. 6 depicts an example demographic information data structure 600 that may be used to store demographic information associated with the panel members 108. In the illustrated example, the demographic information data structure 600 includes gender information 602, age (birth date) information 604, income information 606, education information 608, employment information 610, race information 612, occupation information 614, language information 616, and postal zip code information 618.

Figure 7:
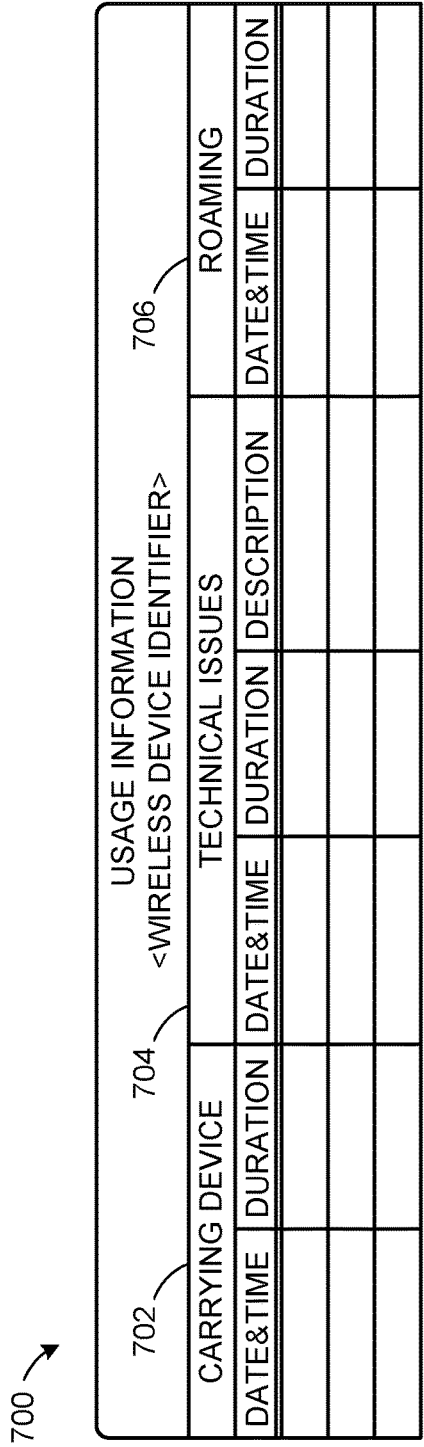
FIG. 7 depicts an example usage information data structure that may be used to store usage information associated with a panel member's wireless communication device.

FIG. 7 depicts an example usage information data structure 700 that may be used to store usage information associated with a panel member's wireless communication device 104. To indicate when the panel members 108 were carrying their wireless communication devices 104, the example usage information data structure 700 includes carrying device information 702. The wireless communication devices 104 may store date, time, and duration information indicative of when respective panel members 108 were carrying their respective wireless communication devices 104. For example, each of the wireless communication devices 104 may display a user interface screen via which the panel members 108 can provide the carrying device information 702. Alternatively, the wireless communication devices 104 may be provided with detectors (e.g., motion sensors, temperature sensors, electronic compasses, etc.) to determine when the panel members 108 are carrying the wireless communication devices 104. In this manner, the wireless communication devices 104 may automatically generate the carrying device information 702.

To indicate the time, duration, and nature of technical issues associated with the wireless communication devices 104, the example usage information data structure 700 includes technical issues information 704. The technical issues information 704 are indicative of conditions (e.g., problems, device conditions, hardware conditions, software conditions, communication problems, etc.) affecting the operation or operability of the wireless communication devices 104. The panel members 108 may provide the technical issues information 704 to their wireless communication devices 104 and/or the wireless communication devices 104 may automatically generate the technical issues information 704.

In some example implementations, the technical issues information 704 may include information indicative of broken, damaged, or worn device hardware (e.g., a damaged display/screen, a damaged speaker/headset jack, a damaged antenna, damaged buttons, etc.), device resets (e.g., master resets clearing all memory, configuration resets to default settings, warm boot resets, etc.), application errors (e.g., application errors on startup, inability to launch application plug-ins, extensions, or modules, application execution halts or freezes, application terminations or crashes during execution, runtime errors, etc.), communication performance problems (e.g., communication failures, dropped calls, failures to connect calls, failures to receive calls, poor or no network connectivity, failures to receive data, etc.), or any other types of technical issues. In some cases, the technical issues information 704 may be used to log when the wireless communication device 104 does not have sufficient resources (e.g., latest software versions, application plug-ins, memory space, etc.) to present particular media content. For example, the wireless communication device 104 may not have the required plug-ins or a correct software version to decode and/or present particular media content. Also, the wireless communication device 104 may not have sufficient processing power to decode particular media content and/or sufficient memory space to store undecoded and/or decoded media content.

In some example implementations, the technical issues information 704 may be used to log user-initiated, device-initiated, and/or system-initiated events that could affect a user's consumption of or exposure to media content presented by the wireless communication device 104. For example, user-initiated events may include events initiated by a user to, for example, navigate away from media content presented by a user. User-initiated events may include, for example, opening a different application (e.g., a calendar, a dialing window, a video game window, another media presentation application window, etc.) that may visually obstruct a presentation of video content being metered or that may be displayed simultaneously with the media content presentation being metered (and at least partially distract a user's attention away from the metered media content presentation). Device-initiated events may include, for example, alarm notifications, reminder notifications, low-battery notifications, or any other type of device-initiated notification or event that could affect a user's consumption of or exposure to media content presented by the wireless communication device 104. System-initiated events may include, for example, receiving a message (e.g., a short messaging service (SMS) text message), receiving a phone call, receiving network system notifications. Device-initiated or system-initiated events may include any other type of asynchronous events that may affect a user's consumption of or exposure to media content presented by the wireless communication device 104.

The media measurement entity 102 (FIG. 1) may use the technical issues information 704 during subsequent analysis to determine how much, if any, media exposure credit or media consumption credit to award, give, assign, or attribute to particular media content presented by the wireless communication device 104. For example, if the technical issues information 704 indicates that the wireless communication device 104 has a damaged screen, the media measurement entity 102 may credit an audio portion of presented media content but not credit its video portion. In addition, the media measurement entity 102 may use the technical issues information 704 to determine reasons for poor consumption of or exposure to particular media content. For example, if the technical issues information 704 indicates that the wireless communication device 104 (or substantial quantity of the wireless communication devices 104) did not have the required software plug-ins, extensions, applications, etc. or required media decoders to decode a particular media content, the media measurement entity 102 may conclude that analysis data indicating poor consumption of or exposure to that media content is attributable to the wireless communication device 104 not having the required software.

To indicate date, time, and duration of when the wireless communication devices 104 are carried outside of their local calling areas (e.g., roaming), the example usage information data structure 700 is provided with roaming information 706. The panel members 108 may provide the roaming information 706 to their wireless communication devices 104 and/or the wireless communication devices 104 may automatically generate the roaming information 706. In some example implementations, the roaming information 706 may also include the area (e.g., geographic area, calling area, network area, time zone, etc.) in which the wireless communication devices 104 are roaming. In this manner, the media measurement entity 102 may use the roaming information to determine the content programming schedules or delivery times (e.g., based on a channel lineup and content programming data structure 1000 of FIG. 10) associated with any media content presented by the wireless communication device 104 while roaming. For instance, media content delivered in a time zone (e.g., a roaming time zone) other than the home time zone of the wireless communication device 104 may be delivered according to a time schedule (e.g., media content programs are shifted by one-hour) different from that of the home time zone of the wireless communication device 104.

FIG. 8 depicts an example viewing session information data structure 800 that may be used to store viewing session information associated with a panel member's wireless communication device 104, and FIG. 9 depicts an example content session information data structure 900 that may be used to store content session information associated with a panel member's wireless communication device 104. The example viewing session information data structure 800 and the example content session information data structure 900 include some of the panel metering information generated and/or collected by the wireless communication devices 104 based on the media content provided by the media content provider 106 and presented by the wireless communication devices 104.

The example viewing session information data structure 800 (FIG. 8) is used to store panel metering information indicative of an entire media presentation duration or media presentation session during which the wireless communication device 104 is presenting media content. Each media presentation session may include one or more content sessions. A content session is associated with a particular program, show, or media program that one of the wireless communication devices 104 presents during a viewing session. If the wireless communication device 104 presents two consecutive media programs (e.g., two consecutive television shows), then one viewing session includes two content sessions. The example content session information data structure 900 (FIG. 9) is used to store panel metering information indicative of particular media content programs presented by the wireless communication devices 104 during viewing sessions.

As shown in FIG. 8, to store start times indicative of when the wireless communication devices 104 begin to present media content, the example viewing session information data structure 800 includes viewing session start time information 802. To store end times indicative of when the wireless communication devices 104 stop presenting media content, the example viewing session information data structure 800 includes viewing session end time information 804.

The example viewing session information data structure 800 also includes previous viewing session end time information 806. The previous viewing session end time information 806 may be used to store in each viewing session data record 808*a-c* the end time information 804 stored in the previous data record. The media measurement entity 102 may use the previous viewing session end time information 806 to determine whether any record entries (e.g., the record entries 808*a-c*) have been dropped or deleted by comparing the previous viewing end time session information 806 of a data record (e.g., the data record 808*c*) with the end time information 804 of an immediately previous data record (e.g., the data record 808*b*). If the previous viewing session end time information 806 of the data record 808*c* and the end time information 804 of the data record 808*b* do not match, the media measurement entity 102 can conclude that data records are missing between the data records 808*b* and 808*c*. For example, the data records may have been lost during transmission from the wireless communication device 104 to the media measurement entity 102 or may be corrupted or may not have been generated correctly.

To indicate the type of software or application that the wireless communication devices 104 use to present media content for each viewing session, the example viewing session information data structure 800 includes presentation software information 810. The wireless communication devices 104 may provide the name and version of the software used to present media content for each viewing session.

Turning to FIG. 9, some or all of panel metering information shown in the example content session information data structure 900 may be embedded in the data delivered by the media content provider 106 (FIG. 1). For example, some of the panel metering information shown in FIG. 9 may be included in header fields or any other fields of transmitted network data packets used to delivery media content. Additionally or alternatively, some of the panel metering information may be embedded in the media content information and may be extracted while decoding (e.g., decompressing, reconstructing, rendering, etc.) the media content.

As shown in FIG. 9, the example content session information data structure 900 includes content session start time information 902 and content session end time information 904 to indicate when the wireless communication devices 104 start and stop presenting particular media content. The example content session information data structure 900 also includes service provider information 906 to indicate the identification (e.g., name, identification code, etc.) of the media content service provider 106 (FIG. 1). Delivery type information 908 is used to indicate the communication protocols and/or transmission mediums used by the media content provider 106 to deliver the media content. In an example implementation, options for the delivery type information 908 may include over-the-air ("OTA") terrestrial delivery (e.g., FLO, DVB-H, etc.), OTA satellite delivery, Internet protocol ("IP") multicast, broadcast, unicast, general packet radio service ("GPRS"), evolution data only ("EVDO"), etc. Content type information 910 is used to indicate the type of media delivered such as, for example, video media, audio media, video/audio media, video games, graphics, web pages, Internet data, etc. Additionally or alternatively, the content type information 910 may be used to indicate whether media content was live broadcast media or a downloaded clip (e.g., delivered per-request, on-demand delivery, etc.).

To identify particular media programs, the example content session information data structure 900 includes program asset ID information 912, program name/title information 914, and episode name information 916. To identify distributors and providers of media content, the example content session information data structure 900 includes content distributor information 918 and content provider information 920.

The example content session information data structure 900 also includes channel number information 922 (e.g., a media programming provider channel number such as channel 9) and channel name information 924 (e.g., station call letters such as WBBM). To determine time offsets associated with delivery of IP packets, the example content session information data structure 900 is provided with IP time offset information 925. For example, the IP time offset information 925 may indicate the amount of time (e.g., due to network latency, switch/router hops, media content provider delay, etc.) required for an IP network packet to propagate from a source (e.g., the media content provider 106 of FIG. 1, a media content producer, etc.) to a destination (e.g., the wireless communication devices 104, the control wireless communication device 116, the broadcast monitor 114, etc.). The IP time offset information 925 may be used by the media measurement entity 102 to generate media consumption and/or exposure information associated with quality of service ("QoS"). In some example implementations, QoS information may also be generated based on other communication link characteristics such as, for example, the signal strength information 510 (FIG. 5). For example, the media measurement entity 102 may determine how QoS affects media consumption or exposure of particular media content by the panel members 108.

To determine a location of a wireless communication device 104 when, for example, the wireless communication device 104 received and/or presented a media presentation, the information data structure is provided with a transmitting tower ID 926 and location information 927. In the illustrated example, the transmitting tower ID 926 may include one or more cellular tower identifiers and/or broadcast tower identifiers identifying one or more cellular towers and/or one or more broadcast towers from which the wireless communication devices 104 receive media content. The media measurement entity 102 can then use the transmitting tower ID 926 to determine the location of cell towers that transmitted media content to the wireless communication devices 104 and/or the locations of the wireless communication devices 104 when they received and/or presented the media content. In some example implementations, the data structure 900 may additionally or alternatively be provided with an access point ID that identifies wireless network access points (e.g., IEEE 802.11 access points, Wi-Fi® access points, Bluetooth® access points, etc.) that transmitted media content to the wireless communication devices 104.

In the illustrated example, the location information 927 may be indicative of the location of the wireless communication devices 104 while receiving and/or presenting media content. The location information 927 may be generated using location detection devices (e.g., global position system ("GPS") devices) in the wireless communication devices 104, using triangulation techniques involving detecting distances from various cellular and/or media broadcast transmission towers, and/or using any other location determination system.

To identify technical media content specifications 928 (e.g., media content quality) associated with presented media content, the example content session information data structure 900 includes frames per second information 930, video resolution information 932, and audio quality information 934 (e.g., audio sampling rate, digital audio bit rate, stereo mode, mono mode, etc.). Although not shown, the technical media content specifications 928 may also include digital video bit rate or any other media bit rate information.

To identify usage data 936 associated with usage of media presentation software during each content session, the example content session information data structure 900 includes event count information 938, which starts at one for each session and increments as the session progresses. The example content session information data structure 900 also includes timestamp information 940 indicative of when the media presentation software is active. Duration information 942 indicates the amount of time for which the media presentation software is actively presenting media content (e.g., not paused or stopped by, for example, a user or a preemptive phone call) or the amount of time for which the media presentation software is in a particular operating mode (e.g., paused). Operation mode information 944 indicates a media presentation mode of the media presentation software such as, for example, whether the media presentation software was in a pause mode, a play mode, a stop mode, a fast forward mode, a rewind mode, etc. Time offset information 946 indicates whether media content was delivered live or on a delay (e.g., a one-second delay, delay may be dependent on duration of pause or other user input (rewind, fast forward, stop, etc.), etc.).

To identify system configurations associated with the presentation of media content, the example content session information data structure 900 is provided with presentation information 948. The presentation information 948 includes volume level information 950 indicative of the volume level of the wireless communication device 104 while presenting media content. The presentation information 948 also includes headset/speaker information 952 indicative of whether a headset or a speaker were enabled while the wireless communication device 104 presented media content. The presentation information 948 also includes screen contrast ratio information 954 indicative of the screen contrast ratio set on the wireless communication device 104 while presenting media content.

The types of information stored in the example content session information data structure 900 may differ when metering different types of media. For example, when metering a video program presentation, the types of information stored in the example content session information data structure 900 may be different from the types of information stored when metering video games, web pages, or audio presentations. In an example implementation used to meter video games executed by the wireless communication device 104, the example content session information data structure 900 may be used to store a game title, a skill level setting, a game level, a version, a vendor, and information about advertising presented during game play.

FIG. 10 depicts an example channel lineup and content programming data structure 1000 that the media measurement entity 102 (FIGS. 1-3) may use to analyze and/or validate the panel metering information generated by the wireless communication devices 104 (FIGS. 1-3). The data structure 1000 includes channel number information 1002, channel name information 1004, and scheduled media program entries 1006 indicating the times and channels associated with delivery of media content. During analyses of panel metering information, the media measurement entity 102 may compare the channel number information 1002 to the channel number information 922 (FIG. 9) of the example content session information data structure 900 (FIG. 9). The media measurement entity 102 may also compare the channel name information 1004 to the channel name information 924 (FIG. 9) of the example content session information data structure 900 (FIG. 9). Each of the scheduled media program entries 1006 may include a program asset ID (e.g., the program asset ID information 912 of FIG. 9), a program name/title (e.g., the program name/title information 914 of FIG. 9), an episode name (e.g., the episode name information 916 of FIG. 9), and/or content specifications (e.g., the content specifications 928, 930, 932, and 934 of FIG. 9).

Figure 11:
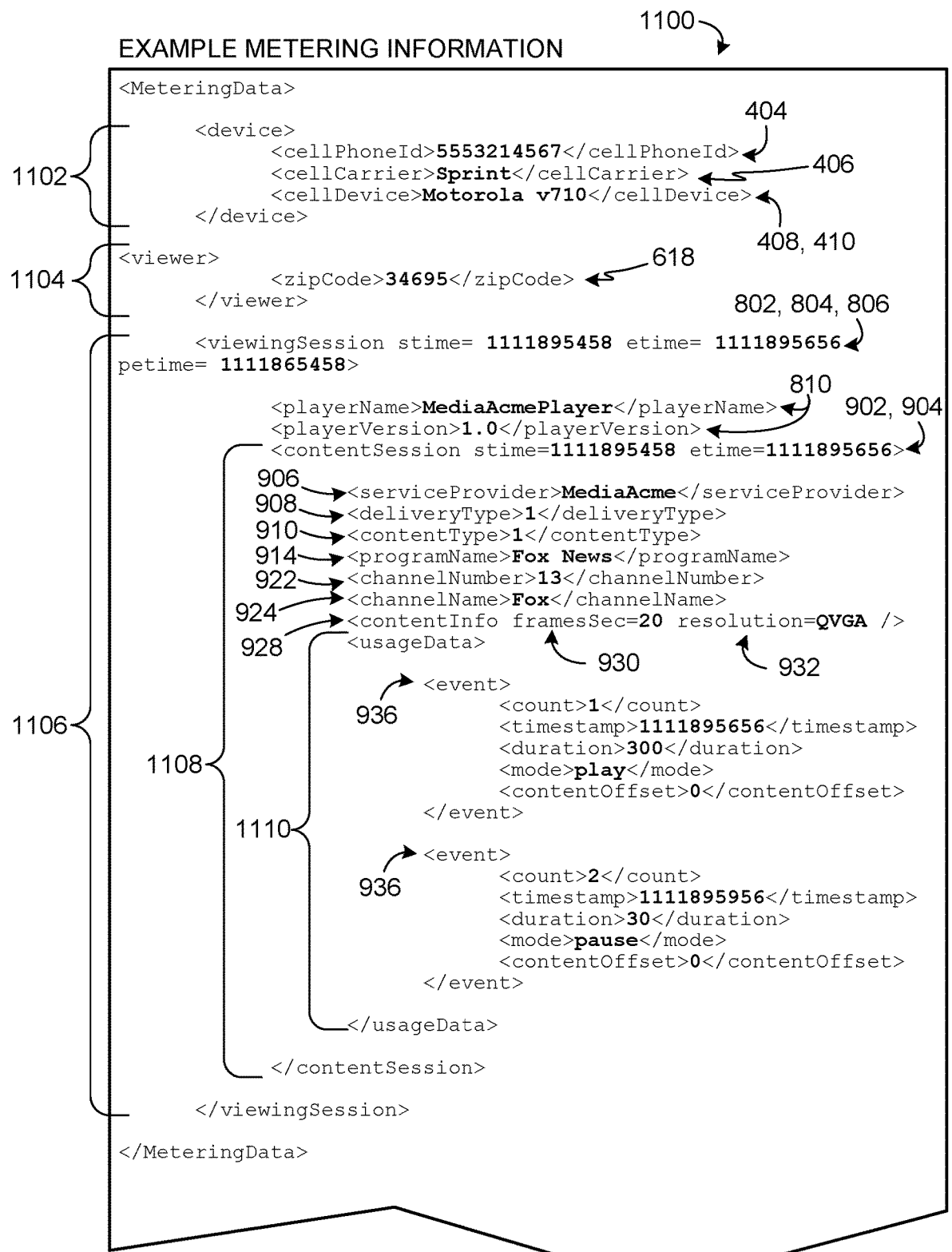
FIG. 11 depicts example metering data stored using an extensible markup language format.

FIG. 11 depicts example metering information 1100 stored using an extensible markup language ("XML") format (e.g., an XML file). In the illustrated example, the example metering information 1100 includes example panel metering information that may be generated by the wireless communication devices 104. However, the control wireless communication device 116 and/or the broadcast monitor 114 may generate and/or collect and organize reference metering information in a manner substantially similar or identical to the arrangement shown in FIG. 11. In the illustrated example, the panel metering information shown in FIG. 11 corresponds to information described above in connection with the data structures of FIGS. 4, 6, 8, and 9. However, in other example implementations, other types of information may also be included in the example metering information 1100.

To store device identification information, the example metering information 1100 includes a device identification section 1102 including a wireless device identifier 404, a wireless network service provider identifier 406, and wireless device make and model information 408 and 410.

The example metering information 1100 includes a demographics section 1104, which includes a postal zip code 618. The media measurement entity 102 (FIG. 1) may use the postal zip code 618 to retrieve demographic information (e.g., the demographic information described above in connection with FIG. 6) to generate demographic-based reports using the panel metering information.

The example metering information 1100 includes a viewing session section 1106 having the viewing session start time information 802, the viewing session end time information 804, and the previous viewing session end time information 806. The viewing session section 1106 also includes the media presentation software name and version information 810.

Within the viewing session section 1106, the example metering information 1100 includes a content session section 1108 having the content session start time information 902 and the content session end time information 904. The content session section 1108 also includes the service provider information 906, the delivery type information 908, the content type information 910, the program name/title information 914, the channel number information 922, the channel name information 924, and the content specifications information 928.

The content session section 1108 includes a usage data section 1110 to store the usage data information 936. In the illustrated example, the usage data section 1110 includes two entries of the usage data information 936. A first usage data entry corresponds to a play operating mode (e.g., the operation mode information 944) and a second usage data entry corresponds to a pause operating mode (e.g., the operation mode information 944).

In other example implementations, the panel metering information and/or the reference metering information may include more or less information than depicted in FIG. 11. For example, panel metering information may also include device status information (e.g., the on/off status information 502, the battery status information 504, the call information status information 506, the application usage information 508 of FIG. 5) described above in connection with the example device status information data structure 500 of FIG. 5 or usage information (e.g., carrying device information 702, the technical issues information 704, the roaming information 706 of FIG. 7) described above in connection with the example usage information data structure 700 of FIG. 7.

The types of information stored in the example metering information 1100 may differ when metering different types of media. For example, when metering video games executed by the wireless communication device 104, the example metering information 1100 may be used to store a game title, a skill level setting, a game level, a version, a vendor, and information about advertising presented during game play.

Figure 12:
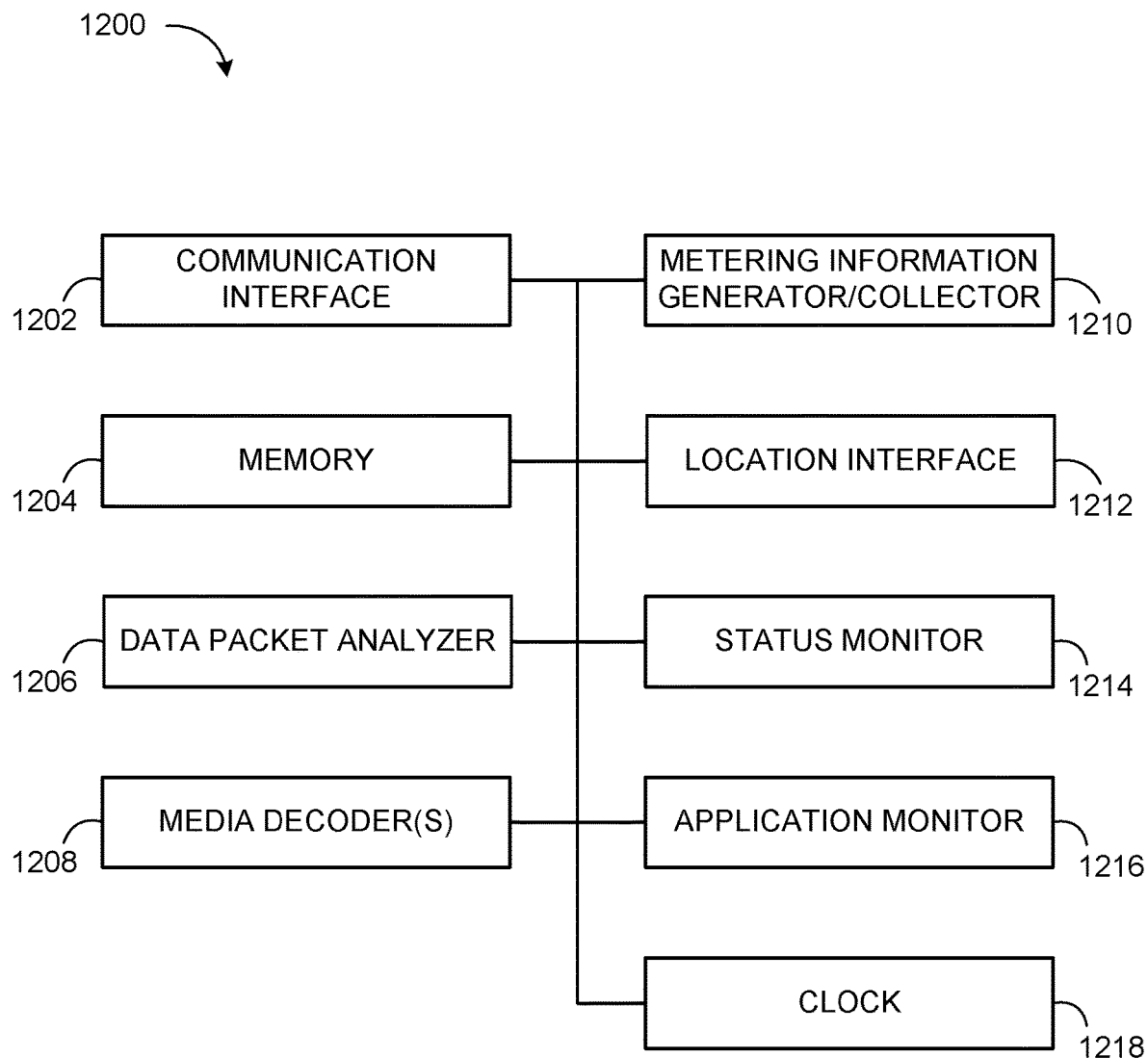
FIG. 12 illustrates a detailed depiction of one of the plurality of example wireless communication devices of FIGS. 1-3.
Figure 13:
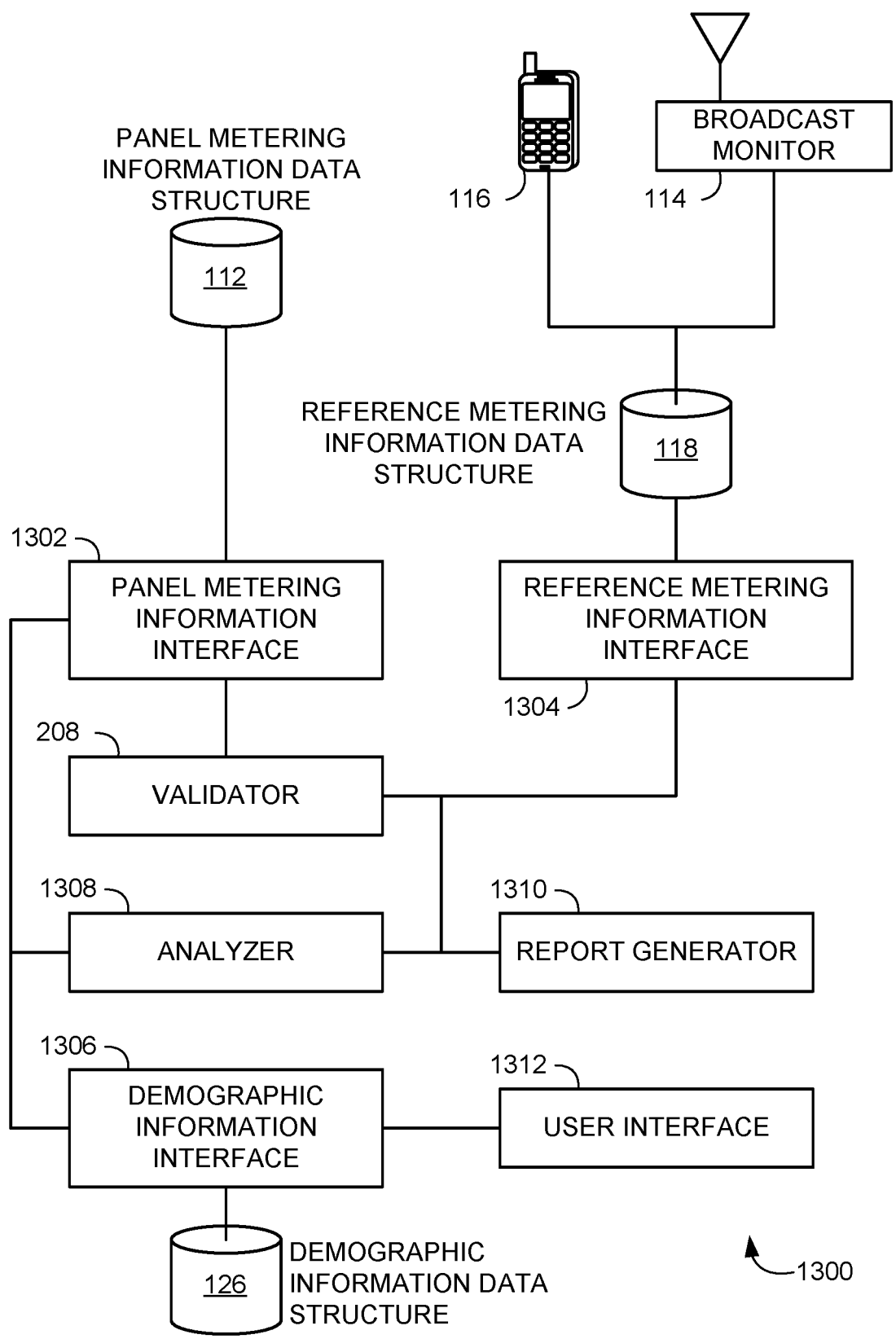
FIG. 13 illustrates an example metering information processing system that may be used to process panel metering information at the media measurement entity of FIGS. 1-3.

FIG. 12 illustrates an example apparatus 1200 that may be used to implement the example wireless communication devices 104 of FIGS. 1-3, the example control wireless communication device 116 of FIGS. 1 and 2, and the example broadcast monitor 114 of FIGS. 1 and 3, and FIG. 13 illustrates an example metering information processing system 1300 that may be used to implement the example metering information processing system 128 of FIG. 1 to process panel metering information at the media measurement entity 102 of FIGS. 1-3. The example apparatus 1200 and the example metering information processing system 1300 may be implemented using any desired combination of hardware, firmware, and/or software. For example, one or more integrated circuits, discrete semiconductor components, and/or passive electronic components may be used. Additionally or alternatively, some or all of the blocks of the example apparatus 1200 and the example metering information processing system 1300, or parts thereof, may be implemented using instructions, code, and/or other software and/or firmware, etc. stored on a machine accessible medium that, when executed by, for example, a processor system (e.g., the example processor system 2810 of FIG. 28), perform the operations represented in the flowcharts of FIGS. 14, 15, 16A, 16B, 17-19, 20A, 20B, 21A, and 21B.

Turning now to FIG. 12, to communicate with the media content provider 106, the wireless communications service provider 120, and/or the media measurement entity 102 (FIG. 1), the example apparatus 1200 includes a communication interface 1202. The example apparatus 1200 may use the communication interface 1202 to receive media content from the media content provider 106, process voice/data communications with via the wireless communications service provider 120, and/or transmit panel metering information to the media content provider 106, the wireless communications service provider 120, and/or the media measurement entity 102. The communication interface 1202 may be implemented using one or more wireless communication protocols including, for example, FLOC), DVB-H, TDMA, GSM®, CDMA, or any other multicast or broadcast media delivery protocols or voice/data communication protocols.

To store media content and panel metering information (e.g., the panel metering information file 204 of FIG. 2), the example apparatus 1200 includes a memory 1204. To analyze data packets used to deliver media content, the example apparatus 1200 includes a data packet analyzer 1206. The data packet analyzer 1206 is configured to extract panel metering information (e.g., program identification, channel identification, content provider identification, etc.) or other information used to generate panel metering information from data packets used by the media content provider 106 and/or the wireless communications service provider 120 to communicate media content. For example, the data packet analyzer 1206 may extract some or all of the information described above in connection with the example data structures 900 of FIGS. 9 and 11 from data packets.

To decode the media content received from the media content provider 106, the example apparatus 1200 includes one or more media decoder(s) 1208. The media decoders 1208 may include one or more video decoders, one or more audio decoders, one or more graphics decoders, one or more video game engines, one or more Internet data decoders (e.g., html decoders, Java® decoders, etc.), etc.

To generate and/or collect panel metering information, the example apparatus 1200 includes a metering information generator/collector 1210. In some example implementations, information used to generate panel metering information may be embedded in fields of transmission data packets. The metering information generator/collector 1210 may be configured to obtain information from forward link channels or back channels between the wireless communication devices 104 and a transmitting entity. Alternatively or additionally, information used to generate panel metering information may be embedded in the media content. For example, ancillary codes (e.g., audio codes, video codes, etc.) may be embedded in the media content, and the metering information generator/collector 1210 may be configured to collect those codes. In some example implementations, the metering information generator/collector 1210 may be configured to generate signatures (e.g., audio signatures, video signatures, etc.) based on the media content decoded by the media decoders 1208.

In the illustrated example, the metering information generator/collector 1210 may be configured to intercept media content decoded by the media decoders 1208 using software and/or hardware to collect codes and/or generate signatures. For example, data intercepting software may be configured to periodically trap data output by the media decoders 1208 and/or copy data output by the media decoders 1208 from an output buffer to another memory space used by the metering information generator/collector 1210 to generate and/or collect the panel metering information. Data intercepting hardware may be implemented by coupling a data sniffer to output lines of the media decoders 1208 to detect media content data decoded by the media decoders 1208 and copy the detected decoded media to a memory associated with the metering information generator/collector 1210. The data intercepting processes may be passive so that the metering of the presented media contents does not affect or does not substantially affect the performance and/or quality of presenting media contents by the wireless communication device 104.

In any case, the metering information generator/collector 1210 may obtain (i.e., collect) information (e.g., metering information) from the data packet analyzer 1206 and/or from media content decoded by the media decoders 1208 and/or generate signatures based on decoded media content and use the collected and/or generated information to generate panel metering information. The metering information generator/collector 1210 may then store the panel metering information in the memory 1204 (e.g., in the panel metering information file 204 of FIG. 2).

To determine a location of the example apparatus 1200, the example apparatus 1200 is provided with a location interface 1212. The location interface 1212 may be configured to detect and/or determine the locations to which the example apparatus 1200 is moved. The location interface 1212 may be implemented using any location detection/determination technology including, for example, a GPS receiver, a dead reckoning system, an electronic compass, technology to determine location based on triangulation techniques, sensors to detect location codes or identification codes indicative of a location, etc.

In the illustrated example, the example apparatus 1200 is provided with a status monitor 1214 configured to monitor the operations and/or status of the wireless communication device 104 to determine when the wireless communication device 104, for example, is powered on/off, is connected to a battery charger, is executing media presentation software, etc. The example apparatus 1200 is also provided with an application monitor 1216 to detect when media presentation software of the wireless communication device 104 has been instantiated and when it is presenting media content. The application monitor 1216 can also be configured to detect different operations (e.g., play, pause, skip, rewind, fast forward, etc.) associated with the media presentation software. The metering information generator/collector 1210 can store information indicative of the events detected by the status monitor 1214 and/or the application monitor 1216 in the memory 1204 for subsequent analysis by the media measurement entity 102.

To determine time information, the example apparatus 1200 is provided with a clock 1218. In the illustrated example, the clock 1218 may be separate from a clock of a wireless communication device 104 and may be synchronized with the time of a clock at the media measurement entity 102. The clock 1218 enables the example apparatus 1200 to generate accurate time information (e.g., the viewing session start and end times 802 and 804 of FIG. 8, the content session start and end times 902 and 904 of FIG. 9, etc.) even if the network of a wireless service provider (e.g., the wireless service provider 120 of FIG. 1) has not correctly set time information in a clock of the wireless communication device 104 or if the clock of the wireless communication device 104 does not otherwise have the correct or accurate time information. In the illustrated example, the clock 1218 is configured to be periodically or aperiodically synchronized with a clock of the media measurement entity 102, which may, in turn, be synchronized to, for example, a government-provided reference time.

The communications interface 1202, the memory 1204, the data packet analyzer 1206, the media decoders 1208, the metering information generator/collector 1210, the location detection interface 1212, the status monitor 1214, the application monitor 1216, and the clock 1218 may also be used to implement the control wireless communication device 116 and/or the broadcast monitor 114 (FIG. 1). To implement the wireless communication device 116, the metering information generator/collector 1210 is configured to generate reference metering information and store the reference metering information in the memory 1204 (e.g., the reference metering information file 206 of FIG. 2).

Although the example apparatus 1200 may be used to implement the example wireless communication devices 104, the control wireless communication device 116, and/or the broadcast monitor 114, in some example implementations the example apparatus 1200 may be adapted to implement the meter 202 of FIGS. 2 and 3 and/or the meter 306 of FIG. 3, and the example apparatus 1200 may be installed into (e.g., internal) or onto (e.g., external) the wireless communication device 104. For example, in some example implementations (e.g., the example metering module 2302 of FIG. 23), the example apparatus 1200 may be configured to include the memory 1204, the data packet analyzer 1206, the metering information generator/collector 1210, the location interface 1212, the status monitor 1214, the application monitor 1216, and the clock 1218. In such example implementations, the communication interface 1202 and the media decoder(s) 1208 may be implemented in the wireless communication device 104, while the example apparatus 1200 is provided with data interception or detection interfaces to detect data packets received and/or transmitted via the communication interface 1202 and/or decoded media content output by the media decoder(s) 1208. That is, the example apparatus 1200 may be provided with a network data detection interface (not shown) configured to be coupled to data lines of the communication interface 1202 to detect data packets and a media content detection interface (not shown) configured to be coupled to output lines of the media decoder(s) 1208 to detect media content decoded by the media decoder(s) 1208. Additionally or alternatively, the example apparatus 1200 may be provided with a common data interface (e.g., a serial interface, a universal serial bus (USB) interface, or any other interface) (e.g., the communication interface 2316 of FIG. 23) to be coupled to a data interface (e.g., via the accessory port 2322 of FIG. 23) of the wireless communication device 104 and through which the example apparatus 1200 can receive network data packets and/or decoded media content data from the wireless communication device 104. For example, the wireless communication device 104 can be provided with and execute one or more software agents to monitor and detect network data packets communicated via the communication interface 1202 and/or media content decoded by the media decoder(s) 1208 and to communicate the detected data packets and/or decoded media contents to the example apparatus 1200 via the common data interface. In this manner, the example apparatus 1200 can generate panel metering information based on the received data packets and/or decoded media content.

Turning now to FIG. 13, to access the panel metering information data structure 112, the example system 1300 includes a panel metering information interface 1302 communicatively coupled to the panel metering information data structure 112. The panel metering information interface 1302 may be configured to retrieve the panel metering information from the panel metering information data structure 112 and to store information (e.g., the panel metering information, validation information, etc.) in the panel metering information data structure 112. To access the reference metering information data structure 118, the example system 1300 includes a reference metering information interface 1304 communicatively coupled to the reference metering information data structure 118.

To validate the panel metering information, the example system 1300 is provided with the validator 208 communicatively coupled to the panel metering information interface 1302 and the reference metering information interface 1304. The validator 208 is configured to validate the panel metering information as described above in connection with FIGS. 2 and 3.

To obtain demographic information associated with the panel members 108 (FIG. 1), the example system 1300 is provided with a demographic information interface 1306 communicatively coupled to the demographic information data structure 126 and the panel metering information interface 1302. In an example implementation, the demographic information interface 1306 may communicate with the panel metering information interface 1302 to retrieve the postal zip code information 618 (FIGS. 6 and 11) and/or the wireless device identifier 404 (FIGS. 4 and 11) from panel metering information (e.g., the example metering information 1100 of FIG. 11) stored in the panel metering information data structure 112 and use the postal zip code information 618 and/or the wireless device identifier 404 to retrieve demographic information from the demographic information data structure 126. In some example implementations, the panel metering information interface 1302 is configured to retrieve demographic information from the account information data structure 122 based on, for example, the postal zip code information 618 and/or the wireless device identifier 404 and store the demographic information in the demographic information data structure 126.

To analyze and process the panel metering information, the example system 1300 is provided with an analyzer 1308 communicatively coupled to the panel metering information interface 1302, the reference metering information interface 1304, and the demographic information interface 1306. In some example implementations, the analyzer 1308 may retrieve panel metering information via the panel metering information interface 1302, channel lineup and content programming information (e.g., the information stored in the channel lineup and content programming data structure 1000 of FIG. 10) from the reference metering information data structure 118 via the reference metering information interface 1304, and demographic information via the demographic information interface 1306. The analyzer 1308 may then analyze and process the panel metering information based on the channel lineup and content programming information and the demographic information to measure, for example, media consumption or media exposure. To generate reports based on the analyses performed by the analyzer 1308 and/or the validator 208, the example system 1300 includes a report generator 1310. The reports may include information indicative of users' media consumption of or media exposure to programming content transmitted to and presented via the wireless communication devices 104. Some reports may correlate media consumption or exposure with the different types of information described above in connection with FIGS. 4-11. For example, a media consumption versus data transmission quality report may correlate media consumption of media content with the various levels of data transmission quality associated with transmitting the media content to different wireless communication devices 104.

To enable the panel members 108 to provide their demographic information to the demographic information data structure 126, the example system 1300 is provided with a user interface 1312. The user interface 1312 may be implemented using a web page server, a wireless communication device interface (e.g., a wireless application protocol ("WAP") interface), an interactive voice response ("IVR") interface, an intranet server (for access by customer service agents contacted by users to provide the demographic information), etc.

Flowcharts representative of example processes that may be used to implement the example wireless communication devices 104 (FIGS. 1-3) and 116 (FIGS. 1 and 2), the broadcast monitor 114 (FIGS. 1 and 3), the example apparatus 1200 of FIG. 12, the example panel metering information processing system 1300 of FIG. 13, and/or other apparatus or systems (e.g., the personal computer 124 of FIG. 1) described herein are shown in FIGS. 14, 15, 16A, 16B, 17-19, 20A, 20B, 21A, 21B, 26, and 27. In the illustrated examples, the example processes may be implemented as comprising one or more programs for execution by one or more processors such as the processor 2812 shown in the example processor system 2810 of FIG. 28. The programs may be embodied in software stored on tangible mediums such as CD-ROM's, floppy disks, hard drives, digital versatile disks (DVD's), or a memory associated with the processor 2812 and/or embodied in firmware and/or dedicated hardware in a well-known manner. For example, any or all of the example wireless communication devices 104 and 116, the example broadcast monitor 114, the example apparatus 1200, the example panel metering information processing system 1300, and/or other example apparatus or systems described herein could be implemented using software, hardware, and/or firmware. Further, although the example programs are described with reference to the flowcharts illustrated in FIGS. 14, 15, 16A, 16B, 17-19, 20A, 20B, 21A, 21B, 26, and 27, persons of ordinary skill in the art will readily appreciate that many other methods of implementation may alternatively be used. For example, the order of execution of the blocks may be changed, and/or some of the blocks described may be changed, eliminated, or combined.

Figure 14:
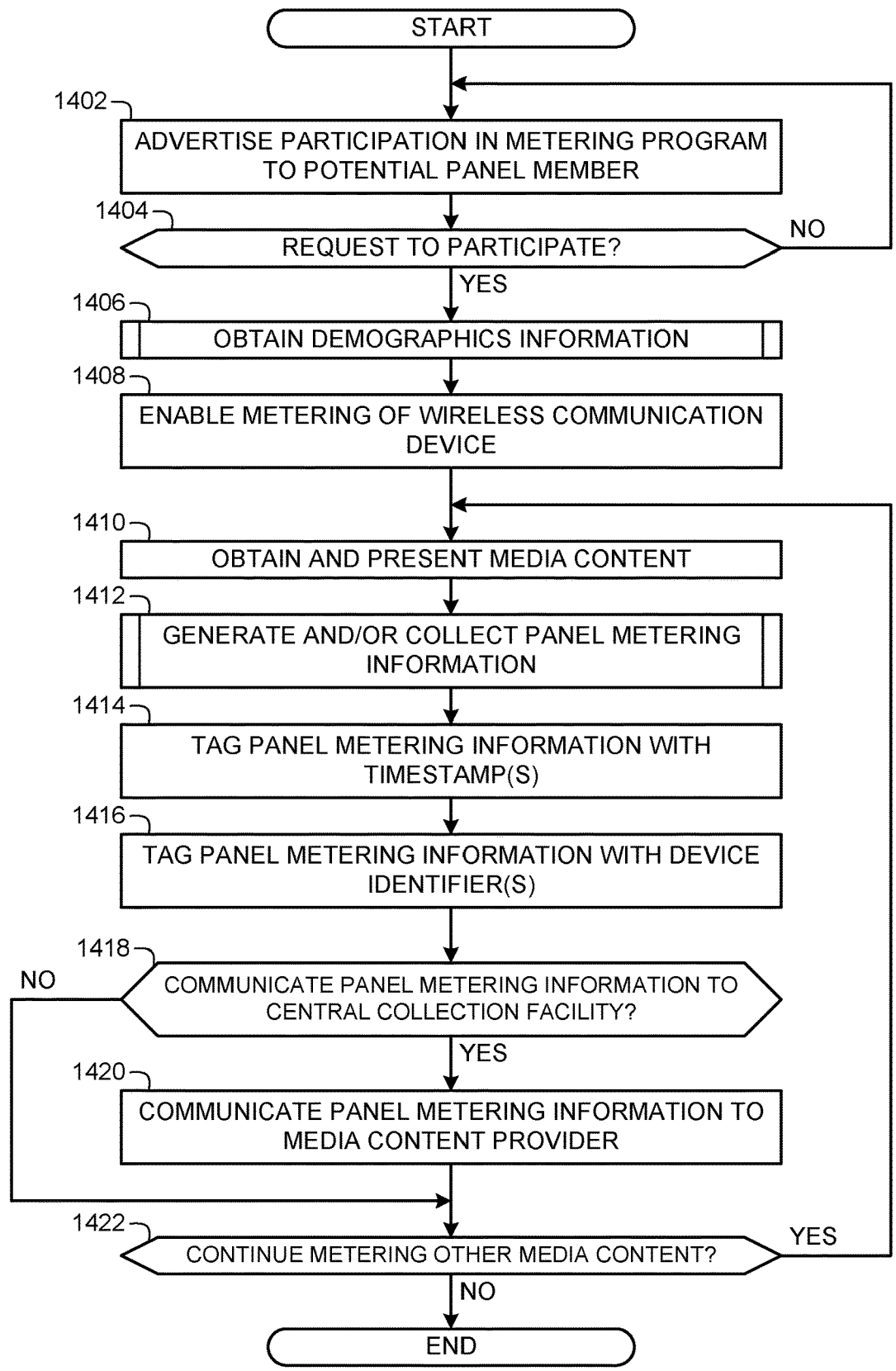
FIG. 14 is a flowchart representative of an example process that may be performed to obtain panel members and to generate and/or collect panel metering information.

FIG. 14 is a flowchart representative of an example process that may be performed to obtain panel members and to generate and/or collect panel metering information. Initially, the media measurement entity 102 advertises a metering program to a potential panel member (block 1402). For example, the media measurement entity 102 may advertise opportunities for participation in the metering program via the media content provider 106 and/or the wireless communications service provider 120. Alternatively or additionally, the media measurement entity 102 may advertise the metering program directly to users of the wireless communication devices 104, which may include subscribers of the media content provider 106 and/or subscribers of the wireless communications service provider 120. For example, the media measurement entity 102 may advertise the metering program by sending messages (e.g., via e-mail, via a web page, via wireless application protocol ("WAP"), etc.) to the wireless communication devices 104 and/or the personal computer 124. Each message may include a selectable option that indicates a person's consent to participate in the metering program.

The wireless communication device 104 then determines whether the targeted panel member has requested or consented to participate in the metering program (block 1404). For example, the targeted panel member can select an option on a user interface screen indicating consent to participate in the metering program. If the wireless communication device 104 determines that the targeted panel member has not requested or consented to participate in the metering program (block 1404), then control returns to block 1402 and the media measurement entity 102 advertises participation in the metering program to the same or another potential panel member. However, if the wireless communication device 104 determines that the targeted panel member has requested or consented to participate in the metering program (block 1404), then the targeted panel member becomes one of the panel members 108 and the wireless communication device 104 interviews the panel member 108 to obtain demographic information (block 1406). An example method that may be used to implement the operation of block 1406 is described below in connection with the flowchart of FIG. 15.

After interviewing the panel member 108 regarding demographic information (block 1406), metering of the wireless communication device 104 is then enabled (block 1408). For example, the media measurement entity 102, the media content provider 106, and/or the wireless communications service provider 120 may transmit metering software (e.g., a media content meter 202 of FIG. 2) to the wireless communication device 104 to enable metering. Alternatively, the metering software and/or hardware may be pre-installed on the wireless communication device 104 so that the media measurement entity 102, the media content provider 106, and/or the wireless communications service provider 120 need only provide the wireless communication device 104 with a message instructing the wireless communication device 104 to enable the preinstalled metering software and/or hardware. The metering software and/or hardware may be configured to monitor all of the media content presented by the wireless communication device 104 or only a subset of media content. For instance, the metering software and/or hardware may be configured to monitor media content during particular times, media content delivered via particular channels, and/or only particular media content programming.

The communication interface 1202 and the media decoders 1208 (FIG. 12) of the wireless communication device 104 then obtain and present media content (block 1410). For example, the communication interface 1202 may receive media content delivered (e.g., broadcast, multicast, unicast, etc.) by the media content provider 106 or the wireless communications service provider 120 in response to the panel member 108 tuning in to a particular channel and/or requesting particular content and one or more of the media decoders 1208 may load and begin decoding (e.g., decompressing, reconstructing, rendering, etc.) and presenting the media content.

The metering information generator/collector 1210 then generates and/or collects panel metering information (block 1412). For example, the data packet analyzer 1206 (FIG. 12) may extract panel metering information or other information used by the metering information generator/collector 1210 to generate panel metering information from header fields or any other fields in the transmitted network packets used to deliver media content. Additionally or alternatively, some of the panel metering information may be embedded in the media content information contained in the data packets used to transmit the media content, and the metering information generator/collector 1210 may extract the panel metering information from the media content while the decoders 1208 decode the media content. In the illustrated example, the metering information generator/collector 1210 may store the panel metering information in the panel metering information file 204 (FIG. 2), which is, in turn, stored in the memory 1204 (FIG. 12). At block 1412, the metering information generator/collector 1210 can also generate and/or collect other types of metering information such as, for example, information described above in connection with FIGS. 4, 5, 7-9, and 11. The operations of block 1412 may be implemented using the example methods described below in connection with the flowcharts of FIGS. 16A, 16B, and 17.

The metering information generator/collector 1210 then tags one or more of the panel metering information entries generated and/or collected at block 1412 with respective timestamps indicative of when they were generated and/or collected (block 1414). In some example implementations, a group of panel metering information entries may be tagged with a single timestamp or two timestamps (e.g., a start time timestamp and an end time timestamp). In addition, the metering information generator/collector 1210 tags one or more of the panel metering information entries or a group of the panel metering information entries with one or more device identifiers (block 1416) (e.g., the media terminal identifier 402, the wireless device identifier 404, the wireless network service provider 406, the wireless device make 408, and/or the wireless device model 410 of FIG. 4) corresponding to the wireless communication device 104 that generated the panel metering information.

The wireless communication device 104 then determines whether it should communicate the panel metering information to a central collection facility (block 1418) (e.g., one or more of the media measurement entity 102, the media content provider 106, and the wireless communications service provider 120). For example, the wireless communication device 104 may be configured to communicate the panel metering information to the media content provider 106 when the amount of panel metering information stored in the memory 1204 reaches a predetermined threshold limit. Alternatively or additionally, the wireless communication device 104 may be configured to communicate the panel metering information to the media content provider 106 at a predetermined time every day.

If the wireless communication device 104 determines that it should communicate the panel metering information (block 1418), then the communication interface 1202 communicates the panel metering information from the memory 1204 to the central collection facility (block 1420). After the communication interface 1202 communicates the panel metering information (block 1420) or if the wireless communication device 104 determines that it should not communicate the panel metering information (block 1418), the wireless communication device 104 determines whether it should continue to meter other media content (block 1422).

If the wireless communication device 104 determines that it should meter other media content (block 1422), then control is passed back to block 1410. Otherwise, the process is ended.

Figure 15:
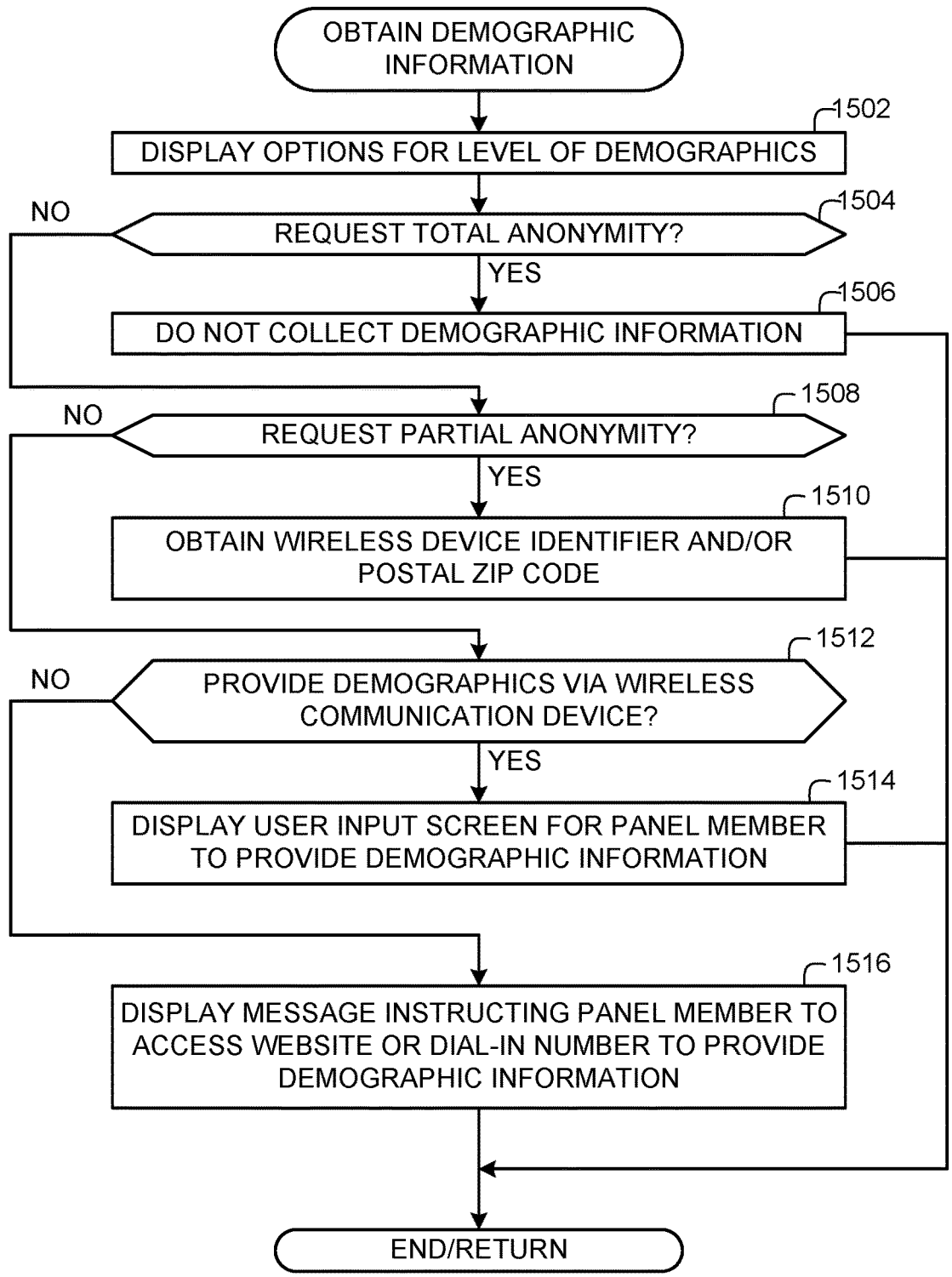
FIG. 15 is a flowchart representative of an example process that may be performed to obtain demographic information associated with panel members.

FIG. 15 is a flowchart representative of an example process that may be performed to obtain demographic information associated with panel members. The operations described in connection with FIG. 15 may be used to implement the operation of block 1406 of FIG. 14 to interview the panel member 108 and obtain demographic information from the panel member 108. Initially, the wireless communication device 104 displays a user interface screen having selectable options for different levels of demographics (block 1502) to be used in the metering program. For example, the options may include maintaining complete anonymity (e.g., provide no demographic information), maintain partial anonymity (e.g., provide only wireless device identifier and/or postal zip code), and providing a substantial amount of demographic and/or personal information.

The wireless communication device 104 then determines whether the panel member 108 has requested to maintain total anonymity (block 1504). If the panel member 108 has requested to maintain total anonymity (block 1504), no demographic information is collected (block 1506). In an example implementation in which no demographic information is to be used, the example metering information 1100 (FIG. 11) may be stored and transmitted to the media measurement entity 102 without the postal zip code information 618 (FIGS. 6 and 11) or any other information to identify the panel member 108 associated with the example metering information 1100.

If the panel member 108 has not requested to maintain total anonymity (block 1504), then the wireless communication device 104 determines whether the panel member has requested to maintain partial anonymity (block 1508). If the panel member 108 has requested to maintain partial anonymity (block 1508), then the meter 202 (FIG. 2) obtains the wireless device identifier (e.g., the wireless device identifier 404 of FIGS. 4 and 11) from the wireless communication device 104 and/or the postal zip code (e.g., the postal zip code 618 of FIGS. 6 and 11) from the panel member 108 (block 1510). In this manner, the media measurement entity 102 can obtain partial or general demographic information from the account information data structure 122 of the wireless communications service provider 120 (FIG. 1) based on the wireless device identifier 404 and/or the postal zip code 618. In alternative example implementations, the meter 202 may obtain a separate phone number other than that of the wireless communication device 104 such as, for example, a phone number of a wired or landline telephone associated with the user of the wireless communication device 104.

If the panel member 108 has not requested to maintain partial anonymity (block 1508), the wireless communication device 104 determines whether the panel member 108 has elected to provide demographic information and/or personal information via the wireless communication device 104 (block 1512). For example, the wireless communication device 104 may present a user interface screen to the panel member 108 having selectable options via which the panel member 108 can select to provide demographic information via the wireless communication device 104 or via another method (e.g., calling a dial-in number, accessing a website on the personal computer 124 of FIG. 1 or any other web-enabled device). Alternatively, the panel member 108 may authorize a call back from the media measurement entity 102 to provide demographic and/or personal information via a phone call. In yet other alternative example implementations, the meter 202 (FIG. 2) may be pre-configured to instruct the panel member 108 to provide demographic information via a particular method (e.g., via the wireless communication device 104, via a website, via a dial-in number, etc.).

If the wireless communication device 104 determines that the panel member 108 should provide demographic and/or personal information via the wireless communication device 104 (block 1512), then the wireless communication device 104 displays a user input screen via which the panel member 108 can provide demographic and/or personal information (block 1514). However, if the wireless communication device 104 determines that the panel member 108 has not elected to provide demographic and/or personal information via the wireless communication device 104 (block 1512), the wireless communication device 104 displays a message instructing the panel member 108 to access a website or call a dial-in number to provide demographic and/or personal information (block 1516).

After the wireless communication device 104 presents the message at block 1516 or after the wireless communication device 104 displays the user input screen at block 1514 and obtains demographic and/or personal information or after the meter 202 (FIG. 2) obtains the wireless device identifier 404 and/or the postal zip code 618 of the panel member 108 at block 1510 or if the wireless communication device 104 determines that no demographic information will be obtained from the panel member 108, the process ends and control returns to a calling function or process such as, for example, the example process of FIG. 14.

Figure 16A:
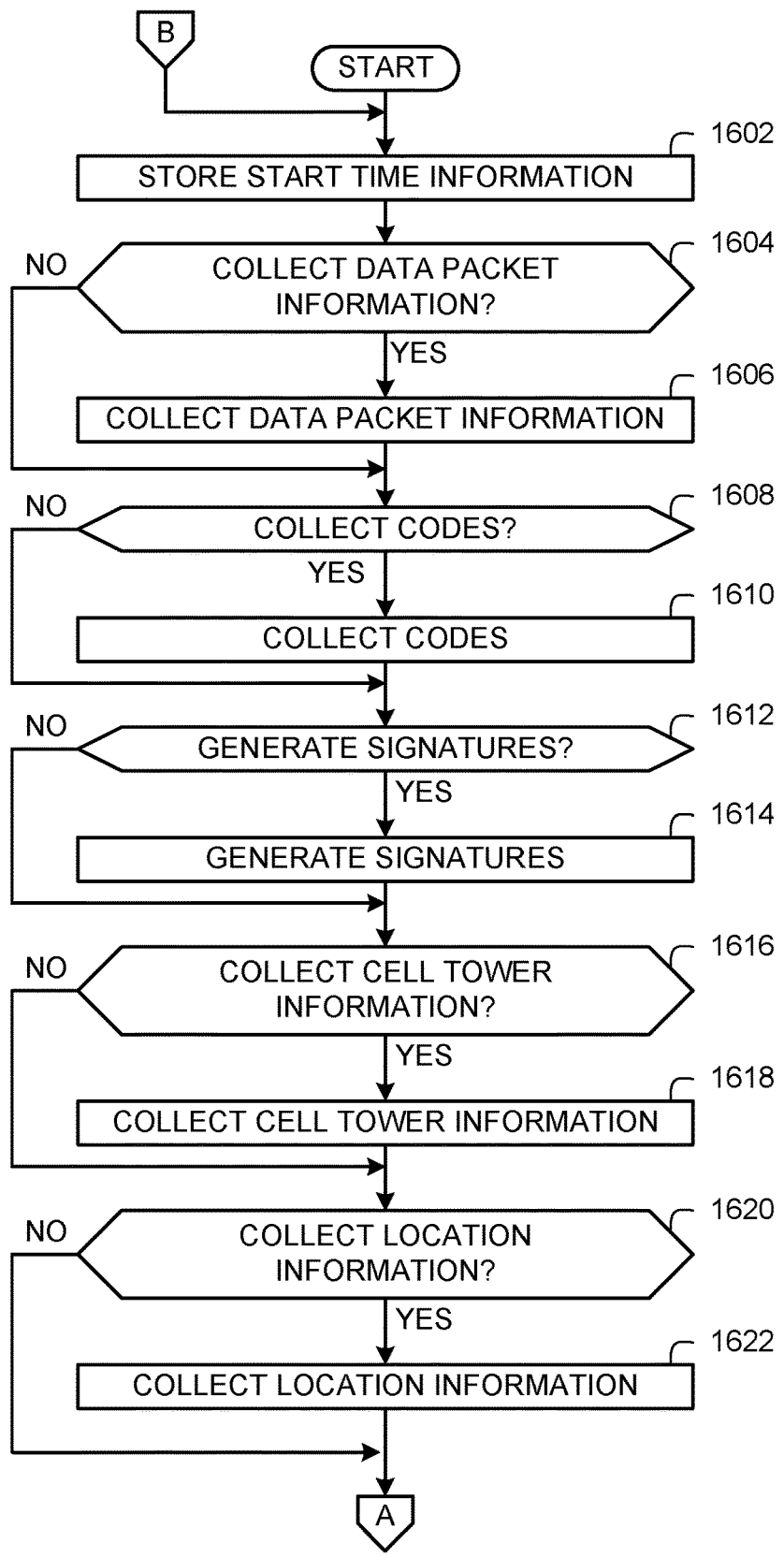
FIGS. 16A and 16B depict a flowchart representative of an example process that may be performed to generate and/or collect panel metering information.
Figure 16B:
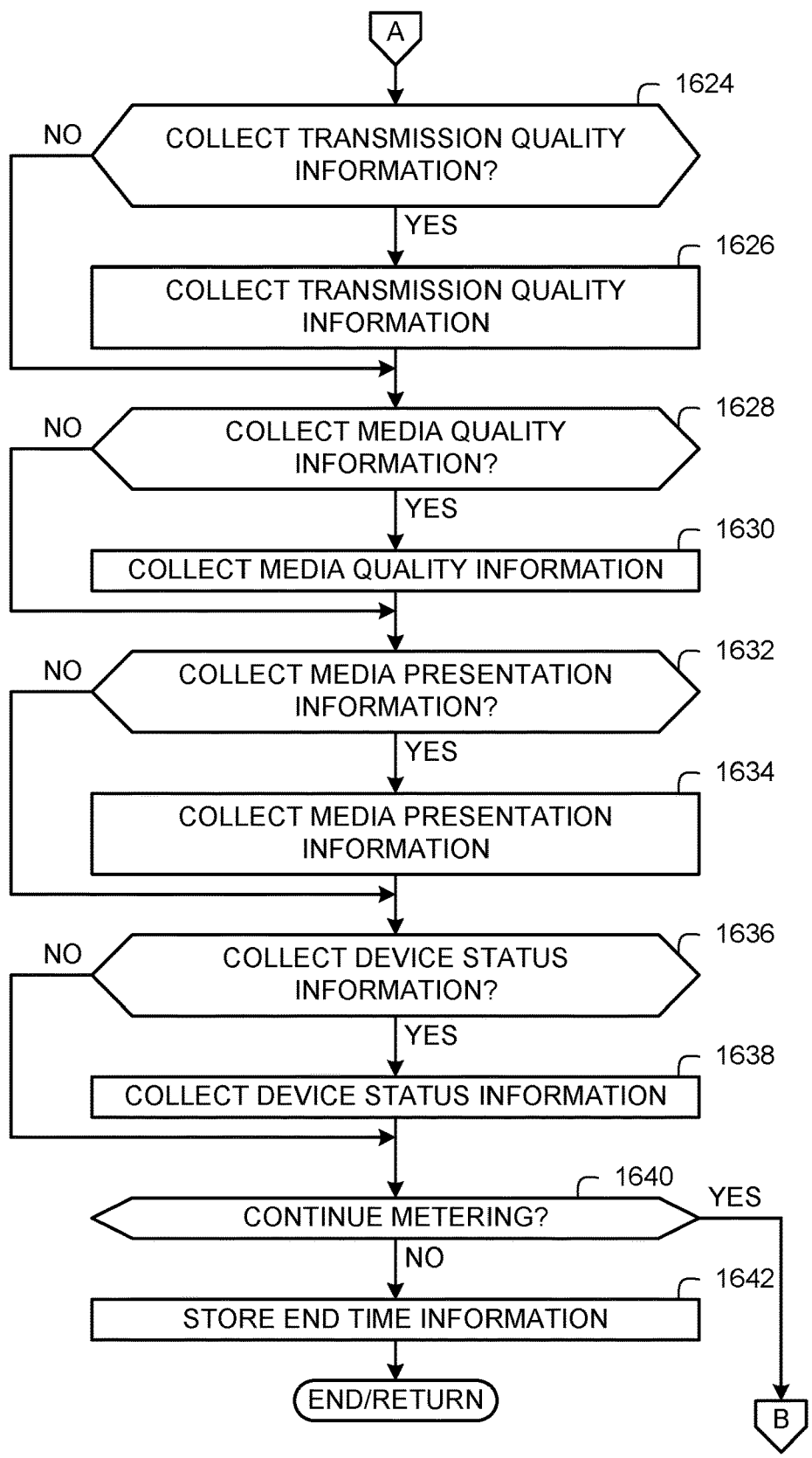

FIGS. 16A and 16B depict a flowchart representative of an example process that may be performed to generate and/or collect panel metering information. The flowchart of FIGS. 16A and 16B can be used to implement the operations of block 1412 of FIG. 14 to generate and/or collect panel metering information. In addition to generating and/or collecting the panel metering information, the example apparatus 1200 may store the panel metering information in the memory 1204 in, for example, one or more of the data structures 500 (FIG. 5), 700 (FIG. 7), 800 (FIG. 8), 900 (FIG. 9), and 1100 (FIG. 11). In some example implementations, the example apparatus 1200 may be configured to collect some or all of the types of panel metering information discussed below from one or more of the data structures 500 (FIG. 5), 700 (FIG. 7), 800 (FIG. 8), 900 (FIG. 9), and 1100 (FIG. 11) and store the information in the panel metering file 204 (FIGS. 2 and 3) (e.g., an XML file) to be communicated to a central collection facility.

To determine whether the to collect particular types of panel metering information described below, the example apparatus 1200 may be configured to check a configuration bit corresponding to the particular panel metering information to determine whether the example apparatus 1200 should collect that type of panel metering information. The configuration bit may be set or cleared during a configuration time by a person (e.g., a set-up technician) or by configuration software. The status of each configuration bit may be different for different devices (e.g., for different ones of the wireless communication devices 104) based on several factors (e.g., target market, demographic information, time of day, day of week, etc.). In some example implementations, to determine whether the example apparatus 1200 should collect a particular type of panel metering information, the example apparatus 1200 may additionally or alternatively be configured to analyze information (e.g., data packets, media content, data transmission header information, etc.) associated with that type of panel metering information to determine whether the panel metering information of interest is available for collection. For example, to determine whether the example apparatus 1200 should collect codes (e.g., ancillary audio codes, ancillary video codes, ancillary graphics codes, etc.) from media content, the example apparatus 1200 may be configured to analyze the media content to determine whether the codes are embedded in the media content or a header of the media content and, if so, the example apparatus 1200 can determine that it should collect the codes. Otherwise, the example apparatus 1200 can determine that it should not collect the codes because they are not available.

Initially, the metering information generator/collector 1210 stores the start time information 802 (FIGS. 8 and 11) (block 1602) in the panel metering file 204 (FIG. 2). In the illustrated example, the start time information 802 is indicative of when the wireless communication device 104 started to present the media content at block 1410 of FIG. 14. The metering information generator/collector 1210 then determines whether it should collect data packet information (block 1604) from the data packets used to communicate the media content to the wireless communication device 104. For example, the metering information generator/collector 1210 may check a configuration bit of, for example, the example apparatus 1200 to determine whether collection of data packet information has been enabled. Additionally or alternatively, the metering information generator/collector 1210 can be configured to analyze each received data packet to determine if it has meaningful information (e.g., channel number information, channel name information, delivery type information, service provider information, content type information, etc.) relevant to generating the panel metering information, and if a data packet has meaningful information, the metering information generator/collector 1210 can determine that it should collect the data packet information. If the metering information generator/collector 1210 determines that it should collect data packet information (block 1604), the metering information generator/collector 1210 collects the data packet information (block 1606) from one or more of the data packets used to receive the media content.

After or while the metering information generator/collector 1210 collects the data packet information (block 1606) or if the metering information generator/collector 1210 determines that it should not collect the data packet information (block 1604), the metering information generator/collector 1210 determines whether it should collect codes (block 1608) such as, for example, ancillary audio codes, ancillary video codes, ancillary graphics codes, etc. If the metering information generator/collector 1210 determines that it should collect codes, the metering information generator/collector 1210 collects the codes (block 1610) from the media content.

After or while the metering information generator/collector 1210 collects the codes (block 1610) or if the metering information generator/collector 1210 determines that it should not collect codes (block 1608), the metering information generator/collector 1210 determines whether it should generate signatures (block 1612) such as, for example, audio signatures, video signatures, graphics signatures, etc. In some example implementations, the metering information generator/collector 1210 can determine that it should generate signatures if it determines that the received data packets do not contain meaningful information relevant to generating metering information and/or if the media contents do not contain ancillary codes. If the metering information generator/collector 1210 determines that it should generate signatures (block 1612), the metering information generator/collector 1210 generates the signatures (block 1614) based on the media content.

After or while the metering information generator/collector 1210 generates the signatures (block 1614) or if the metering information generator/collector 1210 determines that it should not generate signatures (block 1612), the metering information generator/collector 1210 determines whether it should collect cell tower or transmitting tower information (block 1616) such as, for example, the transmitting tower identification information 926 of FIG. 9. If the metering information generator/collector 1210 determines that it should collect cell tower information (block 1616), the metering information generator/collector 1210 collects the cell tower information (block 1618).

After or while the metering information generator/collector 1210 collects the cell tower information (block 1618) or if the metering information generator/collector 1210 determines that it should not collect the cell tower information (block 1616), the metering information generator/collector 1210 determines whether it should collect location information (block 1620). The location information may be used to determine the location (e.g., a geographic location) or an approximate location of the example apparatus 1200 when, for example, the example apparatus 1200 received and/or presented the media content. In some example implementations, the metering information generator/collector 1210 may query the location interface 1212 to determine whether the location interface 1212 has received and/or generated any location information and, if so, the metering information generator/collector 1210 can determine that it should collect the location information. If the metering information generator/collector 1210 determines that it should collect location information (block 1620), the metering information generator/collector 1210 collects the location information from the location interface 1212 (block 1622).

After or while the metering information generator/collector 1210 collects the location information (block 1622) or if the metering information generator/collector 1210 determines that it should not collect the location information (block 1620), the metering information generator/collector 1210 determines whether it should collect transmission quality information (block 1624) (FIG. 16B) associated with the communication links and/or data packets used to receive the media content. Transmission quality information may include, for example, delay time (e.g., the IP time offset 925 of FIG. 9), signal strength (e.g., the signal strength information 510 of FIG. 5), or any other transmission quality of service parameter. In some example implementations, the metering information generator/collector 1210 can be configured to analyze the received information (e.g., received data packets) to determine whether it contains transmission quality information and, if so, the metering information generator/collector 1210 can determine that it should collect transmission quality information. If the metering information generator/collector 1210 determines that it should collect transmission quality information (block 1624), the metering information generator/collector 1210 collects the transmission quality information (block 1626).

After or while the metering information generator/collector 1210 collects the transmission quality information (block 1626) or if the metering information generator/collector 1210 determines that it should not collect the transmission quality information (block 1624), the metering information generator/collector 1210 determines whether it should collect media quality information (block 1628). The media quality information can include, for example, one or more of the frames per second information 930 (FIGS. 9 and 11), the video resolution 932 (FIGS. 9 and 11), the audio quality 934 (FIG. 9) (e.g., audio sampling rate, stereo mode, mono mode, etc.), and/or any other information indicative of the quality of the media content. If the metering information generator/collector 1210 determines that it should collect media quality information (block 1628), the metering information generator/collector 1210 collects the media quality information (block 1630).

After or while the metering information generator/collector 1210 collects the media quality information (block 1630) or if the metering information generator/collector 1210 determines that it should not collect the media quality information (block 1628), the metering information generator/collector 1210 determines whether it should collect media presentation information (block 1632). Media presentation information can include the media presentation information 948 of FIG. 9 (e.g., the volume level 950, the headset/speaker status 952, the screen contrast settings 954, etc.) or any other type of media presentation information. If the metering information generator/collector 1210 determines that it should collect the media presentation information (block 1632), the metering information generator/collector 1210 collects the media presentation information (block 1634).

After or while the metering information generator/collector 1210 collects the media presentation information (block 1634) or if the metering information generator/collector 1210 determines that it should not collect the media presentation information (block 1632), the metering information generator/collector 1210 determines whether it should collect device status information (block 1636). The device status information can include, for example, one or more of the device status information described above in connection with FIG. 5 and/or the usage information described above in connection with FIG. 7. If the metering information generator/collector 1210 determines that it should collect device status information (block 1636), the metering information generator/collector 1210 collects the device status information (block 1638).

After or while the metering information generator/collector 1210 collects the device status information (block 1638) or if the metering information generator/collector 1210 determines that it should not collect the device status information (block 1636), the example apparatus 1200 determines whether it should continue metering (block 1640). For example, the example apparatus 1200 may determine whether the presentation of media content has ended by, for example, querying (e.g., polling) the media decoder(s) 1208 to determine whether media content is still being decoded. If the example apparatus 1200 determines that it should continue metering (block 1640), control returns to block 1602 (FIG. 16A). Otherwise, the metering information generator/collector 1210 stores the end time information 804 (FIGS. 8 and 11) (block 1642). In addition, the metering information generator/collector 1210 can store a previous viewing session end time 806 (FIGS. 8 and 11) associated with metering a previous media content presentation. After the metering information generator/collector 1210 stores the time information, the example process of FIGS. 16A and 16B ends and control returns to the example process of FIG. 14.

Although the operations of the flowchart of FIGS. 16A and 16B are described as being performed in seriatum, two or more of the operations may be configured to be performed in parallel. For example, when the apparatus 1200 is receiving a stream of media content via data packets and presenting the media content, the metering information generator/collector 1210 may collect data packet information from the received data packets while it collects ancillary codes from the presented media contents and/or generates signatures based on the presented media content.

Figure 17:
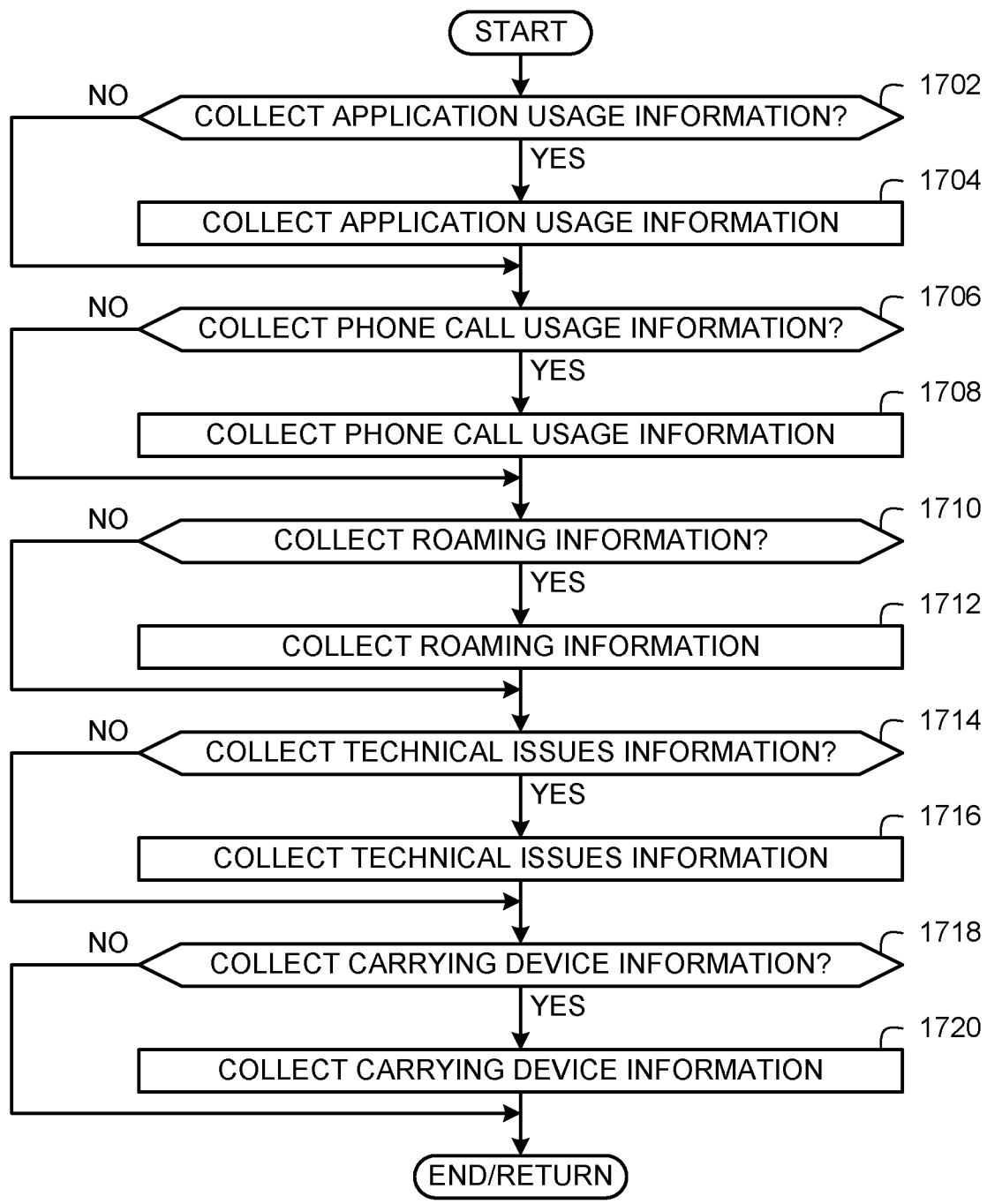
FIG. 17 is another flowchart representative of an example process that may be performed to generate and/or collect panel metering information.

FIG. 17 is another flowchart representative of an example process that may be performed to generate and/or collect panel metering information. The flowchart of FIG. 17 may be used to implement the operations of block 1412 of FIG. 14. The example apparatus 1200 of FIG. 12 may be configured to collect some or all of the types of panel metering information discussed below in connection with or separate from receiving and/or presenting media content. In addition to generating and/or collecting the panel metering information, the example apparatus 1200 may store the panel metering information in the memory 1204 in, for example, one or more of the data structures 500 (FIG. 5), 700 (FIG. 7), and 1100 (FIG. 11). In some example implementations, the example apparatus 1200 may be configured to collect some or all of the types of panel metering information discussed below from one or more of the data structures 500 (FIG. 5), 700 (FIG. 7), and 1100 (FIG. 11) and store this information in the panel metering file 204 (FIGS. 2 and 3) (e.g., an XML file) to be communicated to a central collection facility. To determine whether to collect particular types of the panel metering information discussed below, the example apparatus 1200 may be configured to check configuration bits to determine the types of panel metering information it should collect. Additionally or alternatively, the example apparatus 1200 may be configured to check on the availability of such types of panel metering information to determine the panel metering information it should collect.

Initially, the metering information generator/collector 1210 determines whether it should collect application usage information (block 1702). Application usage information (e.g., the application usage information 508 of FIG. 5) can include time and duration information indicative of when software applications on the wireless communication devices 104 were used and software application identification information indicative of the software applications that were used. If the metering information generator/collector 1210 determines that it should collect application usage information (block 1702), the metering information generator/collector 1210 collects the application usage information (block 1704). For example, the metering information generator/collector 1210 can query the status monitor 1214 and/or the application monitor 1216 to determine when applications are instantiated and/or executed by the wireless communication device 104 and/or to determine the modes of operations (e.g., play, pause, stop, skip, rewind, fast forward, volume change, configuration settings, etc.) of the applications.

After or while the metering information generator/collector 1210 collects the application usage information (block 1704) or if the metering information generator/collector 1210 determines that it should not collect the application usage information (block 1702), the metering information generator/collector 1210 determines whether it should collect phone call usage information (block 1706). Phone call usage information (e.g., the call information 506 of FIG. 5) may include time and duration information indicative of when a wireless communication device 104 was used for making telephone calls. If the metering information generator/collector 1210 determines that it should collect phone call usage information (block 1706), the metering information generator/collector 1210 collects the phone call usage information (block 1708). For example, the metering information generator/collector 1210 can query the status monitor 1214 to determine when telephone calls are made using the wireless communication device 104.

After or while the metering information generator/collector 1210 collects the phone call usage information (block 1708) or if the metering information generator/collector 1210 determines that it should not collect the phone call usage information (block 1706), the metering information generator/collector 1210 determines whether it should collect roaming information (block 1710). The roaming information (e.g., the roaming information 706 of FIG. 7) may include information indicative of date, time, and duration of when a wireless communication device 104 was carried outside of its local calling area. If the metering information generator/collector 1210 determines that it should collect roaming information (block 1710), the metering information generator/collector 1210 collects the roaming information (block 1712). For example, the metering information generator/collector 1210 can query the status monitor 1214 to determine when the wireless communication device 104 is roaming.

After or while the metering information generator/collector 1210 collects the roaming information (block 1712) or if the metering information generator/collector 1210 determines that it should not collect the roaming information (block 1710), the metering information generator/collector 1210 determines whether it should collect technical issues information (block 1714). The technical issues information (e.g., the technical issues information 704 of FIG. 7) may include the time, duration, and description of technical issues associated with the wireless communication devices 104. If the metering information generator/collector 1210 determines that it should collect technical issues information (block 1714), the metering information generator/collector 1210 collects the technical issues information (block 1716). For example, the metering information generator/collector 1210 can query the status monitor 1214 to determine when the wireless communication device 104 detects technical issues and/or a user 108 of the wireless communication device 104 reports technical issues.

After or while the metering information generator/collector 1210 collects the technical issues information (block 1716) or if the metering information generator/collector 1210 determines that it should not collect technical issues information (block 1714), the metering information generator/collector 1210 determines whether it should collect carrying device information (block 1718). The carrying device information (e.g., the carrying device information 702 of FIG. 7) may include information indicative of when a panel member 108 was carrying a respective wireless communication device 104. If the metering information generator/collector 1210 determines that it should collect the carrying device information (block 1718), the metering information generator/collector 1210 collects the carrying device information (block 1720). For example, the metering information generator/collector 1210 can query the status monitor 1214 to obtain carrying status information reported by a user 108 of the wireless communication device 104 and/or detected automatically by the wireless communication device 104 using, for example, detectors (e.g., motion sensors, temperature sensors, electronic compasses, etc.).

After the metering information generator/collector 1210 collects the carrying device information, the example process of FIG. 17 ends and control returns to the example process of FIG. 14. Although the operations of FIG. 17 are described as occurring in seriatum, any two or more of the operations may additionally or alternatively be performed in parallel.

Figure 18:
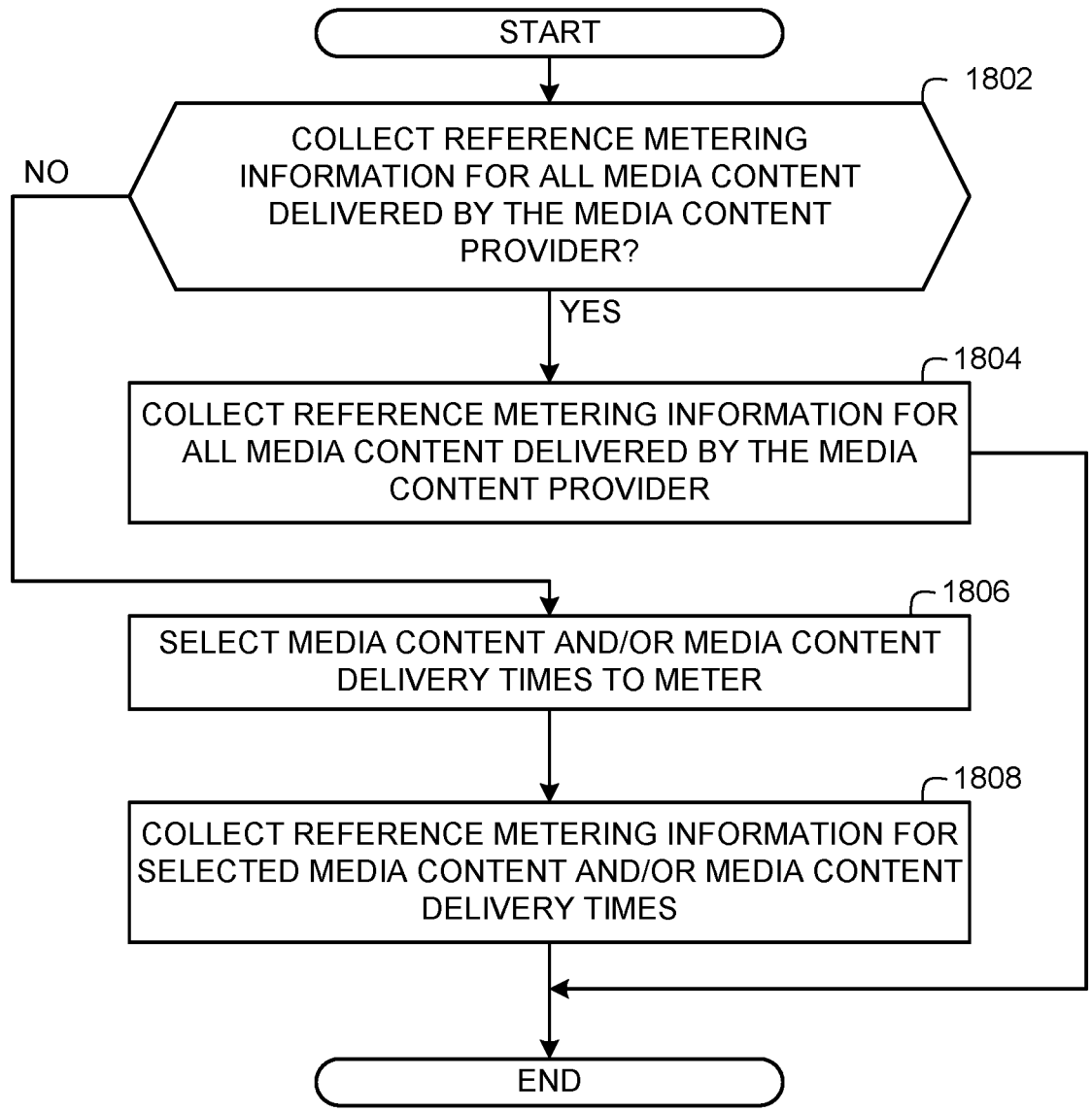
FIG. 18 is a flowchart representative of an example process that may be performed to collect reference metering information.

FIG. 18 is a flowchart representative of an example process that may be performed to collect reference metering information. Initially, the media measurement entity 102 determines whether it should collect reference metering information for all media content delivered (e.g., broadcast, multicast, unicast, transmitted on-demand or per request, etc.) by the media content provider 106 (block 1802). If the media measurement entity 102 determines that it should collect reference metering information for all delivered media content, then the media measurement entity 102 uses the broadcast monitor 114 (FIGS. 1 and 3) and/or one or more control wireless communication devices 116 (FIGS. 1 and 2) to collect all reference metering information for all media content delivered by the media content provider 106 (block 1804).

If the media measurement entity 102 determines that it should not collect reference metering information for all media content delivered by the media content provider 106 (block 1802), then the media measurement entity 102 selects particular media content and/or media content delivery times for which to collect reference metering information (block 1806) and uses the control wireless communication device 116 and/or the broadcast monitor 114 to collect reference metering information for the selected media content and/or media content delivery times (block 1808). After the media measurement entity 102 collects reference metering information at block 1804 or block 1808, the process of FIG. 18 is ended.

Figure 19:
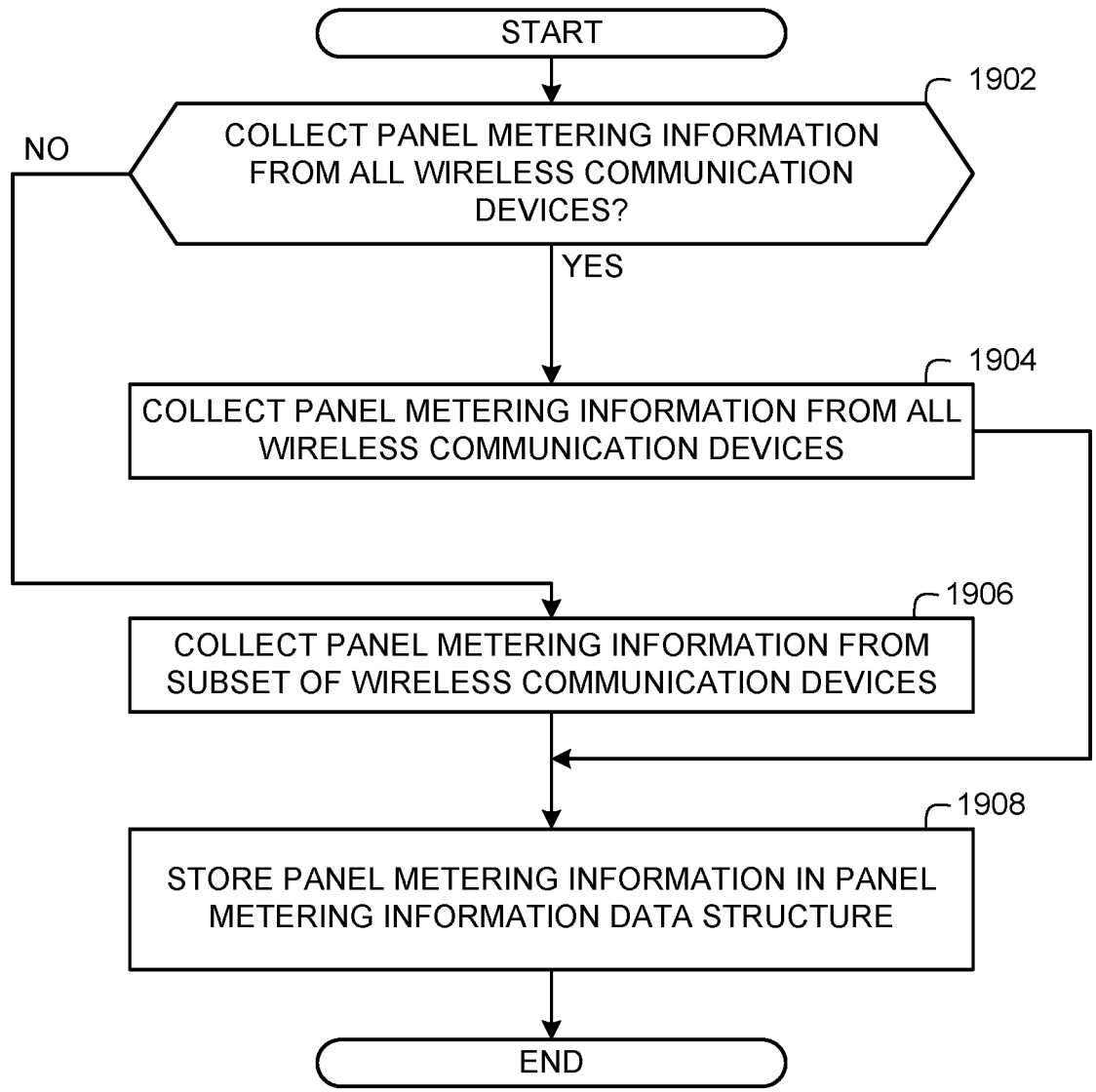
FIG. 19 is a flowchart representative of an example process that may be performed to collect panel metering information from the wireless communication devices of FIGS. 1-3.

FIG. 19 is a flowchart representative of an example process that may be performed to collect panel metering information from the wireless communication devices 104 (FIG. 1). Initially, the media measurement entity 102 determines whether it should collect panel metering information from all of the wireless communication devices 104 (block 1902). If the media measurement entity 102 determines that it should collect panel metering information from all of the wireless communication devices 104 (block 1902), then the media measurement entity 102 collects panel metering information from all of the wireless communication devices 104 (block 1904). For example, the media measurement entity 102 may communicate a control message to all of the wireless communication devices 104 to configure all of the wireless communication devices 104 to transmit their panel metering information to the media content provider 106 (FIG. 1). In some example implementations, the media measurement entity 102 may collect panel metering information from all wireless communication devices 104 regardless of whether respective owners of the wireless communication devices 104 have expressly agreed to participate in the metering program.

However, if the media measurement entity 102 determines that it should not collect panel metering information from all of the wireless communication devices 104 (block 1904), then the media measurement entity 102 collects panel metering information from only a subset of all the wireless communication devices 104 (block 1906). For example, the media measurement entity 102 may communicate a control message to only a select or random subset of the wireless communication devices 104 to configure the subset of the wireless communication devices 104 to transmit their panel metering information to the media content provider 106 (FIG. 1). The media measurement entity 102 may periodically or aperiodically (e.g., once per day, once per week, etc.) select different specific or random subsets of the wireless communication devices 104.

After the media measurement entity 102 collects the panel metering information at block 1904 or block 1906, the media measurement entity 102 stores the panel metering information in the panel metering information data structure 112 (block 1908) and the process is ended.

Figure 20A:
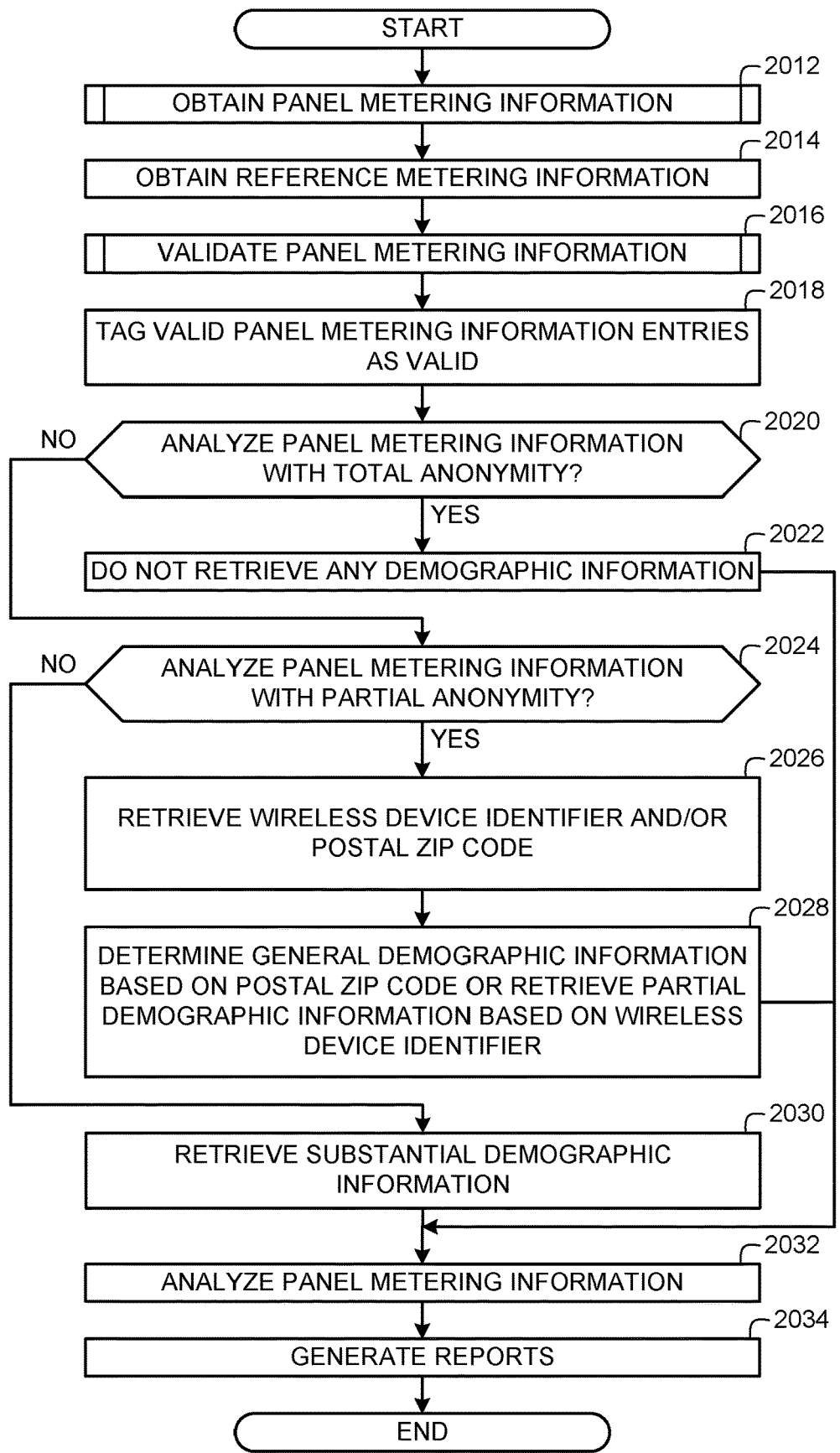
FIGS. 20A and 20B are flowcharts representative of example processes that may be performed to validate and analyze panel metering information.
Figure 20B:
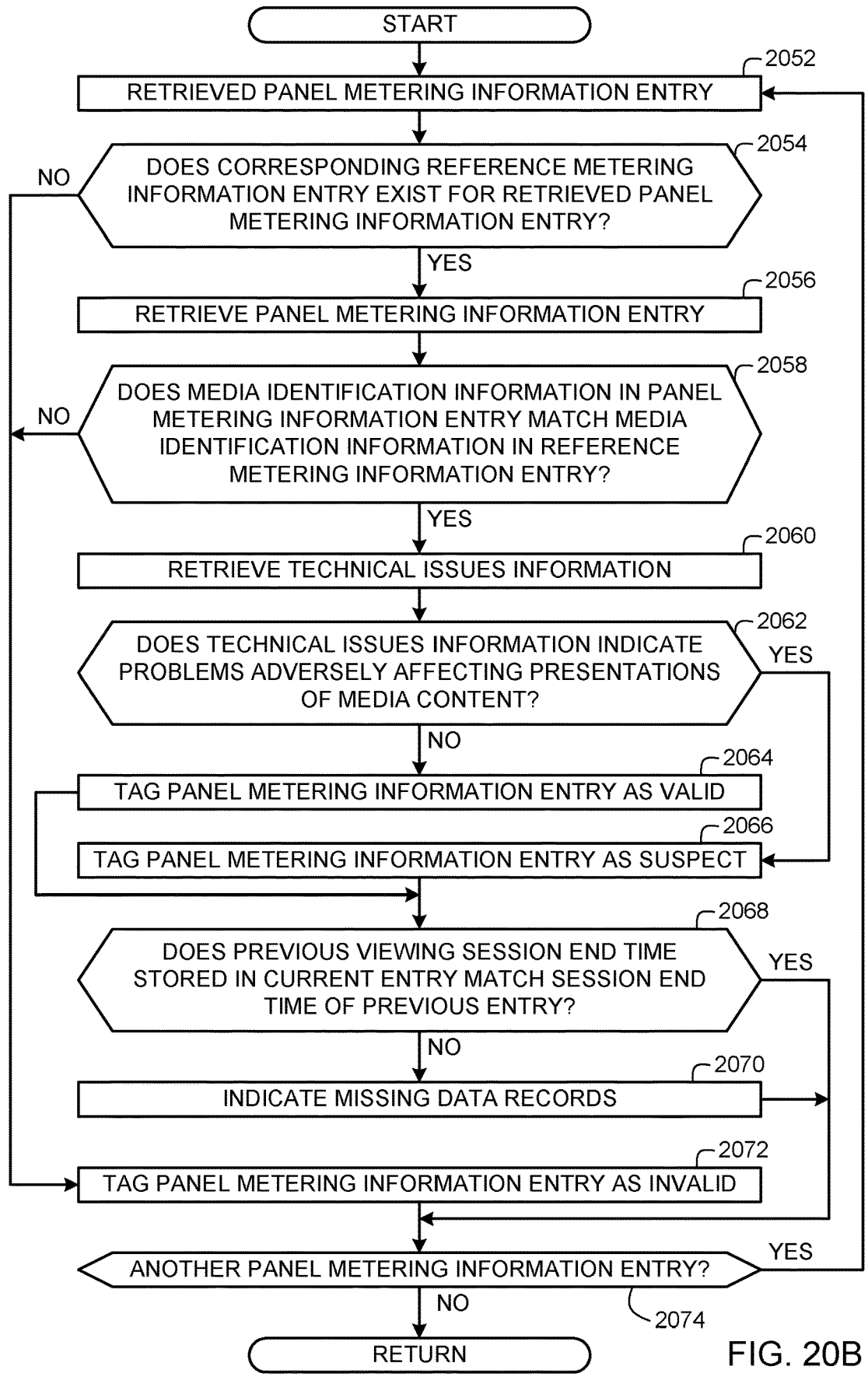

FIGS. 20A and 20B are flowcharts representative of example processes that may be performed to validate and analyze panel metering information. Initially, the validator 208 obtains the panel metering information (block 2012) from the panel metering information data structure 112 (FIGS. 1 and 13) via the panel metering information interface 1302 (FIG. 13). The panel metering information may include some or all of the types of panel metering information collected by a wireless communication device 104 as described above in connection with the flowcharts of FIGS. 16A, 16B, and 17. The operations of block 2012 may be implemented using the process described below in connection with FIGS. 21A and 21B. The validator 208 then obtains reference metering information (block 2014) from the reference metering information data structure 118 (FIGS. 1, 2, 3, and 13). The validator 208 then validates the panel metering information (block 2016). For example, the validator 208 can validate the panel metering information that includes types of information associated with the media content, the media content provider 106, the transmission of the media content, or any other panel metering information for which the control wireless communication device 116 or the broadcast monitor 114 would be able to generate corresponding reference metering information or for which reference metering information is otherwise available for validation. The validator 208 may validate the panel metering information based on the reference metering information by comparing the panel metering information to the reference metering information to ensure that the panel metering information is accurate or trustworthy. Alternatively or additionally, the validator 208 may obtain channel lineup and content programming information (e.g., the channel lineup and content programming data structure 1000 of FIG. 10) from, for example, the reference metering information data structure 118 and validate the panel metering information based on the channel lineup and content programming information. In some example implementations, the validator 208 may determine, based on the panel metering information, if the corresponding wireless communication device 104 was roaming outside of its local calling area and use the roaming information to retrieve the channel lineup and content programming information corresponding to the calling area in which the wireless communication device 104 was roaming. Of course, the validator 208 may additionally or alternatively validate panel metering information based on other criteria such as, for example, roaming status, time of day, technical issues affecting the wireless communication device 104, signal strengths received by the wireless communication device 104, call usage information, on/off status information, etc. An example process that may be used to validate the panel metering information is described below in connection with the flowchart of FIG. 20B. The validator 208 then tags valid panel metering information entries as valid (block 2018) in the panel metering information data structure 112.

The analyzer 1308 (FIG. 13) then determines whether it should analyze the panel metering information with total anonymity (block 2020). For example, the analyzer 1308 may obtain a demographic option setting from the panel metering information stored in the panel metering information data structure 112. If the analyzer 1308 determines that it should analyze the panel metering information with total anonymity (block 2020), then the analyzer 1308 does not retrieve any demographic and/or personal information (block 2022).

If the analyzer 1308 determines that it should not analyze the panel metering information with total anonymity (block 2020), then the analyzer 1308 determines whether it should analyze the panel metering information with partial anonymity (block 2024). If the analyzer 1308 determines it should analyze the panel metering information with partial anonymity (block 2024), then the analyzer 1308 retrieves the wireless device identifier 404 (FIGS. 4 and 11) and/or the postal zip code 618 (FIGS. 6 and 11) (block 2026) from, for example, the panel metering information stored in the panel metering information data structure 112. The analyzer 1308 then determines general demographic information based on the postal zip code 618 (e.g., the general demographic information of residents living within the retrieved postal zip code) or the demographic information interface 1306 retrieves partial demographic information based on the wireless device identifier 404 (block 2028) from, for example, the account information data structure 122 (FIG. 1). The demographic information interface 1306 may store the demographic and/or personal information in the demographic information data structure 126 in the media measurement entity 102 for relatively quicker access during analyses by the analyzer 1308. In some example implementations, the demographic information interface 1306 retrieves the demographic and/or personal information from the account information data structure 122 and stores the demographic and/or personal information in the demographic information data structure 126.

If the analyzer 1308 determines that it should not analyze the panel metering information with partial anonymity (block 2024), then the demographic information interface 1306 retrieves substantial demographic and/or personal information (block 2030) from, for example, the panel metering information stored in the panel metering information data structure 112.

After the demographic information interface 1306 retrieves demographic and/or personal information at blocks 2030 or block 2028 or if the demographic information interface 1306 does not retrieve any demographic and/or personal information at block 2022, the analyzer 1308 analyzes the panel metering information (block 2032) based on, for example, the reference metering information, channel lineup and content programming information, and/or any other information. In some example implementations, the analyzer 1308 may analyze the panel metering information based only on the panel metering information without any other information. The report generator 1310 then generates reports (block 2034) based on the analyses performed by the analyzer 1308 and then the process is ended.

Turning to FIG. 20B, the illustrated flowchart is representative of an example process that may be used to implement the operations of block 2016 (FIG. 20A) to validate the panel metering information obtained at block 2012 (FIG. 20A). Initially, the panel metering information interface 1302 retrieves a panel metering information entry (or data record) (block 2052) from the panel metering information obtained at block 2012 (FIG. 20A). The validator 208 then determines whether a corresponding reference metering information entry from the reference metering information retrieved at block 2014 (FIG. 20A) exists for the retrieved panel metering information entry (block 2054). For example, the validator 208 can identify or retrieve one or more of a timestamp, a channel number, a channel name, and/or a media content provider ID from the panel metering information entry and determine whether a reference metering information entry includes a substantially matching timestamp (e.g., some error between timestamps may be allowed to account for wireless device clock inaccuracies) and/or whether a reference metering information entry includes a channel number, a channel name, and/or a media content provider ID that matches respective information from the panel metering information.

If the validator 208 determines that a corresponding reference metering information entry exists for the retrieved panel metering information entry (block 2054), the validator 208 retrieves the reference metering information entry (block 2056) and determines whether media identification information in the panel metering information entry matches media identification information in the reference metering information entry (block 2058). For example, the validator 208 can retrieve signatures and/or codes indicative of media content from the panel and reference metering information entries and compare a panel metering signature to a reference metering signature and/or a panel metering code to a reference metering code to determine whether the information matches.

If the validtor 208 determines that the media identification information in the panel metering information entry matches the media identification information in the reference metering information entry (block 2058), the validator 208 retrieves technical issues information (e.g., the technical issues information 704) from the panel metering information entry (block 2060) and determines whether the technical issues information is indicative of any problems that could adversely affect the presentation of media content by the wireless communication device 104 (block 2062). For example, a damaged display could adversely affect a video portion of a media content presentation, a damaged speaker or headset interface jack could adversely affect an audio portion of the media content presentation, damaged buttons could adversely affect a user's interaction with a media content presentation, communication problems could adversely affect reception of the media content, and other technical issues could adversely affect other aspects of a media content presentation.

If the validator 208 determines that the technical issues information is not indicative of problems that could adversely affect the presentation of media content (block 2062), the validator 208 tags the panel metering information entry as valid (block 2064). Otherwise, if the validator 208 determines that the technical issues information is indicative of problems that could adversely affect the presentation of media content (block 2062), the validator 208 tags the panel metering information entry as suspect (block 2066). The validator 208 can also provide an explanation or reason in the panel metering information entry for why it is tagged as suspect. In this manner, during subsequent analysis of the panel metering information entry, the analyzer 1308 can use the suspect tag and/or the explanation or reason for the suspect tag to determine an amount of media exposure credit or media consumption credit to award, give, or attribute to a media content presentation identified by the panel metering information entry.

After the validator 208 tags the panel metering information entry as valid (block 2064) or suspect (block 2066), the validator 208 determines whether a previous viewing session end time stored in the current panel metering information entry (e.g., the previous viewing session end time information 806 of the data record 808c of FIG. 8) matches a session end time stored in a previous panel metering information entry (e.g., the end time information 804 of the data record 808b of FIG. 8) (block 2068). If the validator 208 determines that the previous viewing session end time stored in the current panel metering information entry does not match the session end time stored in the previous panel metering information entry (block 2068), the validator 208 generates information indicating that data records are missing (block 2070) between the current and previous panel metering information entries. The analyzer 1308 can subsequently use the missing records information in connection with analyzing the panel metering information.

If the validator 208 determines that a corresponding reference metering information entry does not exist for the retrieved panel metering information entry (block 2054) or that the media identification information in the panel metering information entry does not match the media identification information in the reference metering information entry (block 2058), the validator 208 tags the panel metering information entry as invalid (block 2072). In some example implementations, the validator 208 may additionally or alternatively tag the panel metering information entry as not associated with media content presented by the wireless communication device 104. For example, if a microphone (e.g., the microphone 2204 of FIGS. 22A, 22B, and 23) is used to detect audio portions of media content presentations, the microphone may sometimes detect audio associated with media content presented by devices other than the wireless communication device 104 that are in proximity to the wireless communication device 104. Tagging the panel metering information entry as not associated with media content presented by the wireless communication device 104 enables the analyzer 1308 to generate analysis information indicative of media content to which a user of the wireless communication device 104 was exposed to or that the user consumed, but that was not presented by the wireless communication device 104.

After the validator 208 tags the panel metering information entry as invalid (block 2072) or after the validator 208 generates the missing data records information (block 2070) or if the validator 208 determines that the previous viewing session end time stored in the current panel metering information entry matches the session end time stored in the previous panel metering information entry (block 2068), the validator 208 determines whether to retrieve another panel metering information entry (block 2074). For example, if panel metering information entries remain to be validated, the validator 208 can determine that it should retrieve another panel metering information entry. If the validator 208 determines that it should retrieve another panel metering information entry (block 2074), control returns to block 2052 and the validator 208 retrieves another panel metering information entry. Otherwise, the process of FIG. 20B ends and control returns to a calling process or function such as, for example, the example process of FIG. 20A.

Figure 21A:
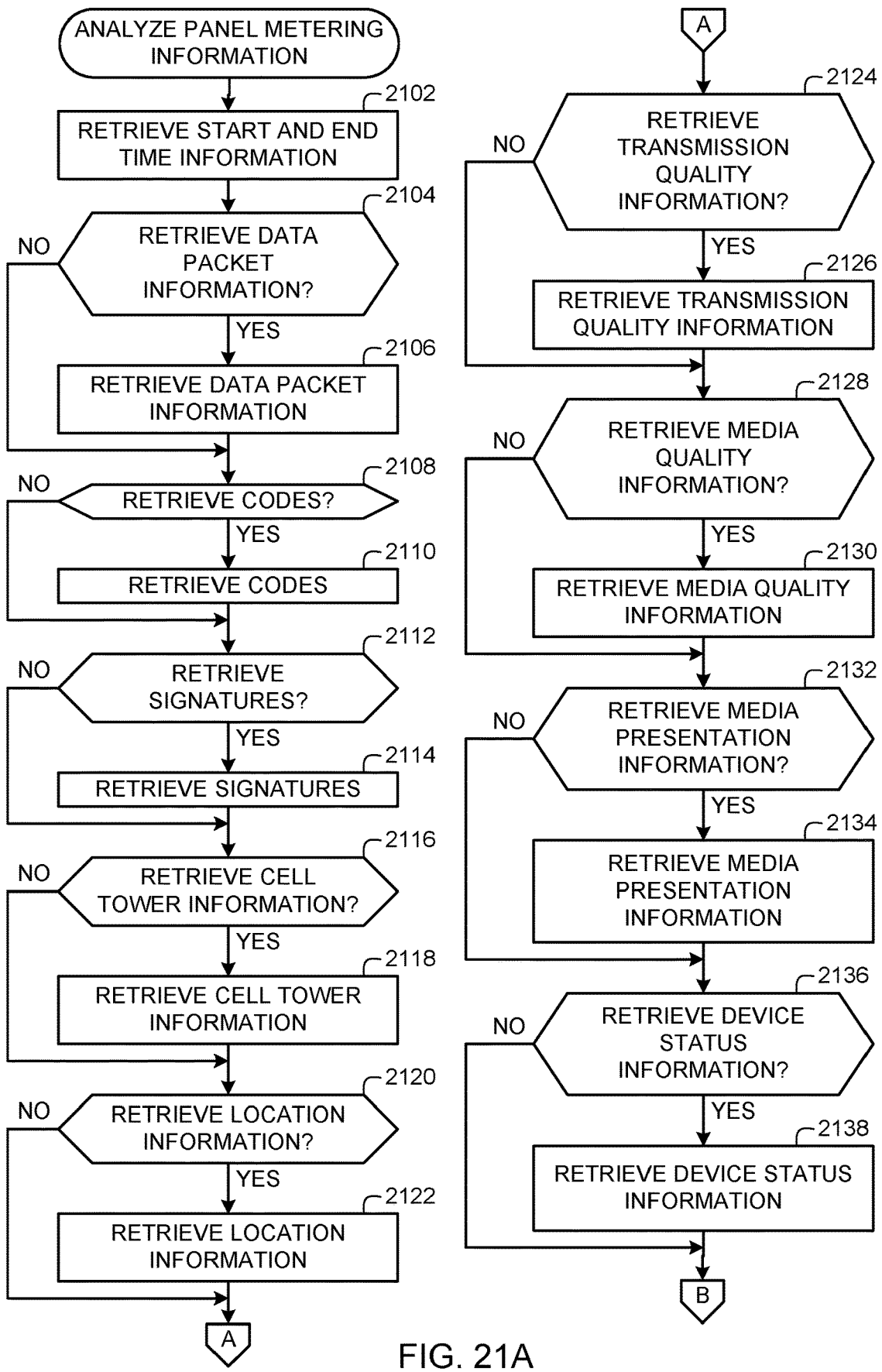
FIGS. 21A and 21B depict a flowchart representative of an example process that may be performed to retrieve panel metering information for analysis.
Figure 21B:
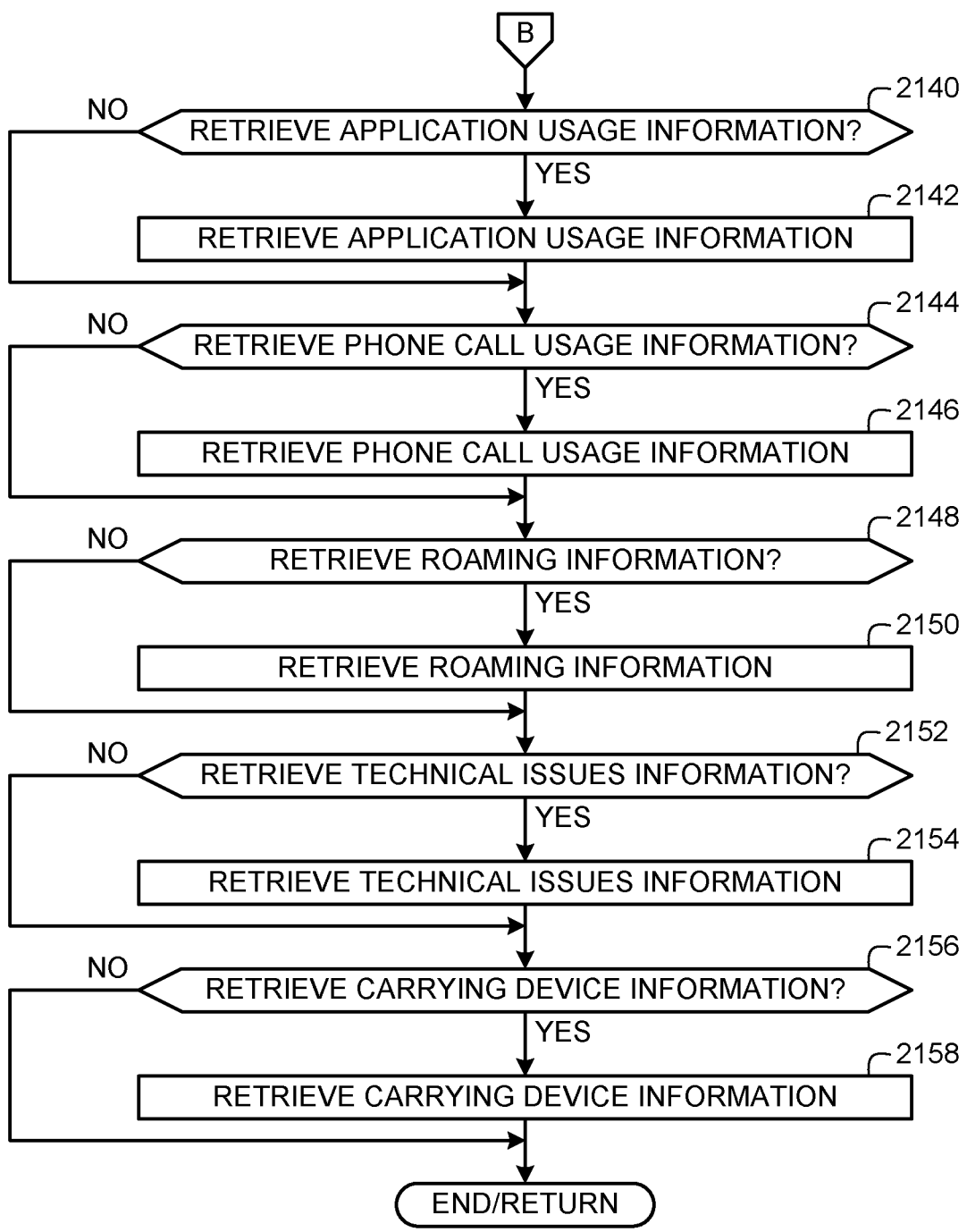

FIGS. 21A and 21B depict a flowchart representative of an example process that may be performed to retrieve panel metering information collected and/or generated by a wireless communication device 104. The flowchart of FIGS. 21A and 21B may be used to implement the operations of block 2012 of FIG. 20. The operations discussed below may be implemented by the panel metering information interface 1302 to retrieve panel metering information from the panel metering information data structure 112 (FIGS. 1-3 and 13). To determine the types of panel metering information that should be retrieved, the panel metering information interface 1302 can check an analysis setting to determine the type of analysis that is to be performed by the analyzer 1308 (FIG. 13) and/or the type of report that is to be generated by the report generator 1310 (FIG. 13).

Initially, the panel metering information interface 1302 retrieves the start time information 802 (FIGS. 8 and 11) (block 2102). The panel metering information interface 1302 then determines whether it should retrieve data packet information (block 2104). If the panel metering information interface 1302 determines that it should retrieve data packet information (block 2104), the panel metering information interface 1302 retrieves the data packet information (block 2106).

After the panel metering information interface 1302 retrieves the data packet information (block 2106) or if the panel metering information interface 1302 determines that it should not retrieve the data packet information (block 2104), the panel metering information interface 1302 determines whether it should retrieve codes (block 2108) such as, for example, ancillary audio codes, ancillary video codes, ancillary graphics codes, etc. If the panel metering information interface 1302 determines that it should retrieve codes, the panel metering information interface 1302 retrieves the codes (block 2110).

After the panel metering information interface 1302 retrieves the codes (block 2110) or if the panel metering information interface 1302 determines that it should not retrieve codes (block 2108), the panel metering information interface 1302 determines whether it should retrieve signatures (block 2112) such as, for example, audio signatures, video signatures, graphics signatures, etc. If the panel metering information interface 1302 determines that it should retrieve signatures (block 2112), the panel metering information interface 1302 retrieves the signatures (block 2114).

After the panel metering information interface 1302 retrieves the signatures (block 2114) or if the panel metering information interface 1302 determines that it should not retrieve signatures (block 2112), the panel metering information interface 1302 determines whether it should retrieve cell tower information (block 2116) such as, for example, transmitting tower identification information 926 (FIG. 9). If the panel metering information interface 1302 determines that it should retrieve cell tower information (block 2116), the panel metering information interface 1302 retrieves the cell tower information (block 2118).

After the panel metering information interface 1302 retrieves the cell tower information (block 2118) or if the panel metering information interface 1302 determines that it should not retrieve the cell tower information (block 2116), the panel metering information interface 1302 determines whether it should retrieve location information (block 2120). If the panel metering information interface 1302 determines that it should retrieve location information (block 2120), the panel metering information interface 1302 retrieves the location information from the location interface 1212 (block 2122).

After the panel metering information interface 1302 retrieves the location information (block 2122) or if the panel metering information interface 1302 determines that it should not retrieve the location information (block 2120), the panel metering information interface 1302 determines whether it should retrieve transmission quality information (block 2124). If the panel metering information interface 1302 determines that it should retrieve transmission quality information (block 2124), the panel metering information interface 1302 retrieves the transmission quality information (block 2126).

After the panel metering information interface 1302 retrieves the transmission quality information (block 2126) or if the panel metering information interface 1302 determines that it should not retrieve the transmission quality information (block 2124), the panel metering information interface 1302 determines whether it should retrieve media quality information (block 2128). If the panel metering information interface 1302 determines that it should retrieve media quality information (block 2128), the panel metering information interface 1302 retrieves the media quality information (block 2130).

After the panel metering information interface 1302 retrieves the media quality information (block 2130) or if the panel metering information interface 1302 determines that it should not retrieve the media quality information (block 2128), the panel metering information interface 1302 determines whether it should retrieve media presentation information (block 2132). If the panel metering information interface 1302 determines that it should retrieve the media presentation information (block 2132), the panel metering information interface 1302 retrieves the media presentation information (block 2134).

After the panel metering information interface 1302 retrieves the media presentation information (block 2134) or if the panel metering information interface 1302 determines that it should not retrieve the media presentation information (block 2132), the panel metering information interface 1302 determines whether it should retrieve device status information (block 2136). If the panel metering information interface 1302 determines that it should retrieve device status information (block 2136), the panel metering information interface 1302 retrieves the device status information (block 2138).

After the panel metering information interface 1302 retrieves the device status information (block 2138) or if the panel metering information interface 1302 determines that it should not retrieve the device status information (block 2136), the panel metering information interface 1302 determines whether it should retrieve application usage information (block 2140) (FIG. 21B). If the panel metering information interface 1302 determines that it should retrieve application usage information (block 2140), the panel metering information interface 1302 retrieves the application usage information (block 2142).

After the panel metering information interface 1302 retrieves the application usage information (block 2142) or if the panel metering information interface 1302 determines that it should not retrieve the application usage information (block 2140), the panel metering information interface 1302 determines whether it should retrieve phone call usage information (block 2144). If the panel metering information interface 1302 determines that it should retrieve phone call usage information (block 2144), the panel metering information interface 1302 retrieves the phone call usage information (block 2146).

After the panel metering information interface 1302 retrieves the phone call usage information (block 2146) or if the panel metering information interface 1302 determines that it should not retrieve the phone call usage information (block 2144), the panel metering information interface 1302 determines whether it should retrieve roaming information (block 2148). If the panel metering information interface 1302 determines that it should retrieve roaming information (block 2148), the panel metering information interface 1302 retrieves the roaming information (block 2150).

After the panel metering information interface 1302 retrieves the roaming information (block 2150) or if the panel metering information interface 1302 determines that it should not retrieve the roaming information (block 2148), the panel metering information interface 1302 determines whether it should retrieve technical issues information (block 2152). If the panel metering information interface 1302 determines that it should retrieve technical issues information (block 2152), the panel metering information interface 1302 retrieves the technical issues information (block 2154).

After the panel metering information interface 1302 retrieves the technical issues information (block 2154) or if the panel metering information interface 1302 determines that it should not retrieve technical issues information (block 2152), the panel metering information interface 1302 determines whether it should retrieve carrying device information (bloc 2156). If the panel metering information interface 1302 determines that it should retrieve the carrying device information (block 2156), the panel metering information interface 1302 retrieves the carrying device information (block 2158).

After the panel metering information interface 1302 retrieves the carrying device information (block 2158) or if the panel metering information interface 1302 determines that it should not retrieve the carrying device information (block 2156), the process of FIGS. 21A and 21B is ended and control returns to the flowchart of FIG. 20.

Figure 22A:
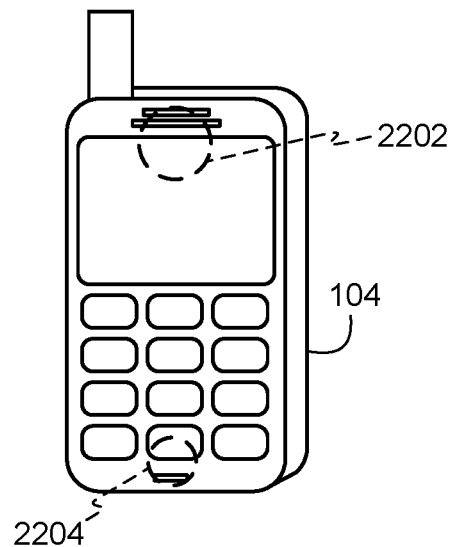
FIG. 22A is a front view and FIG. 22B is a side view of an example implementation of the example wireless communication devices of FIGS. 1-3.
Figure 22B:
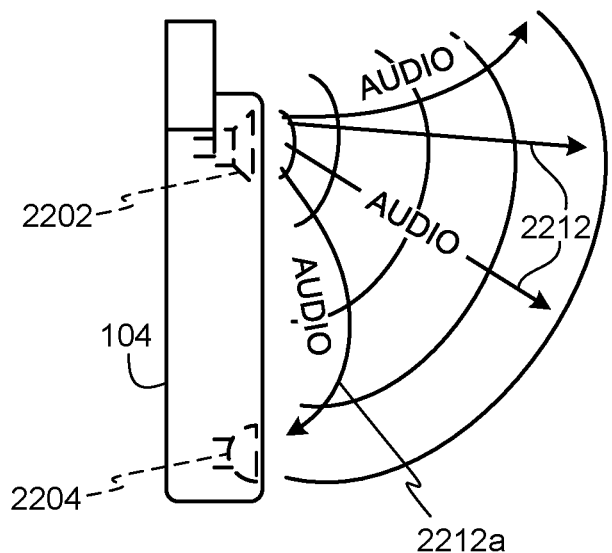

FIGS. 22A and 22B depict an example implementation of an example wireless communication device 104 of FIGS. 1-3. In particular, FIG. 22A is a front view and FIG. 22B is a side view of the example wireless communication device 104 used to present media content and generate panel metering information based on the presented media content. In the illustrated example of FIGS. 22A and 22B, the example wireless communication device 104 is configured to generate the panel metering information based on audio emitted by the wireless communication device 104. As will be readily appreciated, such audio corresponds to media content presented by the wireless communication device 104.

In the illustrated example, the example wireless communication device 104 is provided with a speaker 2202 to emit audio of media content received, decoded, and presented by the wireless communication device 104. Although the speaker 2202 is shown as being the speaker used to emit audio associated with telephone calls made using the wireless communication device 104, in other example implementations, the speaker 2202 may be separate from a speaker of the wireless communication device used to emit audio associated with telephone calls.

To sense or detect ambient audio, the example wireless communication device 104 is provided with a microphone 2204. In the illustrated example, the microphone 2204 is configured to receive (e.g., sense or detect) the voice of the user 108 in connection with telephone calls made via the wireless communication device 104 and is configured to translate the received voice-audio to electrical signals and communicate the voice-audio electrical signals to a communication subsystem (not shown) of the wireless communication device 104 to transmit the voice-audio information wirelessly via a cellular communication system in connection with a telephone call. In the illustrated example, the example wireless communication device 104 is also configured to use the microphone 2204 as an ambient audio detector to detect or sense audio emitted by the speaker 2202 related to media content presented by the wireless communication device 104. Thus, in the illustrated example, the microphone 204 is used in connection with detecting voice-audio for making telephone calls and for detecting audio emitted by the speaker 2202 to generate panel metering information.

As shown in FIG. 22B, the speaker 2202 emits audio signals 2212 in connection with media content presented by the wireless communication device 104. As shown, some of the audio signals 2212 propagate away from the wireless communication device 104. However, some of the audio signals 2212 such as, for example, audio signal 2212*a*, propagate to the microphone 2204. The microphone 2204 detects the audio signal 2212*a*, and the wireless communication device 104 can generate panel metering information based on the detected audio signal 2212*a* by generating audio signatures based on the audio signal 2212*a* or by extracting ancillary audio codes from the audio signal 2212*a*. Although the audio signal 2212*a* is shown as propagating to the microphone 2204 outside the housing of the wireless communication device 104, other audio signals emitted by the speaker 2202 and detected by the microphone 2204 may propagate from the speaker 2202 to the microphone 2204 inside the housing of the wireless communication device 104.

The speaker 2202 is in relatively close proximity to the microphone 2204, and thus, the audio signal 2212*a* emitted by the speaker 2202 is relatively more dominant than other ambient audio (e.g., surrounding noise or other audio in the general area in which the wireless communication device 104 is located) detected by the microphone 2204. A metering process (e.g., a metering process implemented by the meter 202 of FIG. 2) used to generate and/or collect the panel metering information can filter audio signals detected by the microphone 2204 to identify and/or select the audio signals emitted by the speaker 2202. For example, the metering process can measure audio signal volume, strength, amplitude, signal-to-noise ratio, etc. and compare the measured values to threshold values used to filter out audio signals not emitted by the speaker 2202 (e.g., room noise). In this manner, the metering process can generate and/or collect panel metering information corresponding to the audio signals associated with media content presented by the wireless communication device 104 instead of other surrounding noise or audio not generated by the speaker 2202, but detected by the microphone 2204.

In other example implementations, a metering process (e.g., a metering process implemented by the meter 202 of FIG. 2) of the wireless communication device 104 can be configured to generate signatures or collect codes associated with any audio detected by the microphone 2204, and the media measurement entity 102 can subsequently discard or any generated signatures or collected codes for which reference metering information does not exist or any generated signatures or collected codes that the media measurement entity 102 otherwise determines are not indicative of media content presented by the wireless communication device 104 (e.g., signatures corresponding with surrounding audio not generated by the speaker 2202). In an alternative example implementation, the media measurement entity 102 may be configured to tag any generated signatures or collected codes as being associated with media content presentations to which a user of the wireless communication device 104 was exposed to or consumed but that were not presented by the wireless communication device 104. In this manner, the meter 202 of the wireless communication device 104 may be used to generate panel metering information based on media content presented by media presentation device (e.g., televisions, radios, video players, audio players, etc.) in proximity to the wireless communication device 104 to subsequently identify media content presentations to which the user of the wireless communication device 104 was exposed and/or which the user consumed.

In yet other example implementations, a status monitoring process of the wireless communication device 104 can be configured to determine when media presentation software (e.g., an audio and/or video player, a gaming application, etc.) is being executed by the wireless communication device 104. A metering process can then be configured to generate signatures and/or collect codes associated with audio detected by the microphone 2204 only when the status monitoring process indicates that the wireless communication device 104 is executing media presentation software. In some example implementations, an application monitoring process of the wireless communication device 104 can be configured to detect operating modes of or commands (e.g., play, stop, pause, skip, rewind, fastforward, etc.) received by the media presentation software, and the metering process may be configured to generate signatures and/or collect codes associated with audio detected by the microphone 2204 only when the application monitoring process indicates that the media presentation software is presenting media (e.g., is in a playback mode) instead of being in a paused or stopped mode.

Figure 23:
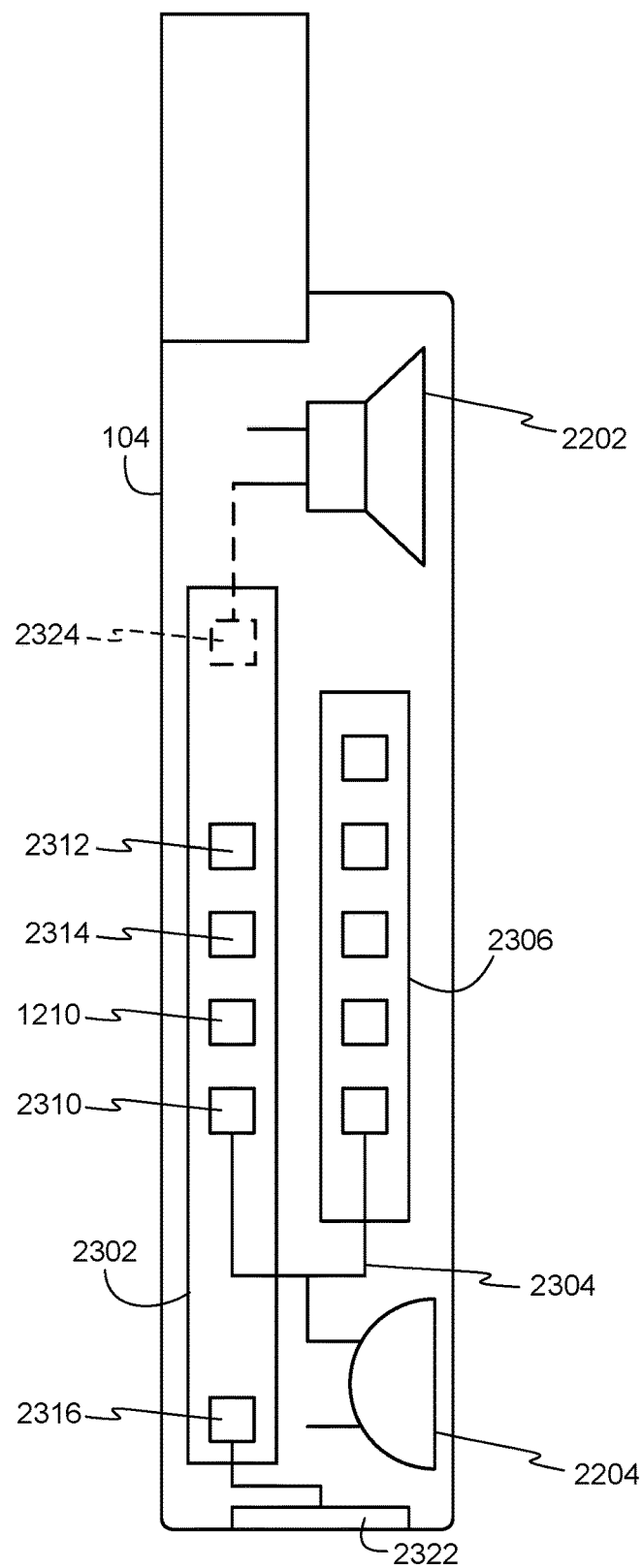
FIG. 23 depicts an example add-on metering module that may be installed in the wireless communication devices of FIGS. 1-3, 22A, and 22B to receive audio signals from a microphone line of the wireless communication device and generate panel metering information.

FIG. 23 is a detailed depiction of the wireless communication device 104 having a metering module 2302 configured to receive audio signals from a microphone line 2304 of the wireless communication device 104. The metering module 2302 may be used to implement the example meter 202 of FIG. 2. The wireless communication device 104 also includes wireless communication device circuitry 2306 to perform functions ordinarily associated with a wireless communication device such as, for example, a handheld cellular communication device (e.g., a cellular telephone). The wireless communication device circuitry 2306 may be circuitry ordinarily provided by a wireless communication device manufacturer to enable a wireless communication device to perform its communication functions and media presentation functions. The metering module 2302 can be an add-on module provided by, for example, the media measurement entity 102 (FIG. 1) to generate and/or collect panel metering information based on the media content presented by the wireless communication device 104 using its wireless communication device circuitry 2306. The metering module 2302 can be configured to be incorporated into a wireless communication device in an after-market process. For example, the media measurement entity 102 can install the metering module 2302 into or onto the wireless communication device 104 and couple the metering module 2302 to the microphone line 2304. In some example implementations, the metering module 2302 can be configured to be installed internal or external to the housing of the wireless communication device 104. The metering module 2302 may be implemented using one or more circuit boards.

In the illustrated example, the metering module 2302 includes the metering information/generator collector 1210 of FIG. 12. The metering module 2302 is provided with an audio sensor interface 2310 configured to be communicatively coupled to the microphone 2204 to receive audio signals detected by the microphone 2204. The metering module 2302 may also be provided with a memory 2312 to store panel metering information and a memory interface 2314 to access the information in the memory 2312. In some example implementations, the metering module 2302 may also include a communication interface 2316 (e.g., a serial communication interface) to communicatively couple the metering module 2302 to the wireless communication device circuitry 2306 to communicate panel metering information to the media measurement entity 102 via a wireless communication interface (e.g., the communication interface 1202 of FIG. 12) of the wireless communication device 104. For example, the communication interface 2316 of the metering module 2302 may be communicatively coupled to communication lines of an accessory port 2322 of the wireless communication device 104 to enable the metering module 2302 to control the communication operations of the wireless communication device 104 (e.g., the metering module 2302 may use the wireless communication device circuitry 2306 as a modem).

Although not shown in FIG. 23, the status monitor 1214 and the application monitor 1216 of FIG. 12 can be implemented on the metering module 2302 and/or on the wireless device circuitry 2306. If the monitors 1214 and 1216 are implemented on the metering module 2302, the monitors 1214 and 1216 can be configured to monitor the operation of the wireless device circuitry 2306 via the communication interface 2316. For example, the wireless device circuitry 2306 can be configured to communicate messages or signals to the accessory port 2322 indicative of its operations or events. The communication interface 2316 can detect the messages or signals and communicate the messages or signals to the monitors 1214 and 1216.

In some example implementations, the metering module 2302 may be provided with an input interface 2324 configured to be communicatively coupled to a speaker output interface (e.g., output speaker lines) of the speaker 2202 to detect audio signals emitted by the speaker 2202. In this manner, instead of generating signatures or collecting codes based on audio signals detected by the microphone 2204, the metering module 2302 can generate signatures and/or collect codes based on audio signals detected at a speaker output interface.

In other example implementations, the meter 202 of FIG. 2 may be implemented in software and/or hardware implemented in connection with the wireless communication device circuitry 2306. In this manner, a separate module (e.g., the metering module 2302) would not be required.

FIG. 24 depicts an example event data structure 2400 that the meter 202 (FIGS. 2 and 3) may use to store operation and/or status event information entries 2402a-f indicative of the operating status of the wireless communication device 104 at different times. In particular, the metering information generator/collector 1210 of FIG. 12 can log detected events in the event data structure 2400 and timestamp the event information to create the timestamped event information entries 2402a-f based on information received from the status monitor 1214 and the application monitor 1216 of FIG. 12 indicative of operations or events of the wireless communication device 104 described above in connection with FIGS. 5, 7, 8, 9, and 11. In the illustrated example of FIG. 24, the example entries 2402a-f indicate when the wireless communication device 104 is turned on (e.g., the entry 2402a), when the wireless communication device 104 is charging (e.g., the entry 2402b), when the wireless communication device 104 instantiates a media presentation application (e.g., an audio and/or video media player, a web browser, video game, etc.) for use in presenting media content (e.g., the entry 2402c), when the wireless communication device 104 exits the media presentation application (e.g., the entry 2402d), and/or when the wireless communication device 104 is turned off (e.g., the entry 2402e).

The media measurement entity 102 can use the timestamped event entries 2402a-f of the event data structure 2400 to determine which generated signatures and/or collected codes correspond to media content presented by the wireless communication device 104 and which generated signatures and/or collected codes correspond to other ambient audio (e.g., noise or other audio emitted in areas in which the wireless communication device 104 was located while generating/collecting metering information) detected by the microphone 2204 (FIGS. 22A, 22B, and 23). For example, the media measurement entity 102 may determine that any signatures generated (and/or codes collected) between the times corresponding to the timestamps of the entries 2402d and 2402e correspond to or are likely to correspond to media content presented by the wireless communication device 104 because a media presentation application of the wireless communication device 104 was in use during that time.

FIG. 25 depicts an example signature data structure 2500 that the meter 202 (FIGS. 2 and 3) may use to store generated signatures. In particular, the metering information generator/collector 1210 (FIG. 12) can store generated audio signatures in the example signature data structure 2500, and the metering information generator/collector 1210 (FIG. 12) can tag each signature with a respective timestamp to generate the timestamped audio signature entries 2502a-f. Although not shown, a data structure similar to the example signature data structure 2500 can be used to store other types of panel metering information such as, for example, audio codes collected from presented media content.

In some example implementations, the status monitor 1214 and/or the application monitor 1216 (FIG. 12) may also be configured to collect other information (e.g., metadata) associated with the presented media content. For example, the monitors 1214 and 1216 may be configured to collect media file names, media content source identifiers, etc., and the metering information generator/collector 1210 can store the additional information in one or more other data structures (e.g., the example data structure 1100 of FIG. 11). In some example implementations, the media file names and/or media content sources can be used to identify the media content presented by the wireless communication device 104 and the generated measurement signatures (or collected codes) can be used to determine the amount of media content programs (e.g., songs, radio/video programs, movies, etc.) that the wireless communication device 104 actually presented. For example, in some cases, the user 108 may elect to listen to an entire song, while in other cases, the user 108 may listen to only a portion of a song.

Figure 26:
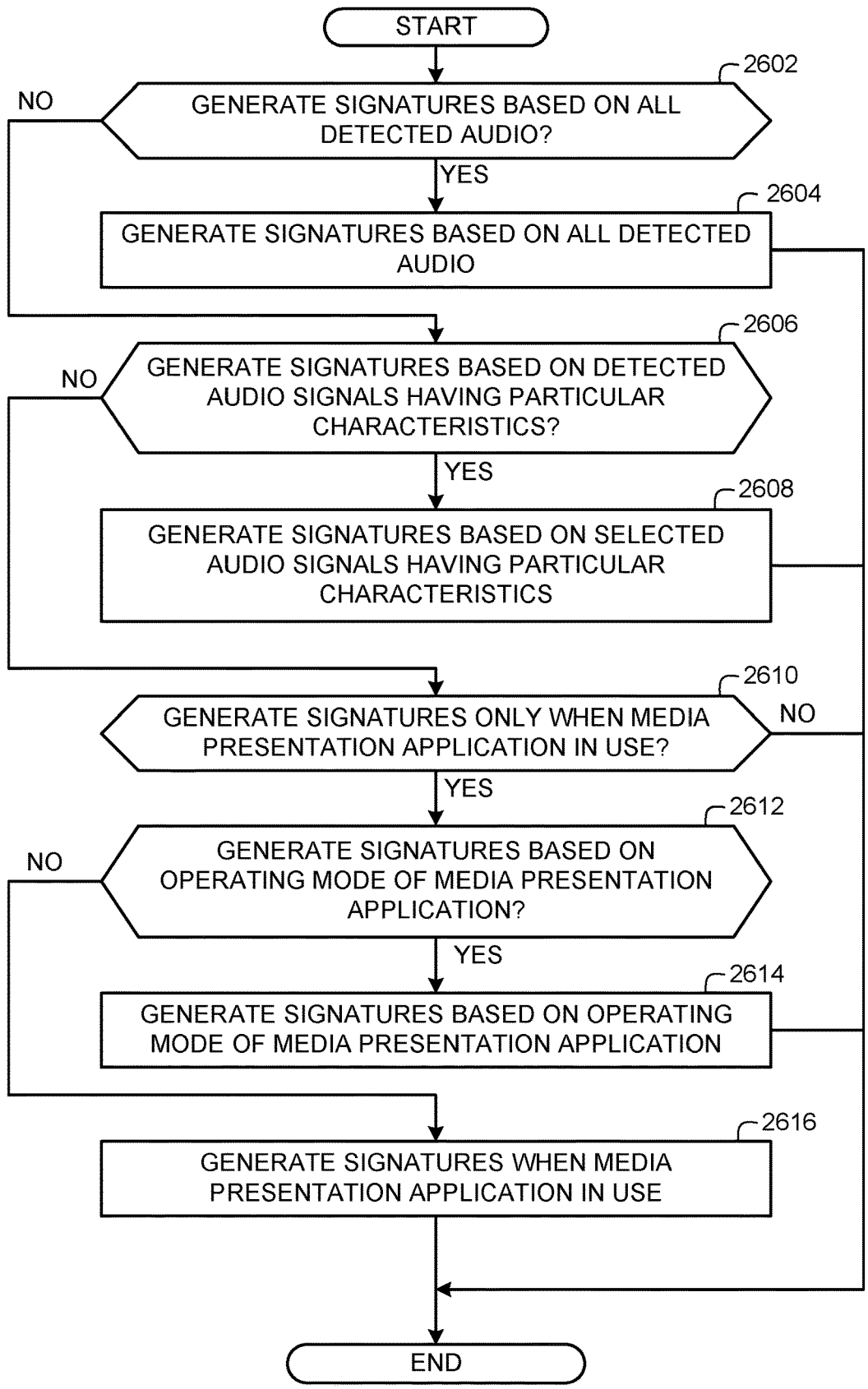
FIG. 26 is a flowchart representative of an example process that may be performed to generate signatures based on audio detected by a microphone of a wireless communication device of FIGS. 1-3, 22A, 22B, and 23.

FIG. 26 is a flowchart representative of an example process that may be performed to generate signatures based on audio detected by the microphone 2204 of FIGS. 22A, 22B, and 23. The signatures may be generated by the metering information generator/collector 1210, which can store the signatures in the data structure 2500 of FIG. 25 in association with respective timestamps. Although the example process of FIG. 26 is described in connection with generating signatures, the example process of FIG. 26 may additionally or alternatively be used to collect audio codes from detected audio.

Initially, the metering information generator/collector 1210 determines whether it should generate signatures based on all audio detected (block 2602) by, for example, the microphone 2204 (FIGS. 22A, 22B, and 23). For example, the metering information generator/collector 1210 may check a configuration bit of, for example, the example apparatus 1200 to determine whether it should generate signatures based on all detected audio without filtering out or discarding detected audio signals or without requiring the wireless communication device 104 to be in a particular operating mode (e.g., without requiring media presentation software to be in use). If the metering information generator/collector 1210 determines that it should generate signatures based on all detected audio (block 2602), the metering information generator/collector 1210 generates signatures based on all detected audio (block 2604) by obtaining audio signals based on, for example, timed intervals or whenever the microphone 2204 detects the audio signals.

If the metering information generator/collector 1210 determines that it should not generate signatures based on all detected audio (block 2602), the metering information generator/collector 1210 determines whether it should generate signatures based on detected audio signals having particular characteristics (block 2606). For example, the metering information generator/collector 1210 may generate signatures based only on audio signals having a signal characteristic (e.g., a volume, a strength, an amplitude, a signal-to-noise ratio, etc.) greater than a threshold value to substantially reduce or eliminate generating signatures associated with audio not emitted by the wireless communication device 104. The metering information generator/collector 1210 may check a configuration bit of, for example, the example apparatus 1200 to determine whether it should generate signatures based on detected audio signals having particular characteristics. If the metering information generator/collector 1210 determines that it should generate signatures based on detected audio signals having particular characteristics (block 2606), the metering information generator/collector 1210 generates signatures based on detected audio signals that have particular characteristics.

If the metering information generator/collector 1210 determines that it should not generate signatures based on detected audio signals having particular characteristics (block 2606), the metering information generator/collector 1210 determines whether it should generate signatures only when a media presentation application is in use (block 2610). For example, the metering information generator/collector 1210 may generate signatures based on audio signals detected only when the status monitor 1214 and/or the application monitor 1216 of FIG. 12 indicates that a media presentation application is being executed by the wireless communication device 104. The metering information generator/collector 1210 may check a configuration bit of, for example, the example apparatus 1200 to determine whether it should generate signatures only when a media presentation application is in use.

If the metering information generator/collector 1210 determines that it should generate signatures only when a media presentation application is in use (block 2610), the metering information generator/collector 1210 determines whether it should generate signatures based on an operating mode (e.g., a playback mode) of the media presentation application (block 2612). For example, the metering information generator/collector 1210 may generate signatures based on audio signals detected only when the status monitor 1214 and/or the application monitor 1216 of FIG. 12 indicates that media presentation application is in a playback mode to present media content. That is, the metering information generator/collector 1210 may be configured not to generate signatures based on audio signals detected during a time that a media presentation application is in a stop mode or a pause mode. The metering information generator/collector 1210 may check a configuration bit of, for example, the example apparatus 1200 to determine whether it should generate signatures based on an operating mode of the media presentation application. If the metering information generator/collector 1210 determines that it should generate signatures based on an operating mode of the media presentation application, the metering information generator/collector 1210 generates signatures based on an operating mode of the media presentation application (block 2614).

If the metering information generator/collector 1210 determines at block 2610 that it should not generate signatures based on an operating mode of the media presentation application (block 2612), the metering information generator/collector 1210 generates signatures based on audio signals detected any time during which the media presentation application is in use (block 2616).

After the metering information generator/collector 1210 generates signatures in connection with blocks 2616, 2614, 2608, or 2604 or if the metering information generator/collector 1210 determines that it should not generate signatures only when a media presentation application is in use (block 2610), the process of FIG. 26 is ended.

Although the conditions under which signatures are generated are described in the example process of FIG. 26 as being applied separately, in other example implementations, conditions for generating signatures may be combined. For example, the metering information generator/collector 1210 may be configured to generate signatures only based on audio signals having particular signal characteristics and that were detected when a media presentation application is in use and in a playback mode.

Figure 27:
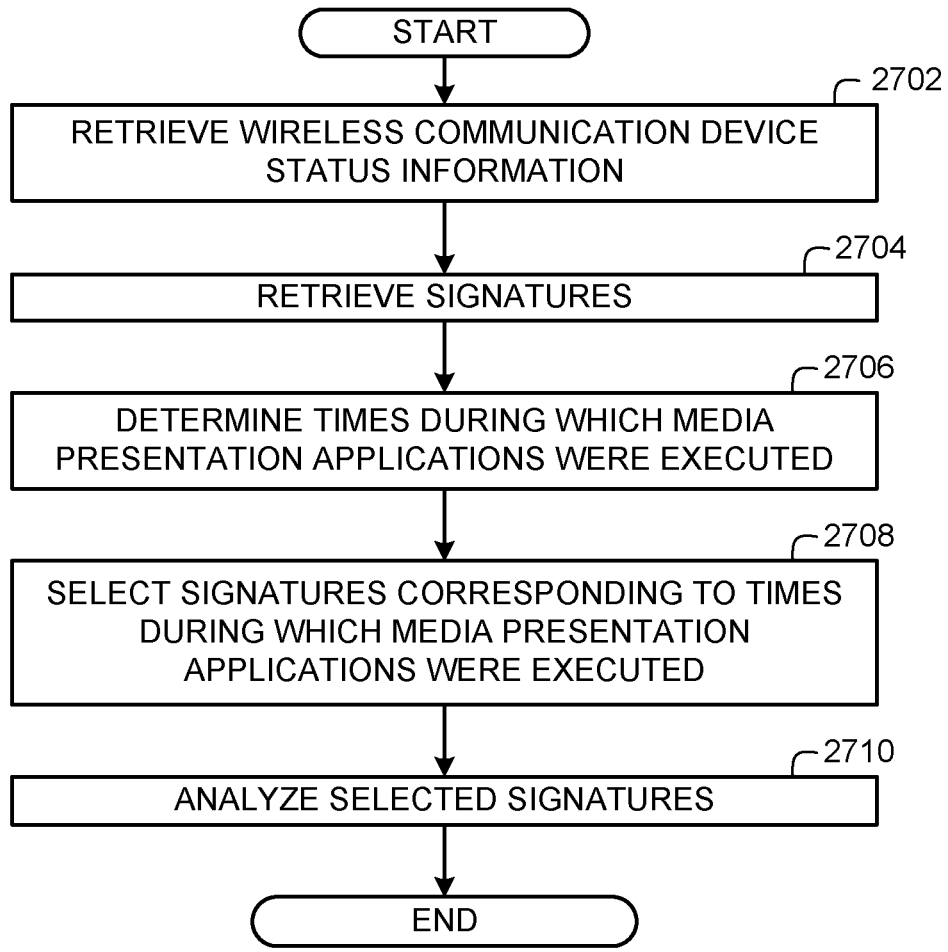
FIG. 27 is a flowchart representative of an example process that may be performed to analyze signatures generated by the wireless communication device of FIGS. 1-3, 22A, 22B, and 23.

FIG. 27 is a flowchart representative of an example process that may be performed to analyze signatures generated by the wireless communication device of FIGS. 1-3, 22A, 22B, and 23. In other example implementations, the example process of FIG. 27 may additionally or alternatively be used to analyze collected codes. The example process of FIG. 27 may be performed by the example system 1300 of FIG. 13 based on panel metering information received from the wireless communication devices 104.

Initially, the panel metering information interface 1302 retrieves wireless communication device status information (block 2702) (e.g., the status information of FIG. 24) and signatures (block 2704) (e.g., the signatures of FIG. 25) from the panel metering information data structure 112 (FIGS. 1-3 and 13). The analyzer 1308 then determines the times during which media presentation applications were executed by the wireless communication device 104 (block 2706). For example, the analyzer 1308 can retrieve the timestamps associated with status entries (e.g., the status entries 2402*d* and 2402*e* of FIG. 24) indicative that a media presentation application was instantiated and exited and based on the retrieved status entries determine the times during which one or more media presentation applications were in use.

The analyzer 1308 then selects signatures having timestamps corresponding to the times during which one or more media presentation applications were in use (block 2708). The analyzer 1308 can then analyze the selected signatures (block 2710), for example, as described above in connection with the example process of FIG. 20. The example process of FIG. 27 is then ended.

In some example implementations, the analyzer 1308 may additionally or alternatively analyze signatures based on operating modes of media presentation applications. For example, the analyzer 1308 may retrieve timestamps associated with status entries (e.g., the usage data 936 of FIGS. 9 and 11) indicative of operating modes of the media presentation applications to determine when the media presentation applications were actually presenting media content (e.g., were in a playback mode), and the analyzer 1308 can retrieve only signatures that were generated when the media presentation applications were actually presenting media content.

Figure 28:
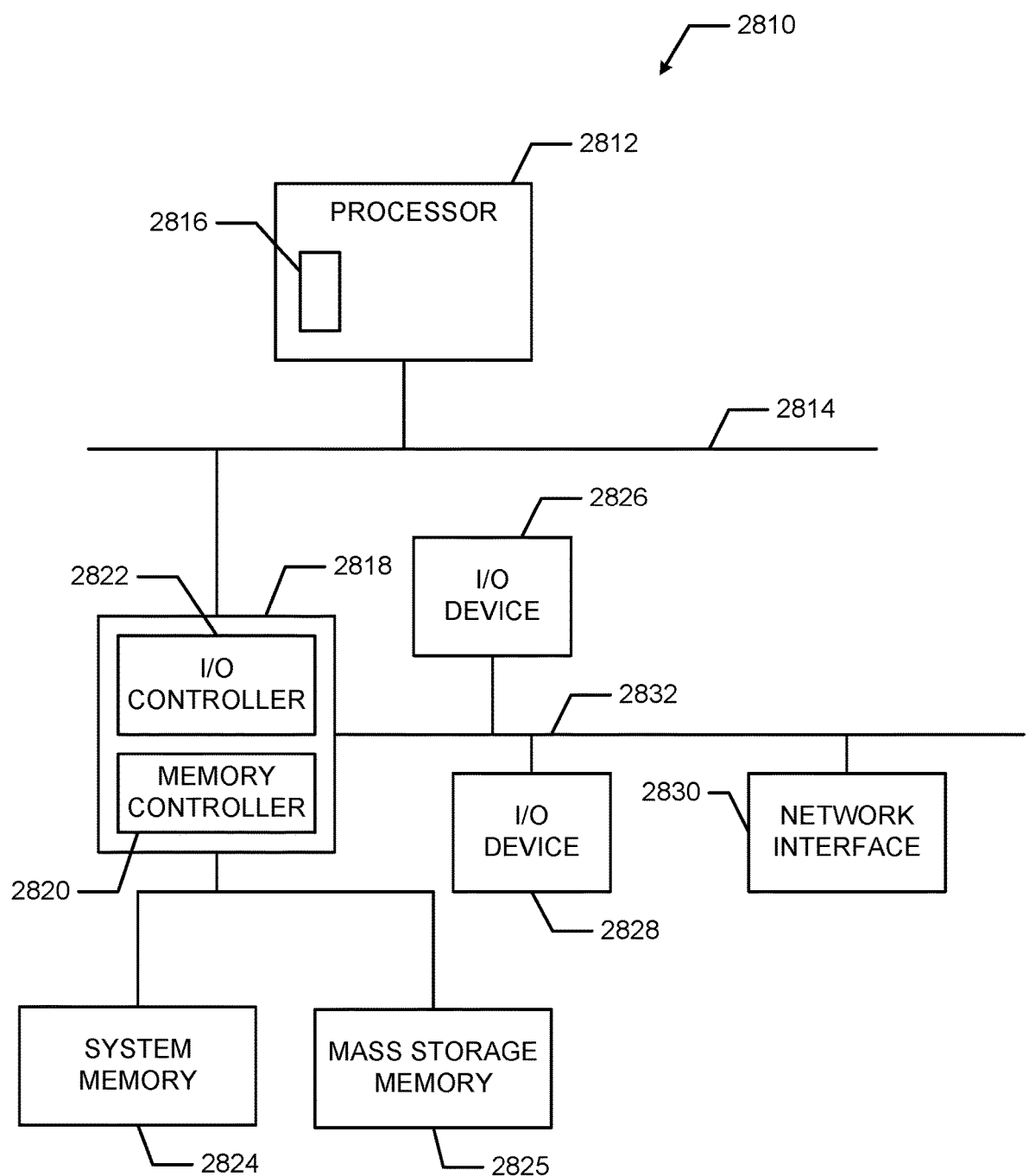
FIG. 28 is a block diagram of an example processor system that may be used to perform the example processes of FIGS. 14, 15, 16A, 16B, 17-19, 20A, 20B, 21A, 21B, 26, and 27 to implement the example systems, apparatus, and/or methods described herein.

FIG. 28 is a block diagram of an example processor system that may be used to execute machine readable instructions to perform the example processes of FIGS. 14, 15, 16A, 16B, 17-19, 20A, 20B, 21A, 21B, 26, and 27 to implement the example systems and/or methods described herein. As shown in FIG. 28, the processor system 2810 includes a processor 2812 that is coupled to an interconnection bus 2814. The processor 2812 includes a register set or register space 2816, which is depicted in FIG. 28 as being entirely on-chip, but which could alternatively be located entirely or partially off-chip and directly coupled to the processor 2812 via dedicated electrical connections and/or via the interconnection bus 2814. The processor 2812 may be any suitable processor, processing unit or microprocessor. Although not shown in FIG. 28, the system 2810 may be a multi-processor system and, thus, may include one or more additional processors that are identical or similar to the processor 2812 and that are communicatively coupled to the interconnection bus 2814.

The processor 2812 of FIG. 28 is coupled to a chipset 2818, which includes a memory controller 2820 and an input/output (I/O) controller 2822. As is well known, a chipset typically provides I/O and memory management functions as well as a plurality of general purpose and/or special purpose registers, timers, etc. that are accessible or used by one or more processors coupled to the chipset 2818. The memory controller 2820 performs functions that enable the processor 2812 (or processors if there are multiple processors) to access a system memory 2824 and a mass storage memory 2825.

The system memory 2824 may include any desired type of volatile and/or non-volatile memory such as, for example, static random access memory (SRAM), dynamic random access memory (DRAM), flash memory, read-only memory (ROM), etc. The mass storage memory 2825 may include any desired type of mass storage device including hard disk drives, optical drives, tape storage devices, etc.

The I/O controller 2822 performs functions that enable the processor 2812 to communicate with peripheral input/output (I/O) devices 2826 and 2828 and a network interface 2830 via an I/O bus 2832. The I/O devices 2826 and 2828 may be any desired type of I/O device such as, for example, a keyboard, a video display or monitor, a mouse, etc. The network interface 2830 may be, for example, an Ethernet device, an asynchronous transfer mode (ATM) device, an 802.11 device, a digital subscriber line (DSL) modem, a cable modem, a cellular communication interface, etc. that enables the processor system 2810 to communicate with another processor system.

While the memory controller 2820 and the I/O controller 2822 are depicted in FIG. 28 as separate functional blocks within the chipset 2818, the functions performed by these blocks may be integrated within a single semiconductor circuit or may be implemented using two or more separate integrated circuits.

Although certain methods, apparatus, systems, and articles of manufacture have been described herein, the scope of coverage of this patent is not limited thereto. To the contrary, this patent covers all methods, apparatus, systems, and articles of manufacture fairly falling within the scope of the appended claims either literally or under the doctrine of equivalents.

What is claimed is:

1. An apparatus to monitor media that is presented via a mobile device, comprising:
   an application monitor to determine when media presentation software is being executed by the mobile device; and
   a metering information collector to:
   determine whether to collect at least one of a signature or a code of the media presented by the media presentation software based on: (a) audio being detected via a microphone of the mobile device, or (b) the media presentation software being executed, and
   collect the at least one of the signature or the code based on the determination.

2. The apparatus as defined in claim 1, wherein the metering information collector is to collect the at least one of the signature or the code based on the audio being detected via the microphone of the mobile device when the metering information collector determines that the at least one of the signature or the code is to be collected based on the audio being detected via the microphone of the mobile device.

3. The apparatus as defined in claim 2, wherein the audio detected via the microphone includes audio emitted by the mobile device and audio emitted by one or more devices other than the mobile device.

4. An apparatus to monitor media that is presented via a mobile device, comprising:
   an application monitor to determine when media presentation software is being executed by the mobile device; and
   a metering information collector to collect at least one of a signature or a code of the media presented by the media presentation software based on the media presentation software being executed by the mobile device and based on the application monitor determining that the media presentation software is in a playback mode.

5. The apparatus as defined in claim 4, further including a microphone of the mobile device, the metering information collector to collect the signature or the code based on audio signals detected using the microphone of the mobile device.

6. An article of manufacture comprising machine readable instructions stored thereon that, when executed, cause a processor to at least:
   determine when media presentation software is being executed by a mobile device;
   determine whether to collect at least one of a signature or a code of the media presented by the media presentation software based on: (a) audio being detected via a microphone of the mobile device, or (b) the media presentation software being executed; and
   collect the at least one of the signature or the code based on the determination.

7. The article of manufacture as defined in claim 6, wherein the instructions are to cause the processor to collect the at least one of the signature or the code based on the audio being detected via the microphone of the mobile device when the processor determines that the at least one of the signature or the code is to be collected based on the audio being detected via the microphone of the mobile device.

8. The article of manufacture as defined in claim 7, wherein the audio detected via the microphone includes audio emitted by the mobile device and audio emitted by one or more devices other than the mobile device.

9. An article of manufacture comprising machine readable instructions stored thereon that, when executed, cause a processor to at least:
   determine when media presentation software is being executed by a mobile device; and
   collect at least one of a signature or a code of the media presented by the media presentation software based on the media presentation software being executed by the mobile device and based on determining that the media presentation software is in a playback mode.

10. The article of manufacture as defined in claim 9, wherein the instructions are to cause the processor to collect the signature or the code based on audio signals detected using a microphone of the mobile device.

11. A method of monitoring media that is presented via a mobile device, comprising:
   determining, by executing an instruction with a processor, when media presentation software is being executed by the mobile device;
   determining, by executing an instruction with the processor, whether to collect at least one of a signature or a code of the media presented by the media presentation software based on: (a) audio being detected via a microphone of the mobile device, or (b) the media presentation software being executed; and
   collecting, by executing an instruction with the processor, at least one of the signature or the code based on the determination.

12. The method as defined in claim 11, further including, when the at least one of the signature or the code is to be collected based on the audio being detected via the microphone of the mobile device, collecting the at least one of the signature or the code based on the audio being detected via the microphone of the mobile device.

13. The method as defined in claim 12, wherein the audio detected via the microphone includes audio emitted by the mobile device and audio emitted by one or more devices other than the mobile device.

14. A method of monitoring media that is presented via a mobile device, comprising:
   determining, by executing an instruction with a processor, when media presentation software is being executed by the mobile device; and
   collecting, by executing an instruction with the processor, at least one of a signature or a code of the media presented by the media presentation software based on the media presentation software being executed by the mobile device and based on determining that the media presentation software is in a playback mode.

15. The method as defined in claim 14, wherein the collecting of the signature or the code includes collecting the signature or the code based on audio signals detected via a microphone of the mobile device.

* * * * *